(12) United States Patent
Swann et al.

(10) Patent No.: US 12,180,899 B2
(45) Date of Patent: Dec. 31, 2024

(54) FUEL DELIVERY

(71) Applicant: ROLLS-ROYCE plc, London (GB)

(72) Inventors: Peter Swann, Derby (GB); Craig W Bemment, Derby (GB); Christopher P Madden, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 17/853,191

(22) Filed: Jun. 29, 2022

(65) Prior Publication Data

US 2023/0323820 A1 Oct. 12, 2023

(30) Foreign Application Priority Data

Apr. 12, 2022 (GB) ...................................... 2205354

(51) Int. Cl.
*F02C 9/26* (2006.01)
*B64D 27/10* (2006.01)
(Continued)

(52) U.S. Cl.
CPC ................ *F02C 9/26* (2013.01); *B64D 27/10* (2013.01); *B64D 37/30* (2013.01); *F02C 7/22* (2013.01); *F23R 3/36* (2013.01); *F05D 2220/323* (2013.01)

(58) Field of Classification Search
CPC .... F02C 9/26; F02C 9/263; F23R 3/36; F23R 3/343
See application file for complete search history.

(56) References Cited

U.S. PATENT DOCUMENTS 3,675,419 A * 7/1972 Lewis ....................... F23R 3/16
60/749
3,869,862 A 3/1975 Dickey
(Continued)

FOREIGN PATENT DOCUMENTS

DE 10 2014 104 361 A1 10/2015
EP 2933561 A1 10/2015
(Continued)

OTHER PUBLICATIONS

Honeywell, What is Sustainable Aviation Fuel?(https://honeywell.com/us/en/news/2021/12/what-is-sustainable-aviation-fuel#:~:text=SAF%20IS%20produced%20by%20converting,cooking%20oils%2C%20and%20animal%20fats.) Dec. 2021. (Year: 2021).*
(Continued)

*Primary Examiner* — Thuyhang N Nguyen
(74) *Attorney, Agent, or Firm* — Oliff PLC

(57) ABSTRACT

A gas turbine engine for an aircraft, including: staged combustion system having pilot fuel injectors and main fuel injectors, staged combustion system being operable in pilot-only range of operation and pilot-and-main range of operation; and fuel delivery regulator arranged to control delivery of fuel to pilot and main fuel injectors. Fuel delivery regulator arranged to receive fuel from a first fuel source containing a first fuel having a first fuel characteristic and a second fuel source containing a second fuel having a different second fuel characteristic. The fuel delivery regulator is arranged to deliver fuel to the pilot fuel injectors during at least part of the pilot-only range of operation having a different fuel characteristic from fuel delivered to one or both of the pilot and main fuel injectors during at least part of the pilot-and-main range of operation. A method of operating a gas turbine engine is also disclosed.

13 Claims, 19 Drawing Sheets

(51) Int. Cl.
*B64D 37/30* (2006.01)
*F02C 7/22* (2006.01)
*F23R 3/36* (2006.01)

(56) References Cited

U.S. PATENT DOCUMENTS

| | | | |
|---|---|---|---|
| 4,833,878 | A | 5/1989 | Sood et al. |
| 5,318,436 | A * | 6/1994 | Colket, III ............ F23D 23/00 |
| | | | 431/278 |
| 6,367,262 | B1 | 4/2002 | Mongia et al. |
| 6,915,640 | B2 | 7/2005 | Jonsson |
| 10,079,564 | B2 | 9/2018 | Huntington et al. |
| 10,132,499 | B2 * | 11/2018 | Matsuyama ............ F23R 3/28 |
| 10,378,456 | B2 * | 8/2019 | Stuttaford ............... F02C 9/28 |
| 10,760,484 | B2 | 9/2020 | Alecu |
| 2007/0118502 | A1 | 5/2007 | Aragones et al. |
| 2007/0119178 | A1 | 5/2007 | Berenbrink et al. |
| 2008/0115482 | A1 | 5/2008 | LaGrow et al. |
| 2009/0107105 | A1 * | 4/2009 | Ziminsky ............... F23R 3/36 |
| | | | 60/39.463 |
| 2010/0050641 | A1 | 3/2010 | Nag |
| 2010/0162712 | A1 | 7/2010 | Zupanc et al. |
| 2010/0173253 | A1 | 7/2010 | Mohr et al. |
| 2011/0056180 | A1 | 3/2011 | Nomura et al. |
| 2012/0102914 | A1 * | 5/2012 | Kirzhner ................ F02C 9/48 |
| | | | 73/112.05 |
| 2012/0186264 | A1 | 7/2012 | Hoke |
| 2013/0097991 | A1 | 4/2013 | Zhang et al. |
| 2013/0192246 | A1 | 8/2013 | Kamath et al. |
| 2014/0190177 | A1 | 7/2014 | Deuker et al. |
| 2014/0257666 | A1 * | 9/2014 | Abrol ..................... F02C 9/48 |
| | | | 701/100 |
| 2014/0260309 | A1 | 9/2014 | Menon et al. |
| 2015/0100219 | A1 * | 4/2015 | Swann .................... F02C 3/20 |
| | | | 701/100 |
| 2015/0100220 | A1 * | 4/2015 | Swann .................... F02C 9/28 |
| | | | 701/100 |
| 2015/0134151 | A1 | 5/2015 | Swann |
| 2015/0191667 | A1 * | 7/2015 | Dubois .................. C10L 10/02 |
| | | | 44/451 |
| 2015/0275755 | A1 | 10/2015 | Ogata et al. |
| 2015/0345791 | A1 | 12/2015 | Whiteman et al. |
| 2016/0061114 | A1 | 3/2016 | Guethe et al. |
| 2016/0138808 | A1 | 5/2016 | Huebner et al. |
| 2016/0146117 | A1 | 5/2016 | Swann |
| 2016/0169120 | A1 | 6/2016 | Van et al. |
| 2016/0298852 | A1 * | 10/2016 | Snyder, III .............. F23R 3/46 |
| 2016/0305339 | A1 | 10/2016 | Morgan et al. |
| 2017/0268782 | A1 | 9/2017 | Huang et al. |
| 2017/0284671 | A1 * | 10/2017 | Asai ..................... F23R 3/283 |
| 2017/0298884 | A1 * | 10/2017 | Patel ..................... F02M 61/16 |
| 2018/0163629 | A1 | 6/2018 | Proscia |
| 2019/0101062 | A1 * | 4/2019 | Vise ..................... F23R 3/343 |
| 2019/0323426 | A1 | 10/2019 | Mackin |
| 2020/0080480 | A1 | 3/2020 | Horikawa et al. |
| 2021/0103860 | A1 | 4/2021 | de Oliveira et al. |
| 2021/0277796 | A1 | 9/2021 | McCambridge et al. |
| 2021/0277835 | A1 | 9/2021 | Madden et al. |
| 2022/0165164 | A1 | 5/2022 | Salamone, III |

FOREIGN PATENT DOCUMENTS

| | | |
|---|---|---|
| EP | 3312507 A1 | 4/2018 |
| EP | 4 202 195 A1 | 6/2023 |
| EP | 4 261 396 A1 | 10/2023 |

OTHER PUBLICATIONS

Brem, B., T., et al., Effects of Fuel Aromatic Contect on Nonvolatile Emissions of an In-Production Aircraft Gas Turbine, Environ Sci Technol, Nov. 17, 2015. (http://pubmed.ncbi.nlm.nih.gov/26495879/) (Year: 2015).*

"What is sustanable aviation fuel?" ATAG, https://aviationbenefits.org/faqs/what-is-sustainable-aviation-fuel/, published Nov. 29, 2020.

Sep. 20, 2024 Notice of Allowance issued in U.S. Appl. No. 18/208,077.

* cited by examiner

FUEL DELIVERY

CROSS-REFERENCE TO RELATED APPLICATIONS

This specification is based upon and claims the benefit of priority from UK Patent Application Number 2205354.0 filed on 12 Apr. 2022, the entire contents of which are incorporated herein by reference.

BACKGROUND

Field of the Disclosure

The present disclosure relates to a gas turbine engine for an aircraft, and a method of operating a gas turbine engine for an aircraft. The present disclosure further relates to a computer implemented method of determining one or more fuel loading parameters for an aircraft, a fuel loading parameter determination system, a method of determining a fleetwide fuel allocation for a plurality of missions, and a fleetwide fuel allocation determination system. The present disclosure further relates to a method of loading fuel onto the aircraft, and onto a plurality of aircraft carrying out the plurality of missions.

Description of the Related Art

There is an expectation in the aviation industry of a trend towards the use of fuels different from the traditional kerosene-based jet fuels generally used at present.

SUMMARY

According to a first aspect, there is provided a gas turbine engine for an aircraft, comprising:
 a staged combustion system having pilot fuel injectors and main fuel injectors, the staged combustion system being operable in a pilot-only range of operation and a pilot-and-main range of operation; and
 a fuel delivery regulator arranged to control delivery of fuel to the pilot and main fuel injectors, the fuel delivery regulator being arranged to receive fuel from a first fuel source containing a first fuel having a first fuel characteristic and a second fuel source containing a second fuel having a second fuel characteristic, the second fuel characteristic being different from the first, wherein the fuel delivery regulator is arranged to deliver fuel to the pilot fuel injectors during at least part of the pilot-only range of operation having a different fuel characteristic from fuel delivered to one or both of the pilot and main fuel injectors during at least part of the pilot-and-main range of operation.

The inventors have determined that it may be advantageous to provide fuel from different fuel sources having different characteristics to the fuel delivery regulator, and delivering fuel to the pilot and main fuel injectors such that fuel of a different characteristic is provided in different ranges of the combustor operation. This more flexible supply of fuel to the combustor may allow fuel which has favourable combustion properties but is limited in supply to be used where those favourable properties will have a greater effect.

The first fuel characteristic may be associated with a level of nvPM production which is less than that of the second fuel characteristic. The fuel delivered to the pilot fuel injectors during at least part of the pilot-only range of operation may be associated with a level of nvPM production which is less than that of the fuel delivered to one or both of the pilot and main fuel injectors during at least part of the pilot-and-main range of operation.

The fuel delivery regulator may be arranged to deliver fuel from the first fuel source to the pilot fuel injectors during operation in both the pilot-only and the pilot-and-main ranges of operation, and fuel from the second fuel source to the main fuel injectors during operation in the pilot-and-main range of operation.

The fuel delivery regulator may be arranged to deliver fuel from the first fuel source to the pilot fuel injectors during operation in at least part of the pilot-only range of operation, and deliver fuel from the second fuel source to the pilot fuel injectors during the pilot-and-main range of operation.

The fuel delivery regulator may be arranged to switch delivery of fuel to the pilot fuel injectors between fuel from the first fuel source and fuel from the second fuel source at one or more operating points within, or at a boundary of, the pilot-only range of operation.

The fuel delivery regulator may be arranged to switch delivery of the fuel to the pilot fuel injectors between fuel from the first fuel source and fuel from the second fuel source according to a mode signal indicative of a change in the range of operation of the staged combustion system. The switching may occur at the staging point between the pilot-only range of operation and the pilot-and-main range of operation.

The fuel delivery regulator may be arranged to further switch delivery of fuel to the pilot fuel injectors between fuel from the first fuel source and fuel from the second fuel source at a threshold point within the pilot-only range of operation. Fuel from the second source may be delivered to the pilot fuel injectors at fuel flow rates below the threshold point, and fuel from the first source is delivered to the pilot fuel injectors at fuel flow rates between the threshold and the boundary of the pilot-only range of operation.

The threshold point may be a threshold fuel flow rate at which the production of nvPM by the gas turbine engine passes a threshold amount of the nvPM produced by the gas turbine engine during operation in which the pilot fuel injectors are delivered fuel having the second fuel characteristic Additionally or alternatively, the threshold point may be a predefined threshold fuel flow rate which is less than the fuel flow rate at the boundary between pilot-only operation and pilot-and-main operation by a predefined amount. The predefined threshold fuel flow rate may be either a percentage of the fuel flow rate at the staging point or an absolute value of fuel flow rate less than that at the staging point.

The fuel delivery regulator may comprise a fuel blender arranged to receive a supply of fuel from both the first and second fuel sources and output fuel from the first fuel source, fuel from the second fuel source, or a blend thereof. The fuel blender may be arranged to deliver fuel to the pilot fuel injectors.

The fuel blender may be arranged to deliver a blend of fuel from the first fuel source and fuel from the second fuel source to the pilot fuel injectors during at least part of the pilot-only range of operation.

The fuel blender may be arranged to deliver a blend of fuel to the pilot fuel injectors having a varying blend ratio of fuel from the first fuel source and fuel from the second fuel source, wherein the blend ratio may be varied within the pilot-only range of operation according to the fuel flow rate.

The proportion of fuel from the first fuel source compared to that from the second fuel source may be reduced with decreasing fuel flow rate within the pilot-only range of operation.

The dependence on fuel flow rate of the proportion of fuel from the first fuel source compared to that from the second fuel source is determined according to a desired resultant level of nvPM at a particular fuel flow rate, and may be determined such that the nvPM does not exceed a predetermined threshold or such that the nvPM production is minimised over a period of operation of the gas turbine engine. The nvPM production may be minimised over the LTO cycle.

The fuel blender may be arranged to blend fuel in order to achieve a desired level of nvPM at one or more operating conditions of the gas turbine engine within the pilot-only range of operation.

The fuel regulator may be arranged to deliver fuel to the pilot fuel injectors in order to minimise a cost function dependent on one or more nvPM impact parameters. The one or more nvPM impact parameters may include any one or more of:
  i) height above ground level at which the nvPM production takes place;
  ii) location (e.g. longitude and latitude) of the nvPM production;
  iii) weather and/or atmospheric conditions at a location of the nvPM production;
  iv) climate impacts associated with location of the nvPM production;
  v) mass and/or size of individual nvPM particles produced;
  vi) potential contrail production and/or contrail characteristics;
  vii) local air quality (LAQ) impact of nvPM production; and/or
  viii) nvPM mass and/or number.

The blend ratio provided by the fuel blender may be determined at least partly according to any one or more of
  a) the amount of fuel having the first fuel composition available for a proposed flight (e.g. estimate or measurement of the amount of fuel in the fuel tanks making up first and second fuel sources);
  b) the amount of total fuel requirement for the pilot fuel injectors during pilot-only operation for the entire flight in a range of operation in which fuel is provided from the first fuel source; and/or
  c) a fuel composition limit parameter (e.g. certification limit, fuel composition available for fueling, aircraft/engine limits).

According to a second aspect, there is provided a method of operating a gas turbine engine for an aircraft, the gas turbine engine comprising a staged combustion system having pilot fuel injectors and main fuel injectors, the staged combustion system being operable in a pilot-only range of operation and a pilot-and-main range of operation, the method comprising:
  regulating fuel delivery to the pilot and main fuel injectors from a first fuel source containing a first fuel having a first fuel characteristic and a second fuel source containing a second fuel having a second fuel characteristic, the second fuel characteristic being different from the first,
  wherein the regulating of the fuel delivery comprises delivering fuel to the pilot fuel injectors during at least part of the pilot-only range of operation having a different fuel characteristic from fuel delivered to one or both of the pilot and main fuel injectors during at least part of the pilot-and-main range of operation.

The first fuel characteristic may be associated with a level of nvPM production which is less than that of the second fuel characteristic. The fuel delivered to the pilot fuel injectors during at least part of the pilot-only range of operation may be associated with a level of nvPM production which is less than that of the fuel delivered to one or both of the pilot and main fuel injectors during at least part of the pilot-and-main range of operation.

The regulating of the fuel delivery may comprise delivering fuel from the first fuel source to the pilot fuel injectors during operation in both the pilot-only and the pilot-and-main ranges of operation, and fuel from the second fuel source to the main fuel injectors during operation in the pilot-and-main range of operation.

The regulating of the fuel delivery may comprise delivering fuel from the first fuel source to the pilot fuel injectors during operation in at least part of the pilot-only range of operation, and delivering fuel from the second fuel source to the pilot fuel injectors during the pilot-and-main range of operation.

The regulating of the fuel delivery may comprise switching delivery of the fuel to the pilot fuel injectors between fuel from the first fuel source and fuel from the second fuel source at one or more operating points within, or at a boundary of, the pilot-only range of operation.

The regulating of the fuel delivery may comprise switching delivery of the fuel to the pilot fuel injectors between fuel from the first source and fuel from the second source according to a mode signal indicative of a change in range of operation of the staged combustion system.

The regulating of the fuel delivery may further comprise switching delivery of fuel to the pilot fuel injectors between fuel from the first fuel source and fuel from the second fuel source at a threshold point within the pilot-only range of operation.

The threshold point may be a threshold fuel flow rate at which the production of nvPM by the gas turbine engine passes a threshold amount of the nvPM produced by the gas turbine engine during operation in which the pilot fuel injectors are delivered fuel having the second fuel characteristic.

Additionally or alternatively, the threshold point may be a predefined threshold fuel flow rate which is less than the fuel flow rate at the boundary between pilot-only operation and pilot-and-main operation by a predefined amount.

The regulating of the fuel delivery may comprise:
  blending a supply of fuel from both the first and second fuel sources to form a blended fuel consisting of fuel from the first fuel source, fuel from the second fuel source, or a blend thereof; and
  delivering the blended fuel to the pilot fuel injectors.

The delivering of the blended fuel may comprise delivering a blend of fuel from the first fuel source and fuel from the second fuel source to the pilot fuel injectors during at least part of the pilot-only range of operation.

The delivering of the blended fuel may comprise delivering a blend of fuel to the pilot fuel injectors having a varying blend ratio of fuel from the first fuel source and fuel from the second fuel source, wherein the blend ratio is varied within the pilot-only range of operation according to the fuel flow rate.

The proportion of fuel from the first fuel source compared to that from the second fuel source may be reduced with decreasing fuel flow rate within the pilot-only range of operation.

The dependence on fuel flow rate of the proportion of fuel from the first fuel source compared to that from the second fuel source may be determined according to a desired resultant level of nvPM at a particular fuel flow rate, and may be determined such that the nvPM does not exceed a predetermined threshold or such that the nvPM production is minimised over a period of operation of the gas turbine engine.

The blending of the fuel may comprise blending fuel in order to achieve a desired level of nvPM at one or more operating conditions of the gas turbine engine within the pilot-only range of operation.

The regulating of the fuel delivery may comprise delivering fuel to the pilot fuel injectors in order to minimise a cost function dependent on one or more nvPM impact parameters. The one or more nvPM impact parameters may include any one or more of:
  i) height above ground level at which the nvPM production takes place;
  ii) location of the nvPM production;
  iii) weather and/or atmospheric conditions at the location of the nvPM production;
  iv) climate impacts associated with the location of the nvPM production;
  v) mass and/or size of individual nvPM particles produced;
  vi) potential contrail production and/or contrail characteristics;
  vii) local air quality (LAQ) impact of nvPM production; and/or
  viii) nvPM mass and/or number.

The blending of the fuel may comprise blending the fuel at a blend ratio determined at least partly according to any one or more of:
  a) the amount of fuel having the first fuel composition available for a proposed flight;
  b) the amount of total fuel requirement for the pilot fuel injectors during pilot-only operation for the entire flight in a range of operation in which fuel is provided from the first fuel source; and/or
  c) a fuel composition limit parameter.

According to another aspect, there is provided an aircraft comprising one or more gas turbine engines according to the first aspect, and optionally any one or more of the associated statements above.

According to a third aspect, there is provided a gas turbine engine for an aircraft, comprising:
  a staged combustion system having pilot fuel injectors and main fuel injectors, the staged combustion system being operable in a pilot-only range of operation in which fuel is delivered only to the pilot fuel injectors, and a pilot-and-main range of operation in which fuel is delivered to at least the main fuel injectors; and
  a fuel delivery regulator arranged to control fuel delivery to the pilot and main fuel injectors, the fuel delivery regulator being arranged to receive fuel from a first fuel source containing a first fuel having a first fuel characteristic and a second fuel source containing a second fuel having a second fuel characteristic, the second fuel characteristic being different from the first, wherein:
  the staged combustion system is arranged to switch between the pilot-only range of operation and the pilot-and-main range of operation at a staging point which corresponds to a steady state cruise mode of operation of the engine, the staging point defining a boundary between a first engine cruise operation range and a second engine cruise operation range; and
  the fuel delivery regulator is arranged to deliver fuel to the pilot fuel injectors during at least part of the first engine cruise operation range having a different fuel characteristic from fuel delivered to one or both of the pilot and main fuel injectors during the second engine cruise operation range.

The inventors have determined that it may be advantageous to operate a staged combustion system so that it is in pilot-only mode during at least some of its cruise operation, while also selectively providing fuel from two different sources to the combustor during the cruise operation. The inventors have determined that by setting the staging point so that lower power cruise operation may take place in pilot-only mode certain engine emissions may be reduced and combustion efficiency improved. When combined with selectively using fuels having different characteristics, the inventors have determined that disadvantageous effects on emissions that would otherwise result in moving the staging point can be mitigated. This therefore provides an overall improvement in combustion efficiency and reduced emissions by a combination of these factors.

The first fuel characteristic may be associated with a level of nvPM production which is less than that of the second fuel characteristic. The fuel delivered to the pilot fuel injectors during the first engine cruise operation range may be associated with a level of nvPM production which is less than that of the fuel delivered to one or both of the pilot and main fuel injectors during at least part of the second engine cruise operation range.

The first fuel characteristic may correspond to a greater proportion of SAF within the respective fuel compared to the second fuel characteristic, and the fuel delivered during the first engine cruise operation range may have a higher proportion of SAF compared to the fuel delivered during the second engine cruise operation range.

The first engine cruise operation range may correspond to operation of the aircraft in a later part of a cruise segment of a flight, and the second engine cruise operation range may correspond to operation of the aircraft in a relatively earlier part of the cruise segment.

The first engine cruise operation range may correspond to steady state subsonic cruise operation of the engine and the second engine cruise operation range may correspond to steady state supersonic cruise operation of the engine.

The fuel delivery regulator may comprise a fuel blender arranged to receive a supply of fuel from both the first and second fuel sources and output fuel from the first fuel source, fuel from the second fuel source, or a blend thereof. The fuel blender may be arranged to deliver fuel to the pilot fuel injectors, and optionally to the main fuel injectors.

The proportion of fuel delivered from the first fuel source compared to that from the second fuel source may be determined according to a desired resultant level of nvPM production at a particular fuel flow rate within the first engine cruise operation range, and may be determined such that the nvPM production does not exceed a predetermined threshold or such that the nvPM production is minimised over a period of operation of the gas turbine engine.

The proportion of fuel delivered from the first fuel source compared to that from the second fuel source during the first engine cruise operation range may be determined at least partly according to any one or more of
  a) the amount of fuel having the first fuel characteristic and the second fuel characteristic available for a proposed flight;
  b) the amount of total fuel requirement for the pilot fuel injectors during pilot-only operation for the entire flight in a range of operation in which fuel is provided from the first fuel source; and/or c) a fuel composition limit parameter.

According to a fourth aspect, there is provided a method of operating a gas turbine engine for an aircraft, the gas turbine engine comprising a staged combustion system having pilot fuel injectors and main fuel injectors, the staged combustion system being operable in a pilot-only range of operation in which fuel is delivered only to the pilot fuel injectors, and a pilot-and-main range of operation in which fuel is delivered to at least the main fuel injectors, the method comprising:

regulating fuel delivery to the pilot and main fuel injectors from a first fuel source containing a first fuel having a first fuel characteristic and a second fuel source containing a second fuel having a second fuel characteristic, the second fuel characteristic being different from the first;

switching between the pilot-only range of operation and the pilot-and-main range of operation at a staging point during a steady state cruise mode of operation of the engine to define a first engine cruise operation range and a second engine cruise operation range; and delivering fuel to the pilot fuel injectors during at least part of the first engine cruise operation range having a different fuel characteristic from fuel delivered to one or both of the pilot and main fuel injectors during the second engine cruise operation range.

The first fuel characteristic may be associated with a level of nvPM production which is less than that of the second fuel characteristic, The fuel delivered to the pilot fuel injectors during the first engine cruise operation range may be associated with a level of nvPM production which is less than that of the fuel delivered to one or both of the pilot and main fuel injectors during at least part of the second engine cruise operation range.

The first fuel characteristic may correspond to a greater proportion of SAF within the respective fuel compared to the second fuel characteristic. The fuel delivered during the first engine cruise operation range may have a higher proportion of SAF compared to the fuel delivered during the second engine cruise operation range.

The first engine cruise operation range may correspond to operation of the aircraft in a later part of a cruise segment of a flight, and the second engine cruise operation range may correspond to operation of the aircraft in a relatively earlier part of the cruise segment.

The first engine cruise operation range may correspond to steady state subsonic cruise operation of the engine and the second engine cruise operation range may correspond to steady state supersonic cruise operation of the engine.

Regulating fuel delivery may comprise delivering fuel from the first fuel source, fuel from the second fuel source, or a blend thereof using a fuel blender. The fuel blender may be arranged to deliver fuel to the pilot fuel injectors, and optionally to the main fuel injectors.

The proportion of fuel delivered from the first fuel source compared to that from the second fuel source may be determined according to a desired resultant level of nvPM at a particular fuel flow rate within the first engine cruise operation range, and may be determined such that the nvPM does not exceed a predetermined threshold or such that the nvPM production is minimised over a period of operation of the gas turbine engine.

The proportion of fuel delivered from the first fuel source compared to that from the second fuel source during the first engine cruise operation range may be determined at least partly according to any one or more of:

a) the amount of fuel having the first fuel characteristic and the second fuel characteristic available for a proposed flight;

b) the amount of total fuel requirement for the pilot fuel injectors during pilot-only operation for the entire flight in a range of operation in which fuel is provided from the first fuel source; and/or c) a fuel composition limit parameter.

According to another aspect, there is provided an aircraft comprising one or more gas turbine engines according to the third aspect, and optionally any one or more of the associated statements above.

According to a fifth aspect, there is provided a gas turbine engine for an aircraft, comprising:

a staged combustion system having pilot fuel injectors and main fuel injectors, the staged combustion system being operable in a pilot-only range of operation in which fuel is delivered only to the pilot fuel injectors, and a pilot-and-main range of operation in which fuel is delivered to at least the main fuel injectors at a relative rate defined by a pilot-and-main staging ratio; and a fuel delivery regulator arranged to control delivery of fuel to the pilot and main fuel injectors, the fuel delivery regulator being arranged to receive fuel from a first fuel source containing a first fuel having a first fuel characteristic and a second fuel source containing a second fuel having a second fuel characteristic, the second fuel characteristic being different from the first, wherein:

the staged combustion system is further operable in a transition range of operation between the pilot-only and the pilot-and-main ranges of operation;

within the transition range of operation fuel is delivered to both the pilot and main fuel injectors at a transition staging ratio which is different from the pilot-and-main staging ratio; and the fuel delivery regulator is arranged to deliver fuel to one or both of the pilot and main fuel injectors during the transition range of operation having a different fuel characteristic from fuel delivered to one or both of the pilot and main fuel injectors during at least part of the pilot-and-main range of operation.

The inventors have determined that a transition region can be included that provides a transition from the pilot-only staging ratio (100:0) to the chosen pilot-and-main staging ratio. The inventors have determined that by configuring the staged combustion system to operate in a transition range between the pilot-only and pilot-and-main operation the amount of CO and HC emission operating within that range of engine power settings can be reduced. The inventors have also determined that any detrimental change to the engine emissions resulting from the transition region can be mitigated at least partly by using fuel having a different fuel characteristic in the transition range of operation compared to that used in at least pilot-and-main operation.

The first fuel characteristic may be associated with a level of nvPM production which is less than that of the second fuel characteristic. The fuel delivered to at least the pilot fuel injectors during the transition range of operation may be associated with a level of nvPM production which is less than the that of fuel delivered to one or both of the pilot and main fuel injectors during at least part of the pilot-and-main range of operation.

The first fuel characteristic may correspond to a greater proportion of SAF within the respective fuel compared to the second fuel characteristic. The fuel delivered during the transition range of operation may have a higher proportion of SAF compared to the fuel delivered during at least part of the pilot-and-main range of operation.

The transition staging ratio may have a continuous variation with changing engine power within at least part of the transition range of operation.

The continuous variation may be such that, within the transition range of operation, the proportion of the total fuel flow to the fuel injectors that is attributable to fuel flow to the pilot fuel injectors decreases with increasing engine power and the proportion of the total fuel flow to the fuel injectors that is attributable to fuel flow to the main fuel injectors increases with increasing engine power.

The transition staging ratio may have a constant intermediate value within at least part of the transition range of operation which is different from the pilot-and-main staging ratio. The constant intermediate value may be between that of the pilot-only range and that of the pilot-and-main range.

The transition staging ratio may vary between a series of constant intermediate values (i.e. different from each other), each being different from the pilot-and-main staging ratio. Each intermediate value may be between that of the pilot-only range and that of the pilot-and-main range.

The fuel delivery regulator may comprise a fuel blender arranged to receive a supply of fuel from both the first and second fuel sources and output fuel from the first fuel source, fuel from the second fuel source, or a blend thereof. The fuel blender may be arranged to deliver fuel to the pilot fuel injectors, and optionally to the main fuel injectors.

The proportion of fuel delivered from the first fuel source compared to that from the second fuel source may be determined according to a desired resultant level of nvPM production at a particular fuel flow rate within the transition range of operation, and may be determined such that the nvPM production does not exceed a predetermined threshold or such that the nvPM production is minimised over a period of operation of the gas turbine engine.

The proportion of fuel delivered from the first fuel source compared to that from the second fuel source during the transition range of operation may be determined at least partly according to any one or more of:
a) the amount of fuel having the first fuel characteristic and the second fuel characteristic available for a proposed flight;
b) the amount of total fuel requirement for the fuel injectors during pilot-only operation for the entire flight in a range of operation in which fuel is provided from the first fuel source; and/or
c) a fuel composition limit parameter.

According to a sixth aspect, there is provided a method of operating a gas turbine engine for an aircraft, the gas turbine engine comprising a staged combustion system having pilot fuel injectors and main fuel injectors, the staged combustion system being operable in a pilot-only range of operation in which fuel is delivered only to the pilot fuel injectors, and a pilot-and-main range of operation in which fuel is delivered to at least the main fuel injectors at a relative rate defined by a pilot-and-main staging ratio, the method comprising:
regulating fuel delivery to the pilot and main fuel injectors from a first fuel source containing a first fuel having a first fuel characteristic and a second fuel source containing a second fuel having a second fuel characteristic, the second fuel characteristic being different from the first,
operating the staged combustion system in a transition range of operation between the pilot-only and the pilot-and-main ranges of operation within which fuel is delivered to both the pilot and main fuel injectors at a transition staging ratio which is different from the pilot-and-main staging ratio,
wherein the regulating of the fuel delivery comprises delivering fuel to one or both of the pilot and main fuel injectors during the transition range of operation having a different fuel characteristic from fuel delivered to one or both of the pilot and main fuel injectors during at least part of the pilot-and-main range of operation.

The first fuel characteristic may be associated with a level of nvPM production which is less than that of the second fuel characteristic. The fuel delivered to at least the pilot fuel injectors during the transition range of operation may be associated with a level of nvPM production which is less than that of the fuel delivered to one or both of the pilot and main fuel injectors during at least part of the pilot-and-main range of operation.

The first fuel characteristic may correspond to a greater proportion of SAF within the respective fuel compared to the second fuel characteristic, and the fuel delivered during the transition range of operation may have a higher proportion of SAF compared to the fuel delivered during at least part of the pilot-and-main range of operation.

The transition staging ratio may have a continuous variation with changing engine power within at least part of the transition range of operation.

The continuous variation may be such that, within the transition range of operation, the proportion of the total fuel flow to the fuel injectors that is attributable to fuel flow to the pilot fuel injectors decreases with increasing engine power and the proportion of the total fuel flow to the fuel injectors that is attributable to fuel flow to the main fuel injectors increases with increasing engine power.

The transition staging ratio may have a constant intermediate value within at least part of the transition range of operation which is different from the pilot-and-main staging ratio, and optionally lies between that of the pilot-only range and that of the pilot-and-main range.

The transition staging ratio may vary between a series of constant intermediate values, each being different from the pilot-and-main staging ratio, and optionally each lying between that of the pilot-only range and that of the pilot-and-main range.

Regulating the fuel delivery may comprise delivering fuel from the first fuel source, fuel from the second fuel source, or a blend thereof, using a fuel blender. The fuel blender may be arranged to deliver fuel to the pilot fuel injectors, and optionally to the main fuel injectors.

The proportion of fuel delivered from the first fuel source compared to that from the second fuel source may be determined according to a desired resultant level of nvPM production at a particular fuel flow rate within the transition range of operation. The proportion of fuel may be determined such that the nvPM production does not exceed a predetermined threshold or such that the nvPM production is minimised over a period of operation of the gas turbine engine.

The proportion of fuel delivered from the first fuel source compared to that from the second fuel source during the transition range of operation may be determined at least partly according to any one or more of:

a) the amount of fuel having the first fuel characteristic and the second fuel characteristic available for a proposed flight;
b) the amount of total fuel requirement for the fuel injectors during pilot-only operation for the entire flight in a range of operation in which fuel is provided from the first fuel source; and/or
c) a fuel composition limit parameter.

According to another aspect, there is provided an aircraft comprising one or more gas turbine engines according to the fifth aspect, and optionally any one or more of the associated statements above.

According to a seventh aspect, there is provided a gas turbine engine for an aircraft, comprising:
a staged combustion system having pilot fuel injectors and main fuel injectors, the staged combustion system being operable in a pilot-only range of operation in which fuel is delivered only to the pilot fuel injectors, and a pilot-and-main range of operation in which fuel is delivered to at least the main fuel injectors; and
a fuel delivery regulator arranged to control the delivery of fuel to the pilot and main fuel injectors, the fuel delivery regulator being arranged to receive fuel from a first fuel source containing a first fuel having a first fuel characteristic, and a second fuel source containing a second fuel having a second fuel characteristic, the second fuel characteristic being different from the first, wherein:
the staged combustion system is arranged to operate in an acceleration mode in which acceleration of the engine from a steady state mode of operation is caused; and
the fuel delivery regulator is arranged to deliver fuel to one or both of the pilot and main fuel injectors, during operation in at least a part of the acceleration mode, having a different fuel characteristic from fuel delivered to one or both of the pilot and main fuel injectors during at least a part of the steady state mode of operation.

To reduce the production of excessive amounts of nvPM during acceleration, it is known to switch to an "acceleration" mode of operation of a gas turbine engine in which the staging point occurs at a lower engine power setting. The inventors have observed that switching to such a known acceleration mode however may have a number of drawbacks. For example, an increase in HC and CO emissions may be caused. In an acceleration mode of the present application the fuel delivery regulator is arranged to deliver fuel to the fuel injectors (i.e. the pilot and/or main fuel injectors) having a different fuel characteristic from fuel delivered to the fuel injectors (i.e. the pilot and/or main fuel injectors) during at least a part of the steady state mode of operation. The inventors have determined that increased nvPM emissions when the engine operates in the acceleration mode can be avoided or reduced by using a fuel with different characteristics from that which is used during steady state operation. This may allow the staging point during the acceleration mode to remain the same or similar to that of the steady state mode of operation, thus avoiding or reducing/limiting any disadvantageous increase in HC or CO emissions.

The first fuel characteristic may be associated with a level of nvPM production which is less than that of the second fuel characteristic. The fuel delivered to at least the pilot fuel injectors during the acceleration mode may be associated with a level of nvPM production which is less than that of the fuel delivered to one or both of the pilot and main fuel injectors during operation in the steady state mode.

The first fuel characteristic may correspond to a greater proportion of SAF within the respective fuel compared to the second fuel characteristic, and the fuel delivered during the acceleration mode may have a higher proportion of SAF.

The staged combustion system may be arranged to switch between operation in the pilot-only and pilot-and-main ranges of operation at a staging point.

The staging point may be at the same or higher engine power in the acceleration mode compared to the steady state mode.

The staging point may be at a lower engine power in the acceleration mode compared to the steady state mode and is at a higher power than a default staging point according to which the staged combustion system is controlled where fuel of a different characteristics cannot be provided to the combustion system.

The fuel delivery regulator may be arranged to deliver fuel to the pilot fuel injectors during pilot-only operation in the acceleration mode that has a different fuel characteristic from fuel delivered to the main fuel injectors during pilot-and-main operation in the steady state mode of operation of the engine.

The fuel delivery regulator may be arranged to deliver fuel during the pilot-only range of operation in the acceleration mode having a fuel characteristic determined based on a control parameter on which nvPM production by the engine is dependent.

The control parameter may be a fuel-to-air ratio in a combustor of the staged combustion system.

As the fuel-to-air ratio decreases, the proportion of fuel associated with low nvPM production delivered to the pilot fuel injectors may also be decreased.

The fuel delivery regulator may be arranged to switch delivery of fuel to one or both of the main and pilot fuel injectors to that having a different fuel characteristic at a start point of a period of operation in the acceleration mode.

The fuel delivery regulator may be arranged to return to delivery of fuel having the same fuel characteristic as that delivered in the steady state mode following a transition to pilot-and-main operation.

The fuel delivery regulator may be arranged to deliver fuel to one or both of the pilot and main fuel injectors during the acceleration mode at a rate greater than that sufficient to maintain steady-state operation of the engine.

According to an eighth aspect, there is provided a method of operating a gas turbine engine for an aircraft, the gas turbine engine comprising a staged combustion system having pilot fuel injectors and main fuel injectors, the staged combustion system being operable in a pilot-only range of operation in which fuel is delivered only to the pilot fuel injectors, and a pilot-and-main range of operation in which fuel is delivered to at least the main fuel injectors, the method comprising:
regulating fuel delivery to the pilot and main fuel injectors from a first fuel source containing a first fuel having a first fuel characteristic and a second fuel source containing a second fuel having a second fuel characteristic, the second fuel characteristic being different from the first;
operating the staged combustion system in an acceleration mode in which acceleration of the engine from a steady state mode of operation is caused; and
delivering fuel to one or both of the pilot and main fuel injectors, during operation in at least a part of the acceleration mode, having a different fuel characteristic from fuel delivered to one or both of the pilot and main fuel injectors during at least a part of the steady state mode of operation.

The first fuel characteristic may be associated with a level of nvPM production which is less than that of the second fuel characteristic, and the fuel delivered to at least the pilot fuel injectors during the acceleration mode may be associated with a level of nvPM production which is less than that of the fuel delivered to one or both of the pilot and the main fuel injectors during operation in the steady state mode.

The first fuel characteristic may correspond to a greater proportion of SAF within the respective fuel compared to the second fuel characteristic, and the fuel delivered during the acceleration mode may have a higher proportion of SAF.

The staged combustion system may be arranged to switch between operation in the pilot-only and pilot-and-main ranges of operation at a staging point.

The staging point may be at the same or higher engine power in the acceleration mode compared to the steady state mode.

The staging point may be at a lower engine power in the acceleration mode compared to the steady state mode, and may be at a higher power than a default staging point according to which the staged combustion system is controlled where fuel of different fuel characteristic cannot be provided to the combustion system.

Fuel may be delivered to the pilot fuel injectors during pilot-only operation in the acceleration mode that has a different fuel characteristic from fuel delivered to the main fuel injectors during pilot-and-main operation in the steady state mode of operation of the engine.

The delivering of fuel to the fuel injectors may comprise delivering fuel during the pilot-only range of operation in the acceleration mode having fuel characteristics based on a control parameter on which nvPM production by the engine is dependent. The control parameter may be a fuel-to-air ratio in a combustor of the staged combustion system. As the fuel-to-air ratio decreases, the proportion of fuel associated with low nvPM production delivered to the pilot fuel injectors may also be decreased.

The delivering of fuel to the fuel injectors may comprise switching the delivery of fuel to one or both of the main and pilot fuel injectors to that having a different fuel characteristic at a start point of a period of operation in the acceleration mode.

The delivering of fuel to the fuel injectors may comprise returning to delivery of fuel having the same fuel characteristic as that delivered in the steady state mode following a transition to pilot-and-main operation.

During the acceleration mode fuel may be delivered to the fuel injectors at a rate greater than that sufficient to maintain steady-state operation.

According to another aspect, there is provided an aircraft comprising one or more gas turbine engines according to the seventh aspect, and optionally any one or more of the associated statements above.

According to a ninth aspect, there is provided a gas turbine engine for an aircraft, comprising:
- a staged combustion system having pilot fuel injectors and main fuel injectors, the staged combustion system being operable in a pilot-only range of operation and a pilot-and-main range of operation; and
- a fuel delivery regulator arranged to control delivery of fuel to the pilot and main fuel injectors;
- a fuel characteristic determination module configured to determine one or more fuel characteristics of the fuel being supplied to the staged combustion system; and
- a controller configured to determine a staging point defining the point at which the staged combustion system is switched between pilot-only operation and pilot-and-main operation, the staging point being determined based on the determined one or more fuel characteristics, and the controller being configured to control the staged combustion system according to the determined staging point.

The inventors have determined the staging point according to which a staged combustion system is controlled can be determined according to the characteristics of the fuel being supplied to the combustor. As discussed above in connection with the third, fourth, seventh and eighth aspects, the staging point can be controlled in cases where fuel of different characteristics is available to reduce certain engine emissions.

The one or more fuel characteristics may indicate that the fuel is associated with a lower nvPM production level compared to fossil kerosene.

The one or more fuel characteristics may include any one or more of:
(i) a percentage of sustainable aviation fuel in the fuel;
(ii) an aromatic hydrocarbon content of the fuel; and/or
(iii) a naphthalene content of the fuel.

The controller may be configured to determine the staging point such that a staging point associated with one or more fuel characteristics that indicate that the fuel is associated with a low nvPM production corresponds to a higher engine power setting compared to a staging point associated with one or more fuel characteristics that indicate that the fuel is associated with a relatively higher nvPM production.

The determined staging point may be a cruise staging point, and the controller may be configured to control the combustion system using the determined staging point during a cruise operating condition of the engine.

The controller may be configured to determine the staging point such that the staged combustion system is arranged to switch between the pilot-only range of operation and the pilot-and-main range of operation at a staging point which corresponds to a steady state cruise mode of operation of the engine, the staging point defining a boundary between a first engine cruise operation range and a second engine cruise operation range.

The first cruise operation range may correspond to operation of the aircraft in a later part of a cruise segment of a flight, and the second operation range may correspond to operation of the aircraft in a relatively earlier part of the cruise segment.

The first cruise operation range may correspond to steady state subsonic cruise operation of the engine and the second cruise operation range corresponds to steady state supersonic cruise operation of the engine.

The determined staging point may be an engine acceleration staging point, and the controller may be configured to control the staged combustion system using the determined staging point during an acceleration operating condition of the engine. The engine acceleration staging point may be determined to be the same (e.g. set to be the same) as a cruise staging point in response to the one or more fuel characteristics.

According to a tenth aspect, there is provided a method of operating a gas turbine engine for an aircraft, the gas turbine engine comprising a staged combustion system having pilot fuel injectors and main fuel injectors, the staged combustion system being operable in a pilot-only range of operation and a pilot-and-main range of operation, the method comprising:

determining one or more fuel characteristics of a fuel being supplied to the staged combustion system;

determining a staging point, defining the point at which the staged combustion system is switched between pilot-only operation and pilot-and-main operation, based on the determined one or more fuel characteristics; and controlling the staged combustion system according to the determined staging point.

The one or more fuel characteristics may indicate that the fuel is associated with a lower nvPM production level compared to fossil kerosene.

The one or more fuel characteristics include any one or more of:
(i) a percentage of sustainable aviation fuel in the fuel;
(ii) an aromatic hydrocarbon content of the fuel; and/or
(iii) a naphthalene content of the fuel.

Determining the staging point may comprise determining the staging point such that a staging point associated with one or more fuel characteristics that indicate that the fuel is associated with a low nvPM production corresponds to a higher engine power setting compared to a staging point associated with one or more fuel characteristics that indicate that the fuel is associated with a relatively higher nvPM production.

The determined staging point may be a cruise staging point, and the combustion system may be controlled using the determined staging point during a cruise operating condition of the engine.

The staging point may be determined such that the staged combustion system is arranged to switch between the pilot-only range of operation and the pilot-and-main range of operation at a staging point which corresponds to a steady state cruise mode of operation of the engine. The staging point may define a boundary between a first engine cruise operation range and a second engine cruise operation range.

The first cruise operation range may correspond to operation of the aircraft in a later part of a cruise segment of a flight, and the second cruise operation range may correspond to operation of the aircraft in a relatively earlier part of the cruise segment.

The first cruise operation range may correspond to steady state subsonic cruise operation of the engine and the second cruise operation range may correspond to steady state supersonic cruise operation of the engine.

The determined staging point may be an engine acceleration staging point, and the staged combustion system may be controlled using the determined staging point during an acceleration operating condition of the engine. The engine acceleration staging point may be determined to be the same as a cruise staging point in response to the one or more fuel characteristics.

According to an eleventh aspect, there is provided an aircraft comprising one or more gas turbine engines according to the ninth aspect, and optionally any one or more of the associated statements above.

According to a twelfth aspect, there is provided a gas turbine engine for an aircraft, comprising:
a staged combustion system having pilot fuel injectors and main fuel injectors, the staged combustion system being operable in a pilot-only range of operation and a pilot-and-main range of operation;
a fuel delivery regulator arranged to control delivery of fuel to the pilot and main fuel injectors;
a fuel characteristic determination module configured to determine one or more fuel characteristics of the fuel being supplied to the staged combustion system; and
a controller configured to determine a staging ratio defining the ratio of pilot fuel injector fuel flow to main fuel injector fuel flow, the staging ratio being determined according to the one or more fuel characteristics, and the controller being configured to control the staged combustion system according to the determined staging ratio.

The inventors have determined that the staging ratio may be determined based on the one or more fuel characteristics in order to more effectively manage engine emissions. This may, for example, allow the staging ratio to be adjusted to reduce CO and HC production in a way that would otherwise lead to high levels of nvPM production as discussed in connection with the fifth and sixth aspect above.

The one or more fuel characteristics may indicate that the fuel is associated with a lower nvPM production level compared to fossil kerosene.

The one or more fuel characteristics may include any one or more of:
(i) a percentage of sustainable aviation fuel in the fuel;
(ii) an aromatic hydrocarbon content of the fuel; and/or
(iii) a naphthalene content of the fuel.

The controller may be configured to:
control the staged combustion system during the pilot-and-main range of operation according to a pilot-and-main staging ratio, wherein the staging ratio determined according to the one or more fuel characteristics is a transition staging ratio; and
control the staged combustion system so that it is operated in a transition range of operation between the pilot-only range of operation and the pilot-and-main range of operation, wherein within the transition range of operation the staged combustion system is controlled according to the transition staging ratio, the transition staging ratio being different from the pilot-and-main staging ratio.

The transition staging ratio may have a continuous variation with changing engine power within the transition range of operation.

The continuous variation may be such that the proportion of the total fuel flow to the fuel injectors that is attributable to fuel flow to the pilot fuel injectors decreases with increasing engine power. The proportion of the total fuel flow to the fuel injectors that is attributable to fuel flow to the main fuel injectors may increase with increasing engine power within the transition range of operation.

The transition staging ratio may vary between a series of constant intermediate values, each being different from the pilot-and-main staging ratio. Each intermediate value may lie between that of the pilot-only range and that of the pilot-and-main range.

According to a thirteenth aspect, there is provided a gas turbine engine comprising a staged combustion system having pilot fuel injectors and main fuel injectors, the staged combustion system being operable in a pilot-only range of operation and a pilot-and-main range of operation, the method comprising:
determining one or more fuel characteristics of a fuel being supplied to the staged combustion system;
determining a staging ratio defining the ratio of pilot fuel injector fuel flow to main fuel injector fuel flow, the staging ratio being determined according to the one or more fuel characteristics; and
controlling the staged combustion system according to the determined staging ratio.

The one or more fuel characteristics may indicate that the fuel is associated with a lower nvPM production level compared to fossil kerosene.

The one or more fuel characteristics may include any one or more of:
- (i) a percentage of sustainable aviation fuel in the fuel;
- (ii) an aromatic hydrocarbon content of the fuel; and/or
- (iii) a naphthalene content of the fuel.

Determining the staging ratio may comprise determining a transition staging ratio; and controlling the staged combustion system may comprise controlling the staged combustion system so that it is operated in a transition range of operation between the pilot-only range of operation and the pilot-and-main range of operation. Within the transition range of operation the staged combustion system may be controlled according to the transition staging ratio, the transition staging ratio may be different from a pilot-and-main staging ratio according to which the staged combustor is controlled during the pilot-and-main range of operation.

The transition staging ratio may have a continuous variation with changing engine power within the transition range of operation.

The continuous variation may be such that the proportion of the total fuel flow to the fuel injectors that is attributable to fuel flow to the pilot fuel injectors decreases with increasing engine power, and the proportion of the total fuel flow to the fuel injectors that is attributable to fuel flow to the main fuel injectors increases with increasing engine power within the transition range of operation.

The transition staging ratio may vary between a series of constant intermediate values, each being different from the pilot-and-main staging ratio. Each intermediate value may lie between that of the pilot-only range and that of the pilot-and-main range.

According to a fourteenth aspect, there is provided an aircraft comprising one or more gas turbine engines according to the thirteenth aspect, and optionally any one or more of the associated statements above.

According to a fifteenth aspect, there is provided a computer implemented method of determining a fuel allocation for an aircraft, wherein:
- the aircraft comprises a first fuel source adapted to contain a first fuel having a first fuel characteristic and a second fuel source adapted to contain a second fuel having a second fuel characteristic, the second fuel characteristic being different from the first;
- the aircraft comprises one or more gas turbine engines powered by fuel from the first and second fuel sources;
- the one or more gas turbine engines each comprise a staged combustion system having pilot fuel injectors and main fuel injectors, the staged combustion system being operable in a pilot-only range of operation and a pilot-and-main range of operation;
- the one or more gas turbine engines each comprise a fuel delivery regulator arranged to control delivery of fuel to the pilot and main fuel injectors from the first fuel source and the second fuel source.
- the method comprising:
  - obtaining a proposed mission description comprising a list of operating points for the one or more gas turbine engines during the mission;
  - obtaining nvPM (non-volatile particulate matter) impact parameters for the one or more gas turbine engines, the impact parameters being associated with each operating point of the proposed mission using fuel from the first fuel source, fuel from the second fuel source, or a blend thereof;
  - calculating an optimised set of one or more fuel characteristics for each operating point of the proposed mission defined in the mission description based on the nvPM impact parameters; and
  - determining a fuel allocation based on the optimised set of one or more fuel characteristics.

The inventors have determined that by calculating the fuel allocation in this way, fuel can be allocated to a mission such that fuel having the required characteristics can be provided to the aircraft for it to carry out the proposed mission while reducing the nvPM impact. This may allow better use of the characteristics of the fuel available in reducing nvPM compared to loading a set amount of different types of fuel available, regardless of the mission that is to be performed using that fuel.

The first fuel characteristic may be associated with a level of nvPM production which is less than that of the second fuel characteristic.

Additionally or alternatively, the first fuel characteristic and the second fuel characteristic may be a percentage of SAF present in the respective fuel.

Each operating point of the mission description may include any one or more of: one or more operating conditions in which the gas turbine engines are to operate, one or more fuel flow rate values corresponding to an operating point, and/or a time duration of operation at a corresponding operating point.

The nvPM impact parameters may include an nvPM impact parameter defining an amount of nvPM produced by the respective gas turbine engine for different respective fuel characteristics comprising the first fuel, the second fuel, or a blend thereof at each operating point of the flight description.

The fuel allocation may include any one or more of:
- i) an amount of fuel allocated to each of the first and second fuel sources;
- ii) the first fuel characteristic;
- iii) the second fuel characteristic; and/or
- iv) a fuel mixing ratio.

The method may further comprise determining one or more fuel usage parameters corresponding to the fuel allocation. The fuel usage parameters may define how the fuel is to be used during the mission defined by the mission description. The one or more fuel usage parameters may include any one or more of:
- i) a blending schedule according to which fuel from the first fuel source and the second fuel source is blended by the fuel delivery regulator;
- ii) a switching schedule according to which the fuel delivery regulator is configured to switch between delivery of fuel from the first fuel source and the second fuel source;
- iii) an allocation of fuel tanks provided in the aircraft to form the first fuel source and the second fuel source; and/or
- iv) an isolation valve setting for fuel tanks forming the first fuel source and the second fuel source.

The optimised set of one or more fuel characteristics may be further determined based on any one or more of:
- i) the achievable range of fuel characteristics that can be provided by the fuel delivery regulator;
- ii) a total quantity of a non-default fuel allocated to the mission;
- iii) a total fuel requirement for the mission;

iv) the capacities of the fuel tanks of the aircraft; and/or v) restrictions on how the aircraft fuel tanks can be allocated to the first or the second fuel source.

Calculating the optimised set of one or more fuel characteristics may comprise minimising a cost function dependent on the one or more nvPM impact parameters.

The one or more nvPM impact parameters may include any one or more of i) height above ground level at which the nvPM production takes place;

ii) location of the nvPM production;

iii) weather and/or atmospheric conditions at a location of the nvPM production;

iv) climate impacts associated with location of the nvPM production;

v) mass/size of individual nvPM particles produced;

vi) potential contrail production and/or contrail characteristics;

vii) local air quality (LAQ) impact of nvPM production; and/or viii) amount of nvPM produced (e.g. mass and/or number).

According to a sixteenth aspect, there is provided a method of loading fuel onto an aircraft, comprising:

determining a fuel allocation using the method of the fifteenth aspect and optionally any one or more of the associated statements above; and loading fuel onto the aircraft according to the fuel allocation.

According to a seventeenth aspect, there is provided a non-transitory computer readable medium having stored thereon instructions that, when executed by a processor, cause the processor to perform the method of the fifteenth aspect and optionally any one or more of the associated statements above.

According to an eighteenth aspect, there is provided a fuel allocation determination system for determining a fuel allocation for an aircraft, the fuel allocation determination system comprising a computing device configured to perform the method of the fifteenth aspect and optionally any one or more of the associated statements above.

According to a nineteenth aspect, there is provided a fuel allocation determination system for determining a fuel allocation for an aircraft, wherein:

the aircraft comprises a first fuel source adapted to contain a first fuel having a first fuel characteristic and a second fuel source adapted to contain a second fuel having a second fuel characteristic, the second fuel characteristic being different from the first;

the aircraft comprises one or more gas turbine engines powered by fuel from the first and second fuel sources;

the one or more gas turbine engines each comprise a staged combustion system having pilot fuel injectors and main fuel injectors, the staged combustion system being operable in a pilot-only range of operation and a pilot-and-main range of operation;

the one or more gas turbine engines each comprise a fuel delivery regulator arranged to control delivery of fuel to the pilot and main fuel injectors from the first fuel source and the second fuel source, the fuel loading parameter determination system comprising:

a mission description obtaining module configured to obtain a proposed mission description comprising a list of operating conditions for the one or more gas turbine engines during the mission;

an impact parameter obtaining module configured to obtain nvPM impact parameters for the one or more gas turbine engines, the impact parameters being associated with each operating point of the proposed mission using compositions of fuel which include fuel from the first fuel source, fuel from the second fuel source, or a blend thereof;

a fuel characteristic calculating module configured to calculate an optimised set of one or more fuel characteristics for each operating point of the proposed mission defined in the mission description based on the nvPM impact parameters; and a fuel allocation determining module configured to determine a fuel allocation based on the optimised set of one or more fuel characteristics.

The first fuel characteristic may be associated with a level of nvPM production which is less than that of the second fuel characteristic.

Additionally or alternatively, the first fuel characteristic and the second fuel characteristic may be a percentage of SAF present in the respective fuel.

Each of the operating points of the mission description obtained by the mission description obtaining module may include any one or more of one or more operating conditions in which the gas turbine engines are to operate, one or more fuel flow rate values corresponding to an operating point, and/or a time duration of operation at a corresponding operating point.

The nvPM impact parameters obtained by the impact parameter obtaining module may include an nvPM impact parameter defining an amount of nvPM produced by the gas turbine engines for different respective fuel characteristics comprising the first fuel, the second fuel, or a blend thereof at each operating point of the mission description.

The fuel allocation determined by the fuel allocation determining module may include any one or more of:

i) an amount of fuel allocated to each of the first and second fuel sources;

ii) the first fuel characteristic;

iii) the second fuel characteristic; and/or iv) a fuel mixing ratio.

The fuel allocation determination system may further comprise a fuel usage parameter determining module configured to determine one or more fuel usage parameters corresponding to the fuel allocation, the fuel usage parameters defining how the fuel is to be used during the mission defined by the mission description.

The one or more fuel usage parameters may optionally include any one or more of:

i) a blending schedule according to which fuel from the first fuel source and the second fuel source is blended by the fuel delivery regulator;

ii) a switching schedule according to which the fuel delivery regulator is configured to switch between delivery of fuel from the first fuel source and the second fuel source;

iii) an allocation of fuel tanks provided in the aircraft to form the first fuel source and the second fuel source; and/or iv) an isolation valve setting for fuel tanks forming the first fuel source and the second fuel source.

The optimised set of one or more fuel characteristics determined by the fuel characteristic calculating module may be further determined based on any one or more of:

i) the achievable range of fuel characteristics that can be provided by the fuel delivery regulator;

ii) a total quantity of a non-default fuel allocated to the mission;
iii) a total fuel requirement for the mission;
iv) the capacities of the fuel tanks of the aircraft; and/or
v) restrictions on how the aircraft fuel tanks can be allocated to the first or the second fuel source.

The fuel characteristic calculating module may be configured to calculate the optimised set of one or more fuel characteristics by minimising a cost function dependent on the one or more nvPM impact parameters.

The one or more nvPM impact parameters may include any one or more of
i) height above ground level at which the nvPM production takes place;
ii) location of the nvPM production;
iii) weather and/or atmospheric conditions at a location of the nvPM production;
iv) climate impacts associated with location of the nvPM production;
v) mass of the nvPM particles produced;
vi) potential contrail production and/or contrail characteristics;
vii) local air quality (LAQ) impact of nvPM production; and/or
viii) amount of nvPM produced (e.g. mass/number).

According to a twentieth aspect, there is provided an aircraft comprising:
a first fuel source adapted to contain a first fuel having a first fuel characteristic and a second fuel source adapted to contain a second fuel having a second fuel characteristic, the second fuel characteristic being different from the first;
one or more gas turbine engines powered by fuel from the first and second fuel sources, wherein:
the one or more gas turbine engines each comprise a staged combustion system having pilot fuel injectors and main fuel injectors, the staged combustion system being operable in a pilot-only range of operation and a pilot-and-main range of operation;
the one or more gas turbine engines each comprise a fuel delivery regulator arranged to control delivery of fuel to the pilot and main fuel injectors from the first fuel source, the second fuel source, or a blend thereof; and
a fuel allocation determination system according to the eighteenth or nineteenth aspect and optionally any one or more of the associated statements above.

According to a twenty first aspect, there is provided a computer implemented method of determining a fleetwide fuel allocation for a plurality of missions carried out by a plurality of aircraft, the plurality of missions being supplied with fuel from a fuel source comprising an amount of a default fuel and an amount of a non-default fuel, the fuel allocation indicating the amount of the non-default fuel and the default fuel to be allocated to each of the plurality of missions, the default fuel and the non-default fuel having one or more fuel characteristics different from each other, the method comprising:
obtaining an initial proposed fuel allocation for each of the plurality of missions;
performing a fleet-wide optimisation in which the proposed fuel allocation of each of the plurality of missions is modified within the constraints of the total available default and/or non-default fuel from the fuel source to minimise a sum of per-mission nvPM impact parameters over all of the plurality of missions, each of the plurality of missions being associated with a respective per-mission nvPM impact parameter determined according to a fuel usage for that mission, the fuel usage defining how the fuel allocation for the respective mission is to be used during that mission; and
determining the fleetwide fuel allocation for the plurality of missions based on the fleet-wide optimisation.

The inventors have determined that available fuel for a plurality of missions can be intelligently shared between those missions to make advantageous use of different types of fuel available. This may allow fuel of which there is less available to be shared between the missions in order to use it more effectively e.g. such that the overall nvPM impact of the missions is reduced.

The non-default fuel may be associated with a level of nvPM production which is less than that of the default fuel.

The non-default fuel may be formed from a mixture of a first fuel having a first fuel characteristic and a second fuel having a second fuel characteristic, different from the first.

The first and second fuel characteristics may be a percentage of SAF within the respective fuel. The non-default fuel may be a SAF-rich fuel and the default fuel may be a relatively SAF-poor fuel (i.e. having a lower SAF content compared to the SAF rich fuel).

Performing the fleet-wide optimisation may comprise:
i) performing an outer-loop optimisation in which the fuel allocation of one or more of the plurality of missions is varied to reduce the sum of the per-mission nvPM impact parameters of the plurality of missions; and
ii) performing an inner-loop optimisation in which the fuel usage for each of the plurality of missions is obtained according to the constraints of the varied fuel allocation to determine a new proposed fuel usage for each of the plurality of missions.

Steps i) and ii) may be repeated until an optimised fuel usage for each of the plurality of missions is determined which corresponds to a minimised sum of the per-mission nvPM impact parameters.

The inner-loop optimisation may comprise obtaining a pre-prepared solution for the fuel usage for a respective mission.

The proposed fuel allocation for each of the plurality of missions may be obtained by obtaining an optimised fuel usage for the respective mission defining how the fuel is to be used to minimise the per-mission nvPM impact parameter for that mission.

The optimised fuel usage for each mission may be obtained by performing a per-mission optimisation.

The per-mission optimisation may comprise, for each respective mission:
determining a type and/or operational capabilities of a combustor used by the respective aircraft used for the mission;
determining a total fuel requirement for the respective mission;
determining an amount of fuel required for each type of fuel injector provided in the combustor for the respective mission where more than one type of injector is provided;
determining the dependence of nvPM emissions for each engine operating point of the mission using fuel having the characteristics of the default fuel, non-default fuel, or a mixture thereof; and
determining an optimised fuel usage which minimises the total nvPM emissions for the respective mission.

Determining a type of combustor used by the aircraft may comprise determining whether the aircraft comprises a lean-burn staged combustor or a rich-burn combustor.

If the combustor is a lean-burn staged combustor having pilot and main fuel injectors, determining an amount of fuel required for each type of fuel injector may comprise:
 a) determining an amount of fuel required for the pilot injectors during pilot-and-main operation; and/or
 b) determining an amount of fuel required for the pilot fuel injectors during pilot-only operation; and/or
 c) determining an amount of fuel required for the pilot fuel injectors operating within a threshold range of the operation at fuel flow rates below that of the staging point.

The fleet-wide optimisation may be based on:
 a percentage of a first fuel having a first fuel characteristic within the default fuel defining the lowest possible percentage of fuel having the first fuel characteristic which can be used for combustion; and/or
 a percentage of the first fuel having the first fuel characteristic within the non-default fuel defining the highest possible percentage of fuel having the first fuel characteristic which can be used for combustion; and/or
 the quantity of non-default fuel available for the plurality of missions.

According to a twenty second aspect, there is provided a method of loading fuel onto a plurality of aircraft carrying out a plurality of missions, the plurality of missions being supplied with fuel from a fuel source comprising an amount of a default fuel and an amount of a non-default fuel, the method comprising:
 determining fuel allocation for the plurality of missions using the method of the twenty first aspect and optionally any one or more of the associated statements above; and
 loading fuel onto the plurality of aircraft according to the fuel allocation.

According to a twenty third aspect, there is provided a non-transitory computer readable medium having stored thereon instructions that, when executed by a processor, cause the processor to perform the method of the twenty first aspect and optionally any one or more of the associated statements above.

According to a twenty fourth aspect, there is provided a fleetwide fuel allocation determination system for determining a fleet fuel allocation for a plurality of missions, the fleetwide fuel allocation determination system comprising a computing device configured to perform the method of the twenty first aspect and optionally any one or more of the associated statements above.

According to a twenty fifth aspect, there is provided a fleetwide fuel allocation determination system for determining a fuel allocation for a plurality of missions carried out by a plurality of aircraft, the plurality of missions being supplied with fuel from a fuel source comprising an amount of a default fuel and an amount of a non-default fuel, the fuel allocation indicating the amount of the non-default fuel and the default fuel to be allocated to each of the plurality of missions, the default fuel and the non-default fuel having one or more fuel characteristics different from each other, the system comprising:
 an initial proposed fuel allocation obtaining module configured to obtain an initial proposed fuel allocation for each of the plurality of missions;
 a fleetwide optimisation module configured to perform a fleet-wide optimisation in which the proposed fuel allocation of each of the plurality of missions is modified within the constraints of the total available default and/or non-default fuel from the fuel source to minimise a sum of per-mission nvPM impact parameters over all of the plurality of missions, each of the plurality of missions being associated with a respective per-mission nvPM impact parameter determined according to a proposed fuel usage for that mission, the fuel usage defining how the fuel allocation for the respective mission is to be used during that mission; and
 a fleetwide fuel allocation determination module configured to determine the fleetwide fuel allocation for the plurality of missions based on the fleet-wide optimisation.

The non-default fuel may be associated with a level of nvPM production which is less than that of the default fuel.

The non-default fuel may be formed from a mixture of a first fuel having a first fuel characteristic and a second fuel having a second fuel characteristic, different from the first.

The first and second fuel characteristics may be a percentage of SAF within the respective fuel, and wherein the non-default fuel is a SAF-rich fuel and the default fuel may be a relatively SAF-poor fuel.

The fleetwide optimisation module may be configured to perform the following steps:
 i) perform an outer-loop optimisation in which the fuel allocation of one or more of the plurality of missions is varied to reduce the sum of the per-mission nvPM impact parameters of the plurality of missions; and
 ii) perform an inner-loop optimisation in which the fuel usage for each of the plurality missions is obtained according to the constraints of the varied fuel allocation to determine a new proposed fuel usage for each of the plurality of missions.

The fleetwide optimisation module may be configured to repeat steps i) and ii) until an optimised fuel usage for each of the plurality of missions is determined which corresponds to a minimised sum of the per-mission nvPM impact parameters.

The fleetwide optimisation module may be configured to perform the inner-loop optimisation by obtaining a pre-prepared solution for the fuel usage for a respective mission.

The fleetwide optimisation module may be configured to obtain the proposed fuel allocation for each of the plurality of missions by obtaining an optimised fuel usage for the respective mission defining how the fuel is to be used in order to minimise the per-mission nvPM impact parameter for that mission.

The fleetwide optimisation module may be configured to obtain the optimised fuel usage for each mission by performing a per-mission optimisation, the per-mission optimisation optionally comprising, for each respective mission:
 determining a type and/or operational capabilities of a combustor used by the respective aircraft used for the mission;
 determining a total fuel requirement for the respective mission;
 determining an amount of fuel required for each type of fuel injector provided in the combustor for the respective mission where more than one type of injector is provided;
 determining the dependence of nvPM emissions for each mission engine operating point of the mission using fuel having the characteristics of the default fuel, non-default fuel, or a mixture thereof; and
 determining an optimised fuel usage which minimises the total nvPM emissions for the respective mission.

Determining a type of combustor used by the aircraft may comprise determining whether the aircraft comprises a lean-burn staged combustor or a rich-burn combustor.

If the combustor is a lean-burn staged combustor having pilot and main fuel injectors, determining an amount of fuel required for each type of fuel injector may comprise:
- determining an amount of fuel required for the pilot fuel injectors during pilot-and-main operation; and/or
- determining an amount of fuel required for the pilot fuel injectors during pilot-only operation; and/or
- determining an amount of fuel required for the pilot fuel injectors operating within a threshold range of the operation at fuel flow rates below that of the staging point.

The fleetwide optimisation module may be configured to base the fleetwide optimisation on:
- a percentage of a first fuel having a first fuel characteristic within the default fuel defining the lowest possible percentage of fuel having the first fuel characteristic which can be used for combustion; and/or
- a percentage of the first fuel having the first fuel characteristic within the non-default fuel defining the highest possible percentage of fuel having the first fuel characteristic which can be used for combustion; and/or
- the quantity of non-default fuel available for the plurality of missions.

The present disclosure may apply to any relevant configuration of gas turbine engine. Such a gas turbine engine may be, for example, a turbofan gas turbine engine, an open rotor gas turbine engine (in which the propeller is not surrounded by a nacelle), a turboprop engine or a turbojet engine. Any such engine may or may not be provided with an afterburner.

A gas turbine engine in accordance with any aspect of the present disclosure may comprise an engine core comprising a turbine, a combustor, a compressor, and a core shaft connecting the turbine to the compressor. Such a gas turbine engine may comprise a fan (having fan blades). Such a fan may be located upstream of the engine core. Alternatively, in some examples, the gas turbine engine may comprise a fan located downstream of the engine core, for example where the gas turbine engine is an open rotor or a turboprop engine (in which case the fan may be referred to as a propeller).

Where the gas turbine engine is an open rotor or a turboprop engine, the gas turbine engine may comprise two contra-rotating propeller stages attached to and driven by a free power turbine via a shaft. The propellers may rotate in opposite senses so that one rotates clockwise and the other anti-clockwise around the engine's rotational axis. Alternatively, the gas turbine engine may comprise a propeller stage and a guide vane stage configured downstream of the propeller stage. The guide vane stage may be of variable pitch. Accordingly, high-pressure, intermediate pressure, and free power turbines respectively may drive high and intermediate pressure compressors and propellers by suitable interconnecting shafts. Thus, the propellers may provide the majority of the propulsive thrust.

Where the gas turbine engine is an open rotor or a turboprop engine, one or more of the propeller stages may be driven by a gearbox. The gearbox may be of the type described herein.

An engine according to the present disclosure may be a turbofan engine. Such an engine may be a direct-drive turbofan engine in which the fan is directly connected to the fan drive turbine, for example without a gearbox. In such a direct-drive turbofan engine, the fan may be said to rotate at the same rotational speed as the fan-drive turbine.

An engine according to the present disclosure may be a geared turbofan engine. In such an arrangement, the engine has a fan that is driven via a gearbox. Accordingly, such a gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. Such a gearbox may be a single stage. Alternatively, such a gearbox may be a compound gearbox, for example a compound planetary gearbox (which may have the input on the sun gear and the output on the ring gear, and thus be referred to as a "compound star" gearbox), for example having two stages of reduction.

The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a reduction ratio in the range of from 3.1 or 3.2 to 3.8. Purely by way of further example, the gearbox may be a "star" gearbox having a reduction ratio in the range 3.0 to 3.1. Purely by way of further example, the gearbox may be a "planetary" gearbox having a reduction ratio in the range 3.6 to 4.2. In some arrangements, the gear ratio may be outside these ranges.

In any gas turbine engine as described and/or claimed herein, fuel of a given composition or blend is provided to a combustor, which may be provided downstream of the fan and compressor(s) with respect to the flowpath (for example axially downstream). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other. For example, the gas turbine engine may be a direct-drive turbofan gas turbine engine comprising 13 or 14 compressor stages (in addition to the fan). Such an engine may, for example, comprise 3 stages in the first (or "low pressure") compressor and either 10 or 11 stages in the second (or "high pressure") compressor. By way of further example, the gas turbine engine may be a "geared" gas turbine engine (in which the fan is drive by a first core shaft via a reduction gearbox) comprising 11, 12 or 13 compressor stages (in addition to the fan). Such an engine may comprise 3 or 4 stages in the first (or "low pressure") compressor and 8 or 9 stages in the second (or "high pressure") compressor. By way of further example, the gas turbine engine may be a "geared" gas turbine engine having 4 stages in the first (or "low pressure") compressor and 10 stages in the second (or "high pressure") compressor.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other. The second (or "high pressure") turbine may comprise 2 stages in any arrangement (for example regardless of whether it is a geared or direct-drive engine). The gas turbine engine may be a direct-drive gas turbine engine comprising a first (or "low pressure") turbine having 5, 6 or 7 stages. Alternatively, the gas turbine engine may be a "geared" gas turbine engine comprising a first (or "low pressure") turbine having 3 or 4 stages.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32 or 0.29 to 0.30. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 140 cm, 170 cm, 180 cm, 190 cm, 200 cm, 210 cm, 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm. Purely by way of non-limitative example, the fan diameter may be in the range of from 170 cm to 180 cm, 190 cm to 200 cm, 200 cm to 210 cm, 210 cm to 230 cm, 290 cm to 300 cm or 340 cm to 380 cm.

The rotational speed of the fan may vary in use. Generally, the rotational speed is lower for fans with a higher diameter. Purely by way of non-limitative example, the rotational speed of the fan at cruise conditions may be less than 3500 rpm, for example less than 2500 rpm, for example less than 2300 rpm. Purely by way of further non-limitative example, the rotational speed of the fan at cruise conditions for an "geared" gas turbine engine having a fan diameter in the range of from 200 cm to 210 cm may be in the range of from 2750 to 2900 rpm. Purely by way of further non-limitative example, the rotational speed of the fan at cruise conditions for an "geared" gas turbine engine having a fan diameter in the range of from 210 cm to 230 cm may be in the range of from 2500 to 2800 rpm. Purely by way of further non-limitative example, the rotational speed of the fan at cruise conditions for an "geared" gas turbine engine having a fan diameter in the range of from 340 cm to 360 cm may be in the range of from 1500 to 1800 rpm. Purely by way of further non-limitative example, the rotational speed of the fan at cruise conditions for a direct drive engine having a fan diameter in the range of from 190 cm to 200 cm may be in the range of from 3600 to 3900 rpm. Purely by way of further non-limitative example, the rotational speed of the fan at cruise conditions for a direct drive engine having a fan diameter in the range of from 300 cm to 340 cm may be in the range of from 2000 to 2800 rpm.

In use of the gas turbine engine, the fan (with associated fan blades) rotates about a rotational axis. This rotation results in the tip of the fan blade moving with a velocity $U_{tip}$. The work done by the fan blades 23 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all values being dimensionless). The fan tip loading may be in an inclusive range bounded by any two of the values in the previous sentence (i.e. the values may form upper or lower bounds), for example in the range of from 0.28 to 0.31, or 0.29 to 0.3 (for example for a geared gas turbine engine).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 9, 9.5, 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of from 12 to 16, 13 to 15, or 13 to 14. Purely by way of non-limitative example, the bypass ratio of a direct-drive gas turbine engine according to the present disclosure may be in the range of from 9:1 to 11:1. Purely by way of further non-limitative example, the bypass ratio of a geared gas turbine engine according to the present disclosure may be in the range of from 12:1 to 15:1 The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure at the exit of the highest pressure compressor (before entry into the combustor) to the stagnation pressure upstream of the fan. By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70. Purely by way of non-limitative example, the overall pressure ratio at cruise conditions of a geared gas turbine engine having a fan diameter in the range of from 200 cm to 210 cm may be in the range of from 40 to 45. Purely by way of non-limitative example, the overall pressure ratio at cruise conditions of a geared gas turbine engine having a fan diameter in the range of from 210 cm to 230 cm may be in the range of from 45 to 55. Purely by way of non-limitative example, the overall pressure ratio at cruise conditions of a geared gas turbine engine having a fan diameter in the range of from 340 cm to 380 cm may be in the range of from 50 to 60. Purely by way of non-limitative example, the overall pressure ratio at cruise conditions of a direct-drive gas turbine engine having a fan diameter in the range of from 300 cm to 340 cm may be in the range of from 50 to 60.

Specific thrust of an engine may be defined as the net thrust of the engine divided by the total mass flow through the engine. In some examples, specific thrust may depend, for a given thrust condition, upon the specific composition of fuel provided to the combustor. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines. Purely by way of non-limitative example, the specific thrust of a geared gas turbine engine having a fan diameter in the range of from 200 cm to 210 cm may be in the range of from 90 $Nkg^{-1}s$ to 95 $Nkg^{-1}s$. Purely by way of non-limitative example, the specific thrust of a geared gas turbine engine having a fan diameter in the range of from 210 cm to 230 cm may be in the range of from 80 $Nkg^{-1}s$ to 90 $Nkg^{-1}s$. Purely by way of non-limitative example, the specific thrust of a geared gas turbine engine having a fan diameter in the range of from 340 cm to 360 cm may be in the range of from 70 $Nkg^{-1}s$ to 90 $Nkg^{-1}s$. Purely by way of non-limitative example, the specific thrust of a direct drive gas turbine engine having a fan diameter in the range of from 300 cm to 340 cm may be in the range of from 90 $Nkg^{-1}s$ to 120 $Nkg^{-1}s$.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 100 kN, 110 kN, 120 kN, 130 kN, 140 kN, 150 kN, 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of non-limitative example, a gas turbine as described and/or claimed herein may be capable of producing a maximum thrust in the range of from 330 kN to 420 kN, for example 350 kN to 400 kN. Purely by way of non-limitative example, the maximum thrust of a geared gas turbine engine having a fan diameter in the range of from 200 cm to 210 cm may be in the range of from 140 kN to 160 kN. Purely by way of non-limitative example, the maximum thrust of a geared gas turbine engine having a fan diameter in the range of from 210 cm to 230 cm may be in the range of from 150 kN to 200 kN. Purely by way of non-limitative example, the maximum thrust of a geared gas turbine engine having a fan diameter in the range of from 340 cm to 360 cm may be in the range of from 370 kN to 500 kN. Purely by way of non-limitative example, the maximum thrust of a direct drive gas turbine engine having a fan diameter in the range of from 300 cm to 340 cm may be in the range of from 370 kN to 500 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. In some examples, TET may depend, for a given thrust condition, upon the specific composition of fuel provided to the combustor. At cruise, the TET may be at least (or on the order of) any of the following: 1400K, 1450K, 1500K, 1550K, 1600K or 1650K. Thus, purely by way of non-limitative example, the TET at cruise of a geared gas turbine engine having a fan diameter in the range of from 200 cm to 210 cm may be in the range of from 1540K to 1600K. Purely by way of non-limitative example, the TET at cruise of a geared gas turbine engine having a fan diameter in the range of from 210 cm to 230 cm may be in the range of from 1590K to 1650K. Purely by way of non-limitative example, the TET at cruise of a geared gas turbine engine having a fan diameter in the range of from 340 cm to 360 cm may be in the range of from 1600K to 1660K. Purely by way of non-limitative example, the TET at cruise of a direct drive gas turbine engine having a fan diameter in the range of from 300 cm to 340 cm may be in the range of from 1590K to 1650K. Purely by way of non-limitative example, the TET at cruise of a direct drive gas turbine engine having a fan diameter in the range of from 300 cm to 340 cm may be in the range of from 1570K to 1630K.

The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K, 2000K, 2050K, or 2100K. Thus, purely by way of non-limitative example, the maximum TET of a geared gas turbine engine having a fan diameter in the range of from 200 cm to 210 cm may be in the range of from 1890K to 1960K. Purely by way of non-limitative example, the maximum TET of a geared gas turbine engine having a fan diameter in the range of from 210 cm to 230 cm may be in the range of from 1890K to 1960K. Purely by way of non-limitative example, the maximum TET of a geared gas turbine engine having a fan diameter in the range of from 340 cm to 360 cm may be in the range of from 1890K to 1960K. Purely by way of non-limitative example, the maximum TET of a direct drive gas turbine engine having a fan diameter in the range of from 300 cm to 340 cm may be in the range of from 1935K to 1995K. Purely by way of non-limitative example, the maximum TET of a direct drive gas turbine engine having a fan diameter in the range of from 300 cm to 340 cm may be in the range of from 1890K to 1950K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre composite. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades. Where the fan blades have a carbon fibre composite body, there may be 16 or 18 fan blades. Where the fan blades have a metallic body (for example aluminium-lithium or titanium-alloy), there may be 18, 20 or 22 fan blades.

As used herein, the terms idle, taxi, take-off, climb, cruise, descent, approach, and landing have the conventional meaning and would be readily understood by the skilled person. Thus, for a given gas turbine engine for an aircraft, the skilled person would immediately recognise each term to refer to an operating phase of the engine within a given mission of an aircraft to which the gas turbine engine is designed to be attached.

In this regard, ground idle may refer to an operating phase of the engine where the aircraft is stationary and in contact with the ground, but where there is a requirement for the engine to be running. During idle, the engine may be producing between 3% and 9% of the available thrust of the engine. In further non-limitative examples, the engine may be producing between 5% and 8% of available thrust. In further non-limitative examples, the engine may be producing between 6% and 7% of available thrust. Taxi may refer to an operating phase of the engine where the aircraft is being propelled along the ground by the thrust produced by the engine. During taxi, the engine may be producing between 5% and 15% of available thrust. In further non-limitative examples, the engine may be producing between 6% and 12% of available thrust. In further non-limitative examples, the engine may be producing between 7% and 10% of available thrust. Take-off may refer to an operating phase of the engine where the aircraft is being propelled by the thrust produced by the engine. At an initial stage within the take-off phase, the aircraft may be propelled whilst the aircraft is in contact with the ground. At a later stage within the take-off phase, the aircraft may be propelled whilst the aircraft is not in contact with the ground. During take-off, the engine may be producing between 90% and 100% of available thrust. In further non-limitative examples, the engine may be producing between 95% and 100% of available thrust. In further non-limitative examples, the engine may be producing 100% of available thrust.

Climb may refer to an operating phase of the engine where the aircraft is being propelled by the thrust produced by the engine. During climb, the engine may be producing between 75% and 100% of available thrust. In further non-limitative examples, the engine may be producing between 80% and 95% of available thrust. In further non-limitative examples, the engine may be producing between 85% and 90% of available thrust. In this regard, climb may refer to an operating phase within an aircraft flight cycle between take-off and the arrival at cruise conditions. Additionally or alternatively, climb may refer to a nominal point in an aircraft flight cycle between take-off and landing, where a relative increase in altitude is required, which may require an additional thrust demand of the engine.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

Furthermore, the skilled person would immediately recognise either or both of descent and approach to refer to an operating phase within an aircraft flight cycle between cruise and landing of the aircraft. During either or both of descent and approach, the engine may be producing between 20% and 50% of available thrust. In further non-limitative examples, the engine may be producing between 25% and 40% of available thrust. In further non-limitative examples, the engine may be producing between 30% and 35% of available thrust. Additionally or alternatively, descent may refer to a nominal point in an aircraft flight cycle between take-off and landing, where a relative decrease in altitude is required, and which may require a reduced thrust demand of the engine.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at any suitable condition, which may be as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at any suitable condition, for example the mid-cruise of the aircraft, as defined elsewhere herein.

The skilled person will appreciate that except where mutually exclusive, a feature or parameter described in relation to any one of the above aspects may be applied to any other aspect.

Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Figure 1:
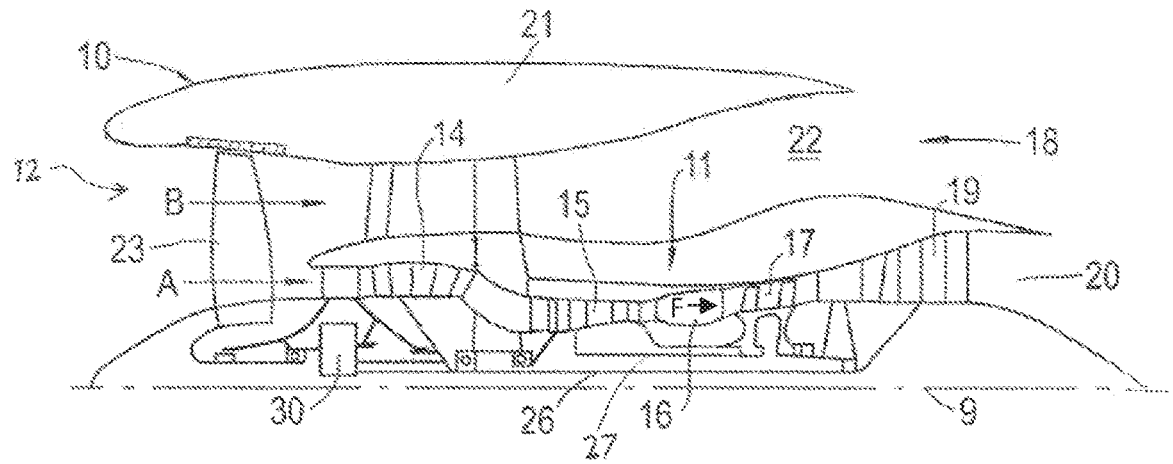
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel F and the mixture is combusted. The combustion equipment 16 may be referred to as the combustor 16, with the terms "combustion equipment 16" and "combustor 16" used interchangeably herein. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
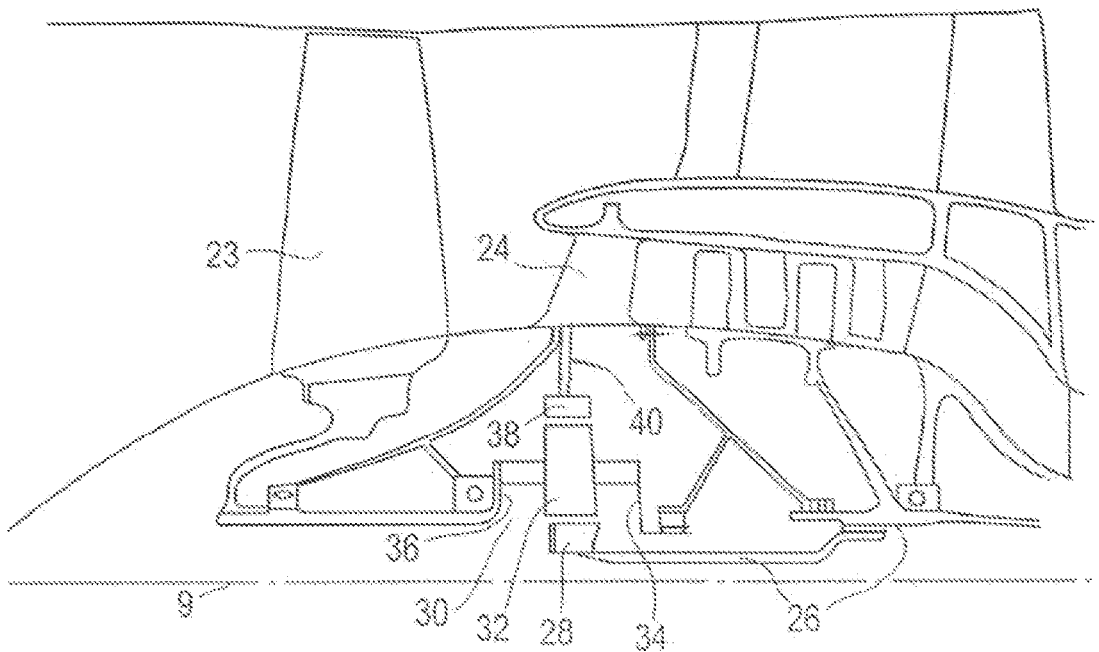
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
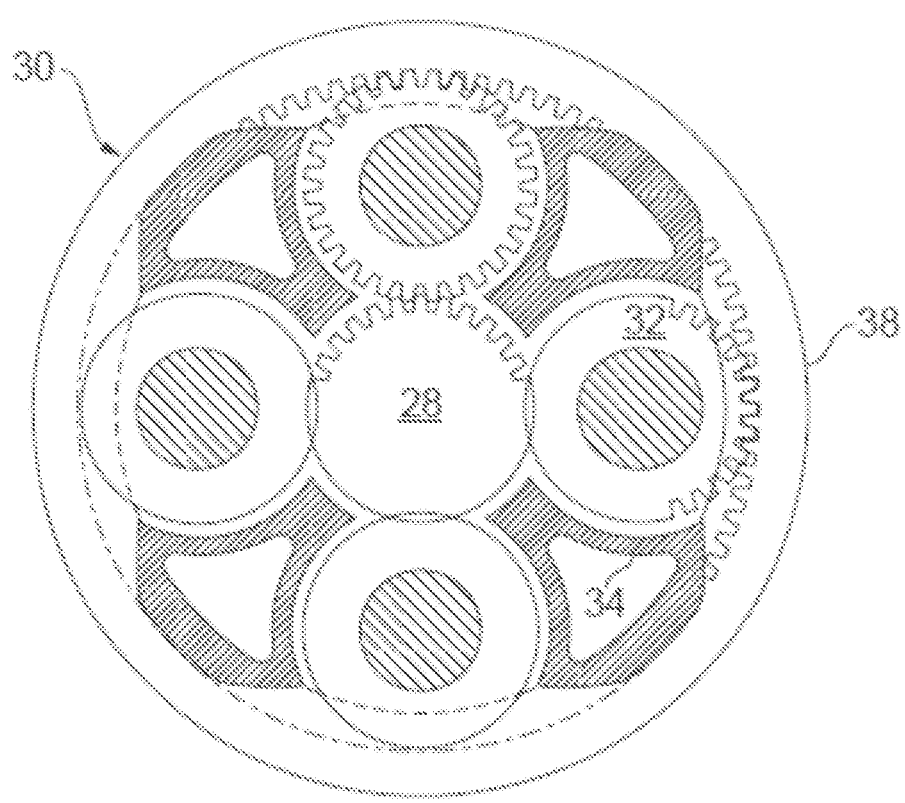
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area.

Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

The fuel F provided to the combustion equipment 16 may comprise a fossil-based hydrocarbon fuel, such as Kerosene. Thus, the fuel F may comprise molecules from one or more of the chemical families of n-alkanes, iso-alkanes, cycloalkanes, and aromatics. Additionally or alternatively, the fuel F may comprise renewable hydrocarbons produced from biological or non-biological resources, otherwise known as sustainable aviation fuel (SAF). In each of the provided examples, the fuel F may comprise one or more trace elements including, for example, sulphur, nitrogen, oxygen, inorganics, and metals.

Functional performance of a given composition, or blend of fuel for use in a given mission, may be defined, at least in part, by the ability of the fuel to service the Brayton cycle of the gas turbine engine 10. Parameters defining functional performance may include, for example, specific energy; energy density; thermal stability; and, emissions including particulate matter. A relatively higher specific energy (i.e. energy per unit mass), expressed as MJ/kg, may at least partially reduce take-off weight, thus potentially providing a relative improvement in fuel efficiency. A relatively higher energy density (i.e. energy per unit volume), expressed as MJ/L, may at least partially reduce take-off fuel volume, which may be particularly important for volume-limited missions or military operations involving refueling. A relatively higher thermal stability (i.e. inhibition of fuel to degrade or coke under thermal stress) may permit the fuel to sustain elevated temperatures in the engine and fuel injectors, thus potentially providing relative improvements in combustion efficiency. Reduced emissions, including particulate matter, may permit reduced contrail formation, whilst reducing the environmental impact of a given mission. Other properties of the fuel may also be key to functional performance. For example, a relatively lower freeze point (° C.) may allow long-range missions to optimise flight profiles; minimum aromatic concentrations (%) may ensure sufficient swelling of certain materials used in the construction of o-rings and seals that have been previously exposed to fuels with high aromatic contents; and, a maximum surface tension (mN/m) may ensure sufficient spray break-up and atomisation of the fuel.

The ratio of the number of hydrogen atoms to the number of carbon atoms in a molecule may influence the specific energy of a given composition, or blend of fuel. Fuels with higher ratios of hydrogen atoms to carbon atoms may have higher specific energies in the absence of bond strain. For example, fossil-based hydrocarbon fuels may comprise molecules with approximately 7 to 18 carbons, with a significant portion of a given composition stemming from molecules with 9 to 15 carbons, with an average of 12 carbons.

A number of sustainable aviation fuel blends have been approved for use, comprising between 10% and 50% sustainable aviation fuel (the remainder comprising one or more fossil-based hydrocarbon fuels, such as Kerosene), with further compositions awaiting approval. However, there is an anticipation in the aviation industry that sustainable aviation fuel blends comprising up to (and including) 100% sustainable aviation fuel (SAF) will be eventually approved for use.

Sustainable aviation fuels may comprise one or more of n-alkanes, iso-alkanes, cyclo-alkanes, and aromatics, and may be produced, for example, from one or more of synthesis gas (syngas); lipids (e.g. fats, oils, and greases); sugars; and alcohols. Thus, sustainable aviation fuels may comprise either or both of a lower aromatic and sulphur content, relative to fossil-based hydrocarbon fuels. Additionally or alternatively, sustainable aviation fuels may comprise either or both of a higher iso-alkane and cyclo-alkane content, relative to fossil-based hydrocarbon fuels. Thus, in some examples, sustainable aviation fuels may comprise either or both of a density of between 90% and 98% that of kerosene and a calorific value of between 101% and 105% that of kerosene.

Owing at least in part to the molecular structure of sustainable aviation fuels, sustainable aviation fuels may provide benefits including, for example, one or more of a higher specific energy (despite, in some examples, a lower energy density); higher specific heat capacity; higher thermal stability; higher lubricity; lower viscosity; lower surface tension; lower freeze point; lower soot emissions; and, lower $CO_2$ emissions, relative to fossil-based hydrocarbon fuels (e.g. when combusted in the combustion equipment 16). Accordingly, relative to fossil-based hydrocarbon fuels, such as Kerosene, sustainable aviation fuels may lead to either or both of a relative decrease in specific fuel consumption, and a relative decrease in maintenance costs.

Aircraft Fuel System and Fuel Characterises

Figure 4:
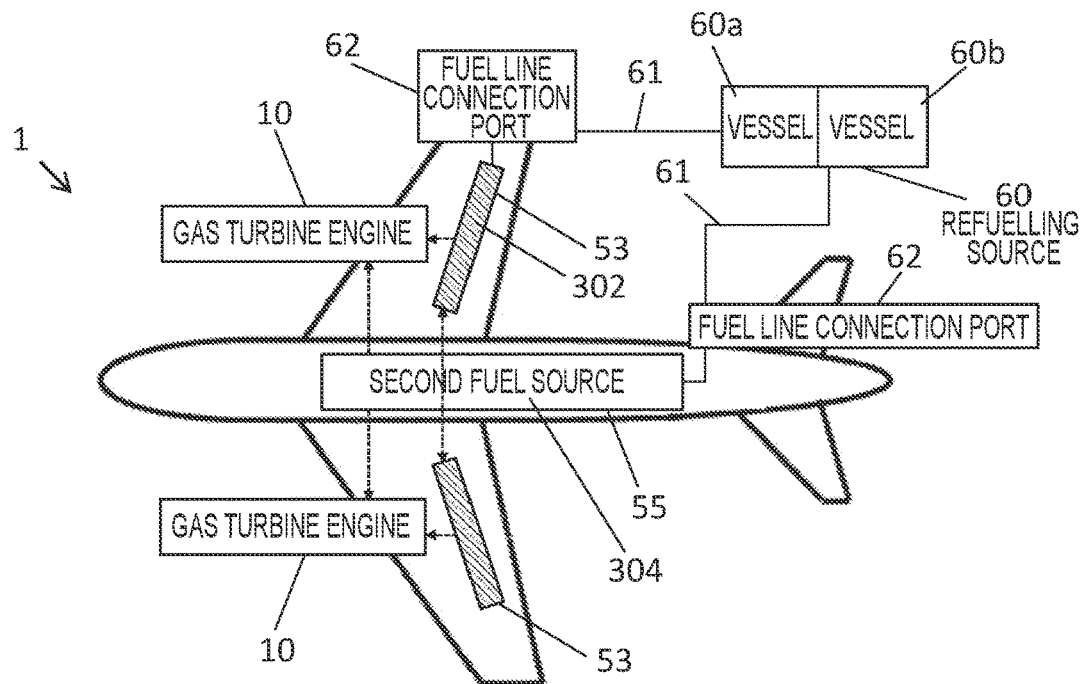
FIG. 4 is a schematic view of an aircraft having two fuel sources.

An aircraft 1 comprising two gas turbine engines 10 according to any of the examples described herein is illustrated in FIG. 4. In this example, the aircraft 1 comprises two gas turbine engines 10, but in other examples may comprise one or more gas turbine engines. The aircraft 1 further comprises an aircraft fuel system located on board the aircraft which is suitable for suppling fuel F to each of the gas turbine engines 10 to be burnt in the engine combustion equipment 16 as described above. The aircraft fuel system is arranged to provide fuel to an engine fuel system provided on each of the gas turbine engines 10. The engine fuel system and aircraft fuel system together form the fuel supply system of the aircraft 1.

The aircraft fuel system comprises two fuel sources, a first fuel source 302 and a second fuel source 304 (given different shading in FIG. 4). For the purposes of the present application the term "fuel source" is understood to mean either 1) a single fuel tank or 2) a plurality of fuel tanks which may or may not be fluidly interconnected. Each of the fuel sources are arranged to provide separate sources of fuel i.e. the first fuel source may contain a first fuel having a different characteristic or characteristics to a second fuel contained in the second fuel source. The first and second fuel sources are therefore not fluidly coupled to each other so as to separate the different fuels (at least under normal running conditions as discussed elsewhere herein).

The aircraft fuel system may comprise a plurality of fuel tanks that may be selectively fluidly connected in different arrangements to form the first and second fuel sources. The fuel tanks may comprise associated shut-off valves so that different combinations of tanks can be grouped together in different configurations. In such examples, there may be multiple ways of assigning individual fuel tanks to the first fuel source and the second fuel source. In other examples the assignment of fuel tanks to each of the fuel sources may be fixed. In the present example, the total volume of fuel tanks forming the first fuel source 302 is less than or equal to the volume of the fuel tanks forming the second fuel source 304. This may not however be the case for other examples.

In the present example, the first and second fuel sources 302, 304 comprise a plurality of wing fuel tanks 53, where at least one wing fuel tank is located in the port wing and at least one wing fuel tank is located in the starboard wing, and a centre fuel tank 55 located primarily in the fuselage of the aircraft 1. Each of the centre fuel tank 55 and the wing fuel tanks 53 may comprise a plurality of fluidly interconnected fuel tanks not shown in the Figures. As shown by the shading in FIG. 4, the wing fuel tanks 53 form the first fuel source 302, with the second fuel source 304 being formed by the centre fuel tank 55, in the present example.

For balancing purposes, one or more fuel tanks in the port wing may be fluidly connected to one or more fuel tanks in the starboard wing. This may be done either via a centre fuel tank (if that tank does not form part of the other fuel source), or bypassing the centre fuel tank(s), or both (for maximum flexibility and safety).

In another example, the second fuel source 304 comprises wing fuel tanks and a centre fuel tank, while the first fuel source 302 comprises a further separate centre fuel tank. Fluid interconnection between wing fuel tanks and the centre fuel tank of the second fuel source may be provided for balancing of the aircraft.

In some examples, the allocation of fuel tanks available on the aircraft may be constrained such that the first fuel source and the second fuel source 302, 304 are each substantially symmetrical with respect to the aircraft centre line. In cases where an asymmetric fuel tank allocation is permitted, a suitable means of fuel transfer is provided between fuel tanks of the first fuel source and/or between fuel tanks of the second fuel source such that the position of the aircraft's centre of mass can be maintained within acceptable lateral limits throughout the flight.

A trim fuel tank could in some examples be part of the first fuel source 302, or in other examples part of the second fuel source 304. The allocation of fuel tanks to the first fuel source 302 and the second fuel source 304 may be constrained such that neither the first fuel source 302 nor the second fuel source 304 comprises solely the trim fuel tank.

While the examples described in the present application have only a first and second fuel source 302, 304, in other examples further fuel sources may be provided so that fuel from any number of sources, each having a different fuel characteristic or characteristics may be supplied to the combustor via the fuel delivery regulator.

The first and second fuel sources 302, 304 may be used to store fuel having different characteristics. This may allow fuel having different characteristics to be provided to the combustion equipment 16 as will be described in more detail in the various examples below.

As used herein, the term "fuel characteristics" refers to intrinsic or inherent fuel properties such as fuel composition, not variable properties such as volume or temperature. Examples of fuel characteristics include one or more of:

i. the percentage of sustainable aviation fuel (SAF) in the fuel, or an indication that the fuel is a fossil fuel, for example fossil kerosene, or a pure SAF;

ii. parameters of a hydrocarbon distribution of the fuel, such as:
- the aromatic hydrocarbon content of the fuel, and optionally also/alternatively the multi-aromatic hydrocarbon content of the fuel;
- the hydrogen to carbon ratio (H/C) of the fuel;
- % composition information for some or all hydrocarbons present;

iii. the presence or percentage of a particular element or species, such as:
- the percentage of nitrogen-containing species in the fuel;
- the presence or percentage of a tracer species or trace element in the fuel (e.g. a trace substance inherently present in the fuel which may vary between fuels and so be used to identify a fuel, and/or a substance added deliberately to act as a tracer);
- naphthalene content of the fuel;
- sulphur content of the fuel;
- cycloparaffin content of the fuel;
- oxygen content of the fuel;

iv. one or more properties of the fuel in use in a gas turbine engine 10, such as:
- level of non-volatile particulate matter (nvPM) emissions or $CO_2$ emissions on combustion (a value may be provided for a specific combustor operating under particular conditions to compare fuels fairly—a measured value may be adjusted accordingly based on combustor properties and conditions);
- level of coking of the fuel;

v. one or more properties of the fuel itself, independent of use in an engine or combustion, such as:
- thermal stability of the fuel (e.g. thermal breakdown temperature); and
- one or more physical properties such as density, viscosity, calorific value, freeze temperature, and/or heat capacity.

The aircraft 1 may be refueled by connecting a refueling source 60, such as that provided by an airport fuel truck, fixed fuel storage, or a permanent pipeline, to a fuel line connection port 62 of the aircraft, via a fuel line 61. A desired amount of fuel may be transferred from the refueling source 60 to the one or more tanks 53, 55 of the aircraft 1. In the present example in which different tanks 53, 55 are to be filled with different fuels, multiple fuel line connection ports 62 are provided. The refueling source 60 therefore in this example holds two fuels, having different fuel characteristics, in separate vessels 60a, 60b (e.g. a default and a non-default fuel as described later) in separate tanks. In other examples, valves may be used to direct fuel appropriately if received from a single connection port.

Fuel characteristics may be obtained either by:
(i) physically and/or chemically detecting one or more characteristics of a fuel, either during operation of the aircraft (e.g. on wing), or as the aircraft is being refueled;
(iii) receiving data, for example from an input provided at a user interface, or data transmitted to the aircraft 1.

Fuel characteristics may be detected in various ways, both direct (e.g. from sensor data corresponding to the fuel characteristic in question) and indirect (e.g. by inference or calculation from other characteristics or measurements). The characteristics may be determined as relative values as compared to another fuel, or as absolute values. For example, one or more of the following detection methods may be used:

The aromatic or cycloparaffin content of the fuel may be determined based on measurements of the swell of a sensor component made from a seal material such as a nitrile seal material.

Trace substances or species, either present naturally in the fuel or added to act as a tracer, may be used to determine fuel characteristics such as the percentage of sustainable aviation fuel in the fuel or whether the fuel is kerosene.

Measurements of the vibrational mode of a piezoelectric crystal exposed to the fuel may be used as the basis for the determination of various fuel characteristics including the aromatic content of the fuel, the oxygen content of the fuel, and the thermal stability or the coking level of the fuel—for example by measuring the build-up of surface deposits on the piezoelectric crystal which will result in a change in vibrational mode.

Various fuel characteristics may be determined by collecting performance parameters of the gas turbine engine 10 during a first period of operation (such as during take-off) and then during a second period of operation (e.g. during cruise) comparing these collected parameters to expected values if using fuel of known properties.

Various fuel characteristics including the aromatic hydrocarbon content of the fuel may be determined based on sensor measurements of the presence, absence, or degree of formation of a contrail by the gas turbine 10 during its operation.

Fuel characteristics including the aromatic hydrocarbon content may be determined based on a UV-Vis spectroscopy measurement performed on the fuel.

Various fuel characteristics including the sulphur content, naphthalene content, aromatic hydrogen content and hydrogen to carbon ratio may be determined by measurement of substances present in the exhaust gases emitted by the gas turbine engine 10 during its use.

Calorific value of the fuel may be determined in operation of the aircraft 1 based on measurements taken as the fuel is being burned—for example using fuel flow rate and shaft speed or change in temperature across the combustor 16.

Various fuel characteristics may be determined by making an operational change arranged to affect operation of the gas turbine engine 10, sensing a response to the operational change; and determining the one or more fuel characteristics of the fuel based on the response to the operational change.

Various fuel characteristics may be determined in relation to fuel characteristics of a first fuel by changing a fuel supplied to the gas turbine engine 10 from the first fuel to a second fuel, and determining the one or more fuel characteristics of the second fuel based on a change in a relationship between T30 and one of T40 and T41 (the relationship being indicative of the temperature rise across the combustor 16). The characteristics may be determined as relative values as compared to the first fuel, or as absolute values by reference to known values for the first fuel.

As used herein and discussed below, T30, T40 and T41, and any other numbered pressures and temperatures, are defined using the station numbering listed in standard SAE AS755, in particular:

T30=High Pressure Compressor (HPC) Outlet Temperature;

T40=Combustion Exit Temperature; and

T41=High Pressure Turbine (HPT) Rotor Entry Temperature.

Combustion System

Figure 5:
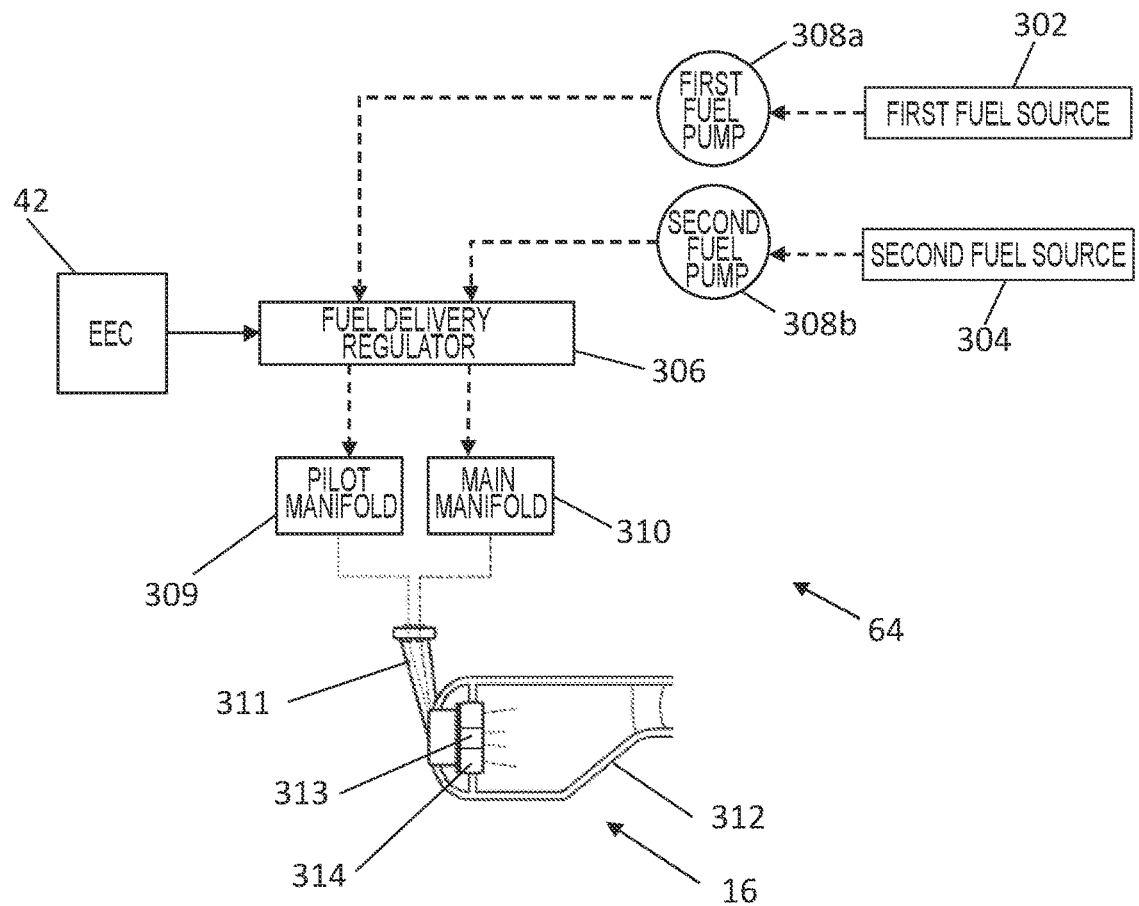
FIG. 5 is a schematic view of a combustion system of a gas turbine engine connected to two fuel sources.

FIG. 5 schematically illustrates further details of the combustion equipment 16 (which may be referred to simply as "the combustor") of the gas turbine engine 10. In this example, the combustion equipment is part of a staged combustor system 64 in which fuel is injected via pilot and main fuel injectors. Fuel is provided to the fuel injectors by means of a fuel delivery regulator 306 under control of an electronic engine controller (EEC) 42. Fuel is delivered to the fuel delivery regulator by fuel pumps 308a, 308b. In the present example, fuel is provided to the fuel delivery regulator 306 from two different fuel sources (the first fuel source 302 and the second fuel source 304) as described above. Fuel from each of the first and second fuel sources 302, 304 is provided by a respective first fuel pump 308a and second fuel pump 308b. Each of these fuel pumps may be mechanically driven by an accessory gearbox. In alternative configurations, for example in a more electric engine (MEE) configuration, the fuel pump may be electrically-driven. The skilled person will understand that any known suitable configuration of fuel pump or combination of fuel pumps may be used to deliver fuel from the fuel tanks 53, 55 to the combustor 16.

High-pressure fuel is delivered by the fuel delivery regulator 306 into a pilot manifold 309 and a main manifold 310. In the present example, the staged combustion system comprises a plurality of fuel nozzles 311 which are configured as duplex fuel injectors (also known as internally-staged). In the present example, 16 circumferentially-spaced fuel nozzles are disposed around an annular combustor can 312. As will be appreciated, more or indeed fewer fuel nozzles may be provided depending upon the physical engine size and design requirements. Further, different combustor configurations may be used, for example cannular, canned, etc.

Fuel from the pilot manifold 309 and the main manifold 310 is delivered to all of the fuel nozzles 311 for injection into the combustor can 312. In the present example, a central pilot fuel injector 313 produces a pilot fuel spray in a primary zone of the combustor can 312, whilst a concentric main fuel injector 314 produces a main fuel spray.

Delivery of fuel via the pilot and main fuel injectors 313, 314 is staged, thus at low powers (and hence low air mass flows), fuel is delivered by the central pilot fuel injector 313 at a rich fuel-air ratio (i.e. at an equivalence ratio greater than unity) for improved flame stability. In the present example, as power and mass flow increases, a staging point (SP) is reached at which fuel is delivered by some or all of the main fuel injectors of the fuel nozzles, supplementing the fuel flow from the pilot fuel injectors. The main fuel injectors 314 are configured to inject fuel at a lean fuel-air ratio (i.e. at an equivalence ratio less than unity). At this point, airflow is such that the equivalence ratio immediately downstream of the pilot fuel injectors is also fuel-lean. In the present example, at higher power levels, fuel is injected by all main fuel injectors.

The staged combustion system is therefore characterised by a "pilot-only" region of operation and a "pilot-and-main" region of operation. The two regions are separated by the staging point. In "pilot-only" operation, all fuel flow provided within the combustor is provided solely by pilot fuel injector(s). In "pilot-and-main" operation, fuel is provided within the combustor by the pilot fuel injector(s) and by main fuel injector(s), or just the main fuel injectors. The fuel delivery regulator 306 is therefore arranged to deliver fuel to the main fuel injectors, or both the main and pilot fuel injectors, during pilot-and-main operation. The fuel delivery regulator may be arranged to deliver fuel to both the pilot and main fuel injectors during pilot-and-main operation rather than switching off the pilot fuel injectors in case of rapid emergency operation to keep the combustor lit. During pilot-only operation the fuel delivery regulator provides fuel only to the pilot fuel injectors.

For a particular operating condition such as altitude or ambient air pressure, the staging point SP is typically defined by a threshold value of an engine operating parameter representative of engine power setting, such as T30 (total air temperature at compressor exit) or calculated T40 (total air temperature at combustor exit) or combustor Fuel Air Ratio (FAR). It will be appreciated that different threshold values might apply for different operating conditions.

Those skilled in the art will be familiar with such operation of staged combustion systems in order to affect lean burn at high powers whilst also observing flame stability limits at lower powers. Furthermore, they will also be familiar with other staged combustion configurations, for example those with separate pilot and main fuel injectors (as opposed to duplex or internally-staged), which may be arranged in parallel (radially separate, axially aligned) or series (axially separate, radially aligned). It will be understood that the principles disclosed herein may be applied to any staged combustion system comprising main and pilot fuel injectors.

The balance of injection of fuel by the pilot fuel injectors 313 and the main fuel injectors 314 is controlled by the electronic engine controller 42, which provides control signals to the fuel delivery regulator 306 indicative of the total fuel that must be injected in the form of a fuel flow rate ($W_F$) and the ratio of pilot fuel injector fuel flow to main fuel injector fuel flow (staging ratio). The fuel delivery regulator 306 is configured to utilise these control signals to deliver the demanded fuel flow rate in accordance with the demanded overall fuel flow and pilot-main fuel flow ratio. In alternative examples, the electronic engine controller 42 may instead be configured to provide control signals to the fuel delivery regulator 306 which are indicative of the pilot fuel flow rate ($W_F P$) and the main fuel flow rate ($W_{Fmean}$). It will of course be appreciated that the information conveyed is equivalent.

Prior art systems may simply provide fuel from a single source to a fuel delivery regulator so that fuel having the same fuel characteristics (i.e. same fuel composition) is provided to both the pilot fuel injectors and main fuel injectors at all points of operation of the combustor. In the present application however, the fuel delivery regulator 306 is configured to selectively provide fuel to the main and pilot manifold from two different fuel sources as will be described further below.

Staged Combustion Using Fuel from More than One Source

In prior art staged combustion systems there is access to fuel from only a single source, which is used in both the pilot-only and pilot-and-main ranges of operation. Fuel having the same characteristics is therefore supplied to the combustor fuel injectors by prior art fuel delivery regulators regardless of the fuel flow rate. The inventors have determined that it may be advantageous to provide fuel from different fuel sources having different characteristics to the fuel delivery regulator, and delivering fuel to the pilot and main fuel injectors such that fuel of a different characteristic is provided in different ranges of the combustor operation. Referring again to the staged combustion system shown in FIG. 5, the fuel delivery regulator 306 is therefore arranged to deliver fuel to the pilot fuel injectors 313 during at least part of the pilot-only range of operation (i.e. mode of operation) having a different fuel characteristic from fuel delivered to one or both of the pilot 313 and main fuel injectors 314 during at least part of the pilot-and-main range of operation. The different fuel characteristic may be provided by using fuel from the first fuel source 302, fuel from the second fuel source 304, or a blend thereof.

One advantage of this more flexible supply of fuel to the combustor 16 is that fuel which has favourable combustion properties but is limited in supply can be used where those favourable properties will have a greater effect.

nvPM Emission from Staged Combustion

Figure 6:
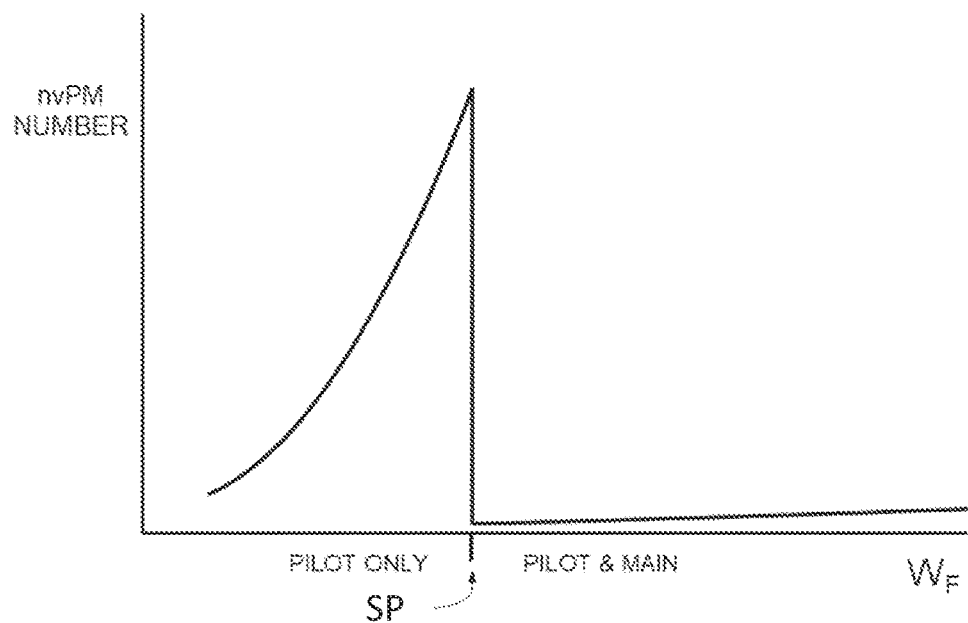
FIG. 6 illustrates a relationship between fuel flow rate and nvPM number.

FIG. 6 illustrates a relationship between fuel flow rate $W_F$ and soot particle emission-rate (shown as "non-volatile particulate matter (nvPM) number" and referred to as "nvPM #" herein) for a typical lean-burn combustor (e.g. a staged combustor system). Any reference herein to soot may apply equally to other types of nvPM.

FIG. 6 shows a first region, to the left of the staging point SP (at lower fuel flow rate than that at the staging point), in which only the combustor's pilot fuel injectors are operating, and in which nvPM # rises rapidly with increasing fuel flow rate $W_F$. Operation in this first region will be referred to as operation in the "pilot-only" range of operation.

FIG. 6 shows a second region, to the right of the staging point SP (at higher fuel flow rate than that at the staging point), in which both the pilot fuel injectors and the main fuel injectors are operating, and in which nvPM # is much lower and rises only slowly (if at all) with increasing $W_F$. Operation in this second region will be referred to as operation in the "pilot-and-main" range of operation. Although a non-zero value of nvPM # within the "pilot-and-main" range of operation is shown in FIG. 6, it will be appreciated that in some lean-burn combustors nvPM # within the "pilot-and-main" range could be substantially zero.

It is to be understood that the form of the curve shown in FIG. 6 is only one example provided for purposes of illustration. Generally the nvPM # in pilot-only operation is substantially higher than that in pilot-and-main operation, and there is a sharp boundary between the two ranges of operation. Some examples set out below take additional advantage of the positive gradient of the curve shown within pilot-only operation, but again the precise form of the curve shown in FIG. 6 is only one example of the dependency between $W_F$ and nvPM #.

The position of the staging point SP may be chosen such that the fuel flow rate during most or all cruise conditions falls to the right of staging point SP i.e. in a region of pilot-and-main operation corresponding to very low (or perhaps substantially zero) values of nvPM #. Conversely, operation at many other points of a flight, such as taxi, approach, descent, may correspond to "pilot-only" operation in which nvPM (soot) emissions are comparatively high.

It is to be understood that the staging point SP may lie at different values of $W_F$ for different flight conditions such as altitude. For example, at cruise where the density of air is low and thus the mass flow rate of working fluid through the gas turbine core is also low, the staging point SP may correspond to a substantially lower fuel flow rate than it would on the ground where ambient air density is much higher.

The staging point SP applying at a particular flight condition may be defined as an absolute value of fuel flow rate, or as a predetermined percentage of whatever maximum $W_F$ applies at the flight condition. Other definitions of the staging point could also be used as would be understood by the skilled person.

The present applications refers to nvPM number (or nvPM #) and its dependency upon $W_F$, as illustrated in FIG. 6. However, it will be appreciated that a corresponding relationship for nvPM mass and its dependency on $W_F$ could also be contemplated, and that the apparatus and methods set out herein could be adapted accordingly.

Control of nvPM Emissions

The level of nvPM emission by a gas turbine engine is dependent on the characteristics of the fuel being used. For example, some aircraft fuels may be characterised by a lower proportion of certain constituents that are known to cause soot emissions compared to typical fossil kerosene, and so produce a lower amount of soot at the same combustor fuel flow rate.

While the emission of nvPM by a gas turbine engine could be reduced effectively by using fuel associated with a low index of nvPM production, that may not always be possible. For example, the availability of such fuels may not be sufficient for use throughout the duration of a flight. There may also be other technical, regulatory or cost constraints on using such low nvPM fuels in large fuel volumes or in large concentrations within a blended fuel.

The inventors have determined that by favouring using fuel associated with a relatively low level of nvPM emission (e.g. compared to fossil kerosene) during the pilot-only range of combustor operation compared to during the pilot-and-main range of operation the nvPM emissions can still be significantly reduced, while not requiring use of a large amount of the low nvPM fuel throughout the combustor range of operation.

In the present example therefore, the first fuel held in the first fuel source 302 is associated with a level of nvPM production which is less than that of the second fuel held in the second fuel source 304 (e.g. when being used in corresponding conditions). The fuel delivered to the pilot fuel injectors during at least part of the pilot-only range of operation is also associated with a level of nvPM production which is less than the fuel delivered to one or both of the pilot and main fuel injectors during at least part of the pilot-and-main range of operation. As discussed below fuel may be provided to the pilot and main fuel injectors 313, 314 exclusively from one of the two available fuel sources 302, 304, or as a blend of fuel from the first and second fuel sources 302, 304.

In some examples, the fuel system may be configured such that the main fuel injectors 314 can be supplied from either the first fuel source 302 or the second fuel source 304, and also such that the pilot fuel injectors 313 can be supplied from either the first fuel source 302 or the second fuel source 304. Even though some of the examples presented below do not include such a flexible fuel system, there are safety advantages in ensuring that any fuel tank can supply fuel to any fuel injector of any engine.

In some of the examples described herein, an individual fuel injector 313, 314 is supplied either with the fuel only from the first fuel source 302 or fuel from the second fuel source 304, i.e. the fuel system switches between the two fuel sources.

In other examples, the fuel system also comprises the necessary equipment to perform blending of fuel from the two on board fuel sources (e.g. high soot index and low soot index fuels), the blending ratio being varied according to various decision making criteria in order to produce a fuel composition whose characteristics are equal to those of the low soot producing fuel composition (100:0 blending ratio) or equal to the high soot producing fuel composition (0:100 blending ratio) or somewhere in between (x:100-x blending ratio where 0<x<100).

Various examples may involve the ability to switch between pre-determined fuel compositions and/or to produce a blended fuel composition for only the pilot fuel injectors 313. The main fuel injectors 314 may in such examples be supplied at all times with fuel from one of the fuel sources (e.g. the high nvPM associated fuel). However, for more flexibility, some examples may allow the main fuel injectors 314 to be switched to the fuel from the other source (e.g. the low nvPM fuel composition) and/or a blended fuel composition during certain abnormal periods of operation, for example in case of a loss of high nvPM associated fuel due to for example a fuel leak.

In some examples, the fuel characteristic by which fuel from the first fuel source 302 differs from fuel from the second fuel source 304 may be a percentage of sustainable aviation fuel (SAF) present in the respective fuel. The fuel delivered to the pilot fuel injectors 313 during at least part of the pilot-only range of operation would similarly have a different percentage of SAF compared to the fuel delivered to one or both of the pilot fuel injectors 313 and main 314 fuel injectors during at least part of the pilot-and-main range of operation.

Compared to fossil kerosene, SAF offers substantially lower emissions of soot, or more generally, nvPM. When SAF is used as part of a blended fuel-composition with fossil kerosene, broadly speaking the higher the percentage of SAF in the blend (and hence the lower the percentage of fossil kerosene) the greater is the reduction in nvPM emissions, at least within some ranges of SAF percentage. This effect is illustrated in FIG. 7, which shows nvPM # emissions dependencies upon fuel flow rate $W_F$ for a default fuel composition (solid line) and for three further fuel compositions A, B and C (labelled) for a particular flight condition defined by for example altitude and forward speed.

The default fuel composition and the fuel compositions A, B and C are characterised respectively by progressively higher SAF percentages and correspondingly lower fossil kerosene percentages. The default fuel composition could be 100% fossil kerosene, or it could be a blend comprising mostly fossil kerosene with a small percentage of SAF, such as may be available by default at some airports.

Figure 7:
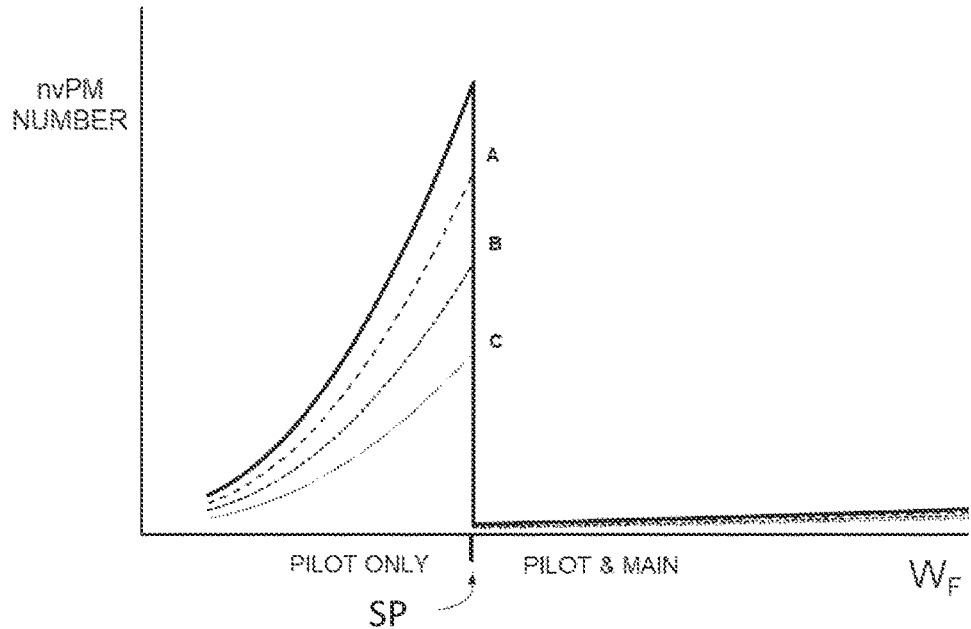
FIG. 7 illustrates nvPM number dependencies upon fuel flow rate for various fuel compositions.

In FIG. 7 the reduction factor in nvPM # emissions relative to the default fuel composition achieved by each blended fuel composition is shown as being unchanging with $W_F$ during pilot-only operation and also unchanging with $W_F$ during pilot-and-main operation, although the reduction factors in those two regions of operation are shown as being different from each other. It will be appreciated that other dependencies upon $W_F$ may be observed in various implementations and are also contemplated by the present application.

Figure 8:
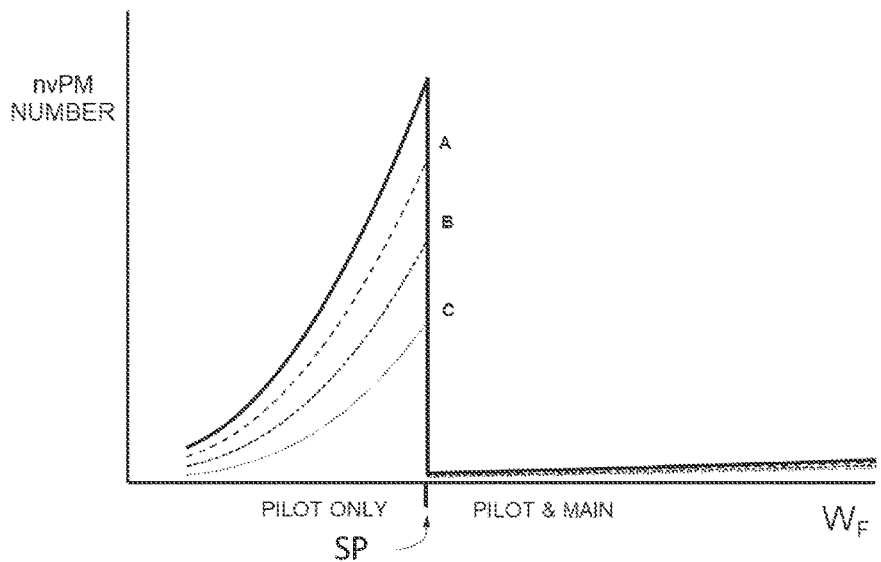
FIG. 8 illustrates an alternative nvPM number dependency upon fuel flow rate for various fuel compositions.

FIG. 8 shows one such alternative dependency upon $W_F$, characterised within pilot-only operation by an increase in the nvPM # reduction factor for each blended fuel composition as $W_F$ is reduced from the staging point SP towards a lower level of fuel flow. Other variations could be possible; in particular the dependency upon $W_F$ of the nvPM # reduction factor need not be the same for each blended fuel composition, and/or need not be a monotonically increasing or monotonically decreasing function of $W_F$. Although subsequent examples in the present application are based upon the form shown in FIG. 7, it will be understood that more general forms are also contemplated.

The inventors have determined that when a gas turbine engine 10 is operating in the pilot-and-main range of operation the soot emissions are inherently low and the substitution of default fuel composition (e.g. fossil kerosene) with SAF (or a high-percentage SAF blend) or other low soot producing fuel will produce little further reduction in soot emissions. Conversely when the engine 10 is operating at a fuel flow rate which is below, but nonetheless close to, the staging point SP, soot emissions can be substantially reduced by using a fuel composition which comprises a higher percentage of low soot producing fuel (e.g. SAF) and a lower percentage of fossil kerosene (or other high soot producing fuel) relative to a default fuel composition. By using fuel having a different characteristic in different ranges of the combustor operation the percentage of SAF within the fuel composition burned in pilot-only mode can be increased (e.g. maximised), while reducing (e.g. minimising) the percentage of SAF within the fuel composition burned in pilot-and-main mode. This may allow the nvPM reducing effect of the available SAF to have a greater impact compared to using a constant percentage composition of SAF throughout the full range of combustor operation.

In various other examples another characteristic or characteristics of the fuel may be varied alternatively to, or in addition to, the percentage of SAF. Changes in other characteristics between the fuels of the first and second fuel sources may additionally or alternatively be associated with different levels of the nvPM #. For example, the first fuel source 302 may be characterised by fuel with a lower proportion of certain constituents which cause soot or other nvPM emissions compared to that of the second fuel source 304. In some examples, the fuel of the first fuel source 302 may be characterised by a lower aromatic hydrocarbon content, or more specifically lower naphthalene content compared to the second fuel source 304. Lower content of such soot producing compounds may be associated with SAFs when compared to fossil kerosene. That may however not always be the case. Some SAFs may be associated with a higher level of soot production compared to others (e.g. if they have a greater amount of a synthetic aromatic content added), or may be associated with a higher level of soot production compared to a fossil fuel such as fossil kerosene from which aromatic content has been removed in order to leave predominantly paraffinic content.

Various examples of delivering fuel to the main and pilot fuel injectors 313, 314 from either of the first and second fuel sources 302, 304 (exclusively, at least under normal running conditions) or a blend thereof at various points during the operating ranges of the combustor are described below.

Figure 9:
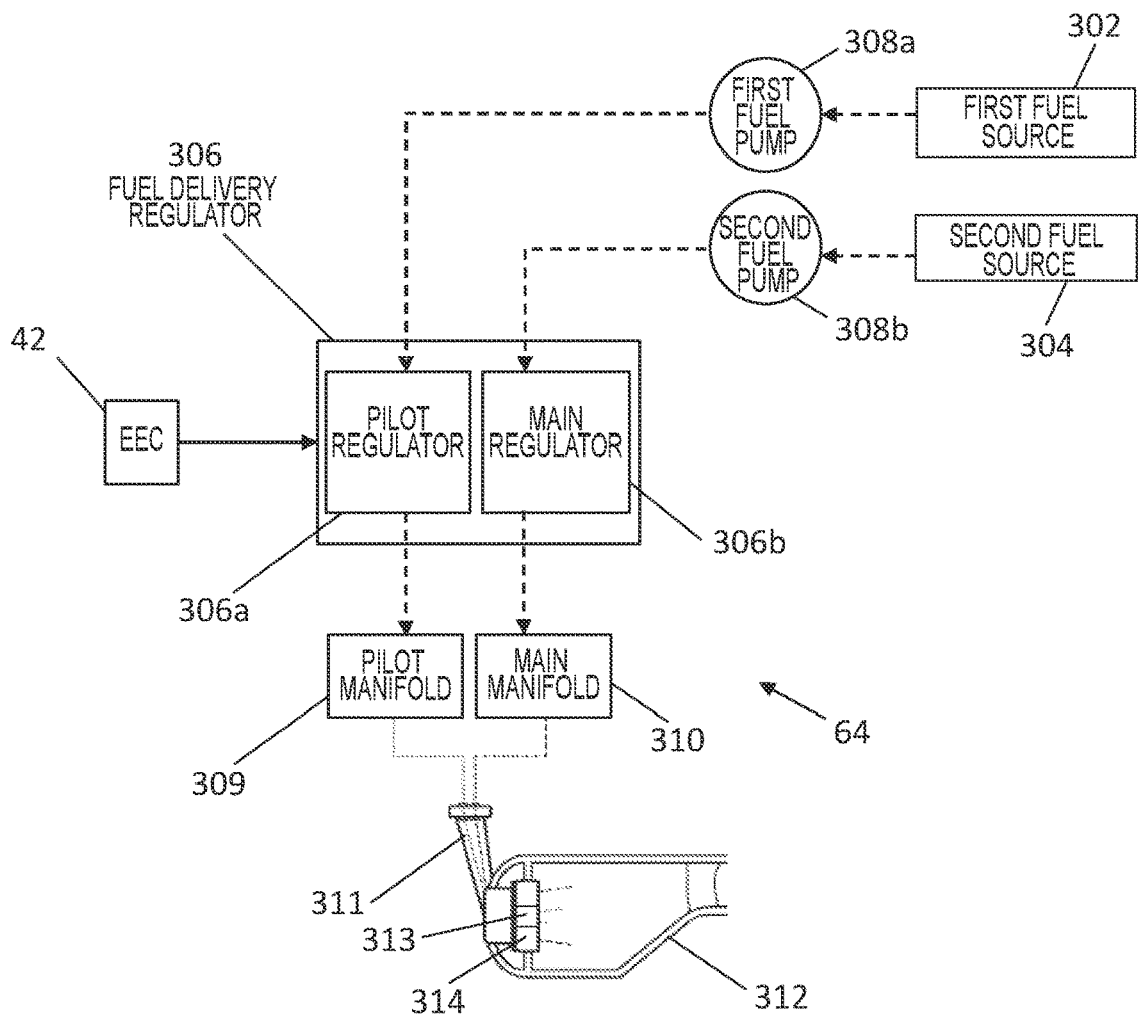
FIG. 9 shows a schematic view of another combustion system.
Figure 10:
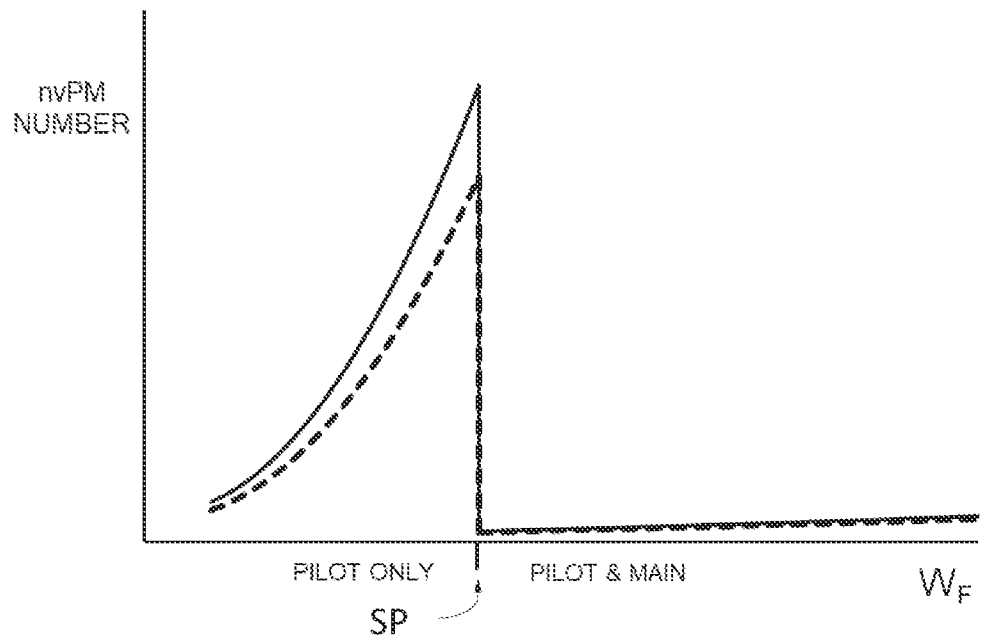
FIG. 10 illustrates the dependency of nvPM number upon fuel flow rate for the arrangement of FIG. 9.
Figure 11:
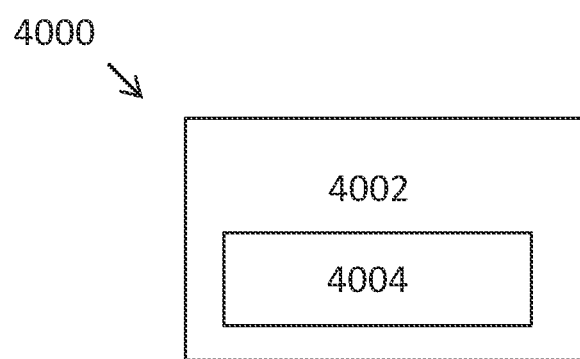
FIG. 11 illustrates a method of operating a gas turbine engine.

FIGS. 9, 10 and 11

FIG. 9 illustrates an example in which the fuel delivery regulator 306 is arranged to deliver fuel from the first fuel source 302 to the pilot fuel injectors 313 during operation in both the pilot-only and the pilot-and-main ranges of operation, and fuel from the second fuel source 304 to the main fuel injectors 314 during operation in the pilot-and-main range of operation. In this example, the fuel delivery regulator 306 comprises a pilot regulator 306a in fluid communication with the first fuel source 302 via the first fuel pump 308a. The fuel delivery regulator 306 further comprises a separate main regulator 306b in fluid communication with the second fuel source 304 via the second fuel pump 308b. The pilot regulator 306a is arranged to deliver fuel to the pilot manifold 309 and the pilot fuel injectors 313. The main regulator 306b is arranged to deliver fuel to the main manifold 310 and the main fuel injectors 314. The fuel delivery regulator 306 therefore comprises two separate flow paths via which fuel from each fuel source 302, 304 is provided to the combustor 16. The rate of flow of fuel through each of the pilot regulator 306a and main regulator 306b may be controlled independently from each other using control signals received by the fuel delivery regulator 306 from the EEC 42. The pilot fuel injectors 313 are therefore at all times supplied with fuel from the first fuel source 302 and the main fuel injectors 314 are at all times supplied with fuel from the second fuel source 304. The fuel flow to the main fuel injectors 314 may be substantially zero in the pilot-only range of operation. This means that the fuel composition passing through an individual fuel injector does not change throughout the flight and is pre-determined prior to flight (at least during normal running conditions).

In the example of FIG. 9 the first fuel source 302 contains a fuel that is associated with a low nvPM production, for example a fuel having a relatively high SAF content (e.g. a SAF rich fuel). The second fuel source 304 contains a fuel associated with a high nvPM production, for example a fuel having a relatively low SAF content (i.e. lower than the first fuel), e.g. a SAF poor fuel. The term 'SAF-rich' may be used herein to indicate a fuel having a higher SAF content to a 'SAF poor' fuel. The term 'SAF-rich' fuel may include fuel that is 100% SAF. The 'SAF poor' fuel may include fuel that is 0% SAF, e.g. fossil kerosene. In some examples, the SAF-rich fuel may include up to 50% SAF, and the SAF-poor fuel substantially zero % SAF e.g. may be standard fossil kerosene fuel.

In the example of FIG. 9, the SAF-rich fuel composition may be determined by the one or more of the following factors:

a) The amount of SAF available to, or allocated to, a proposed flight;

b) The total fuel requirement for the pilot fuel injectors for the entire flight (calculated according to methods known to the skilled person); and c) Any limits on the maximum allowable percentage of SAF, for example certification limits, or for example technical limits related to the specific aircraft and/or to the pilot fuel injectors themselves, or the maximum percentage blend in which SAF is available at the point of fuel loading.

The desired SAF percentage in the SAF-rich fuel composition may be calculated as 100% times factor a), divided by factor b), subject to a maximum allowable value which is the minimum of the various potential limits identified in factor c). An adjustment may be necessary to take into account the different volumetric energy densities of SAF and fossil kerosene, using methods known to the skilled person.

In the present example the SAF-poor fuel composition may have a default SAF percentage of zero (or the minimum possible given the default fuel supply at the airport at which the aircraft is fueled), but any SAF allocated to the proposed flight which was not incorporated into the SAF-rich fuel composition for the pilot fuel injectors 313 will be used as part of the SAF-poor fuel composition for the main fuel injectors 314. The resulting percentage of SAF in the SAF-poor fuel composition will be capped by any certification limits or by any technical limits related to the specific aircraft and/or to the main fuel injectors, or the maximum percentage blend in which SAF is available at the point of fuel loading.

Operation of the combustor in FIG. 9 may not be possible for all flights due to the size of the available fuel tanks for SAF-rich fuel composition and for SAF-poor fuel composition not being able to accommodate the fuel volume requirements for one or both of respectively the pilot fuel injectors 313 and main fuel injectors 314. This may be the case for long range flights in which all fuel tanks need to be fully filled prior to departure and for which the respective fuel volume requirements for the various fuel injector types may not correspond exactly to the source volumes.

FIG. 10 illustrates the dependency of nvPM number upon fuel flow rate $W_F$ for the fuel regulator arrangement of FIG. 9 (dashed line) in comparison with the corresponding dependency for a default fuel composition such as fossil kerosene (solid line). In this illustration it is assumed that the SAF-rich fuel composition corresponds to fuel composition A from FIG. 7. As can be seen in FIG. 10, an advantageous reduction in nvPM number is provided within the pilot-only range of operation, whereas in the pilot-and-main range of operation there is little or no change in nvPM number. In this example, a limited amount of available SAF has therefore been more effectively targeted to a part of the range of operation (i.e. pilot-only) where it can bring the greatest advantage in terms of nvPM reduction.

FIG. 11 illustrates a method 4000 of operating a gas turbine engine which may be performed using the staged combustor system of FIG. 9. The method 4000 comprises regulating 4002 fuel delivery to the pilot and main fuel injectors 313, 314 from the first fuel source 302 and the second fuel source 304. As discussed above, regulating the fuel delivery generally comprises delivering fuel to the pilot fuel injectors 313 during at least part of the pilot-only range of operation having a different fuel characteristic from fuel delivered to one or both of the pilot fuel injectors 313 and main fuel injectors 314 during at least part of the pilot-and-main range of operation. In the example of FIG. 11, regulating 4002 the fuel delivery comprises delivering 4004 fuel from the first fuel source 302 to the pilot fuel injectors 313 during operation in both the pilot-only and the pilot-and-main ranges of operation, and fuel from the second fuel source 304 to the main fuel injectors 314 during operation in the pilot-and-main range of operation. Any of the other features described above in connection with FIG. 9 may be incorporated into the method of FIG. 11, even though they are not repeated here.

Figure 12:
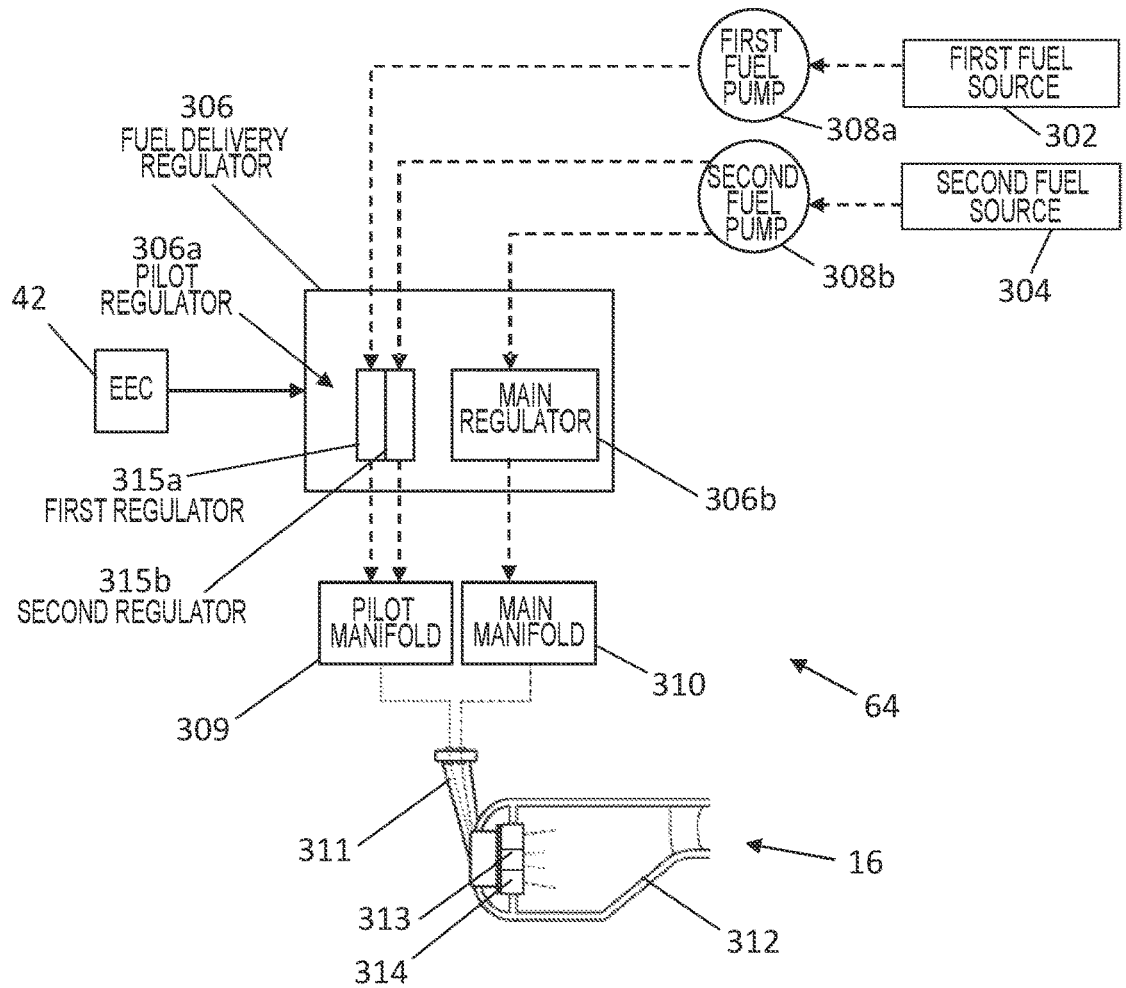
FIG. 12 shows a schematic view of another combustion system.
Figure 13:
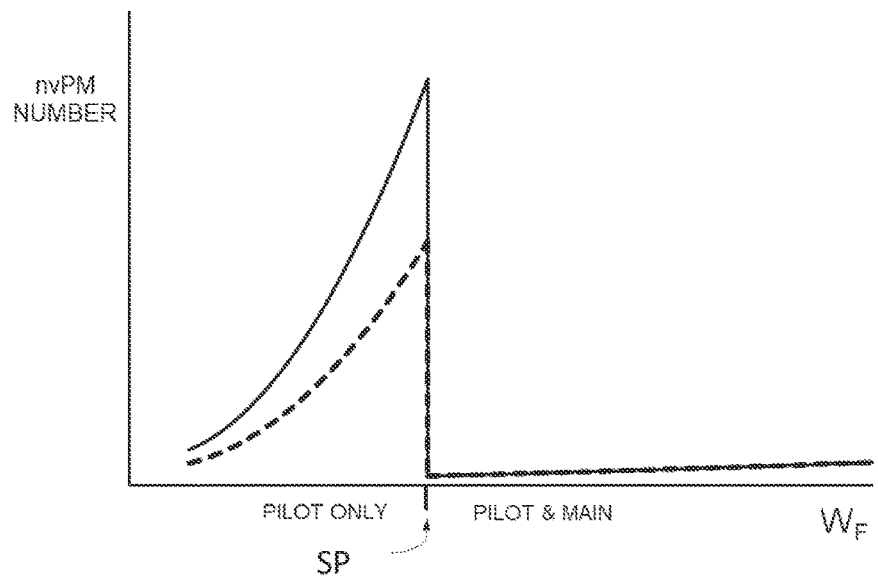
FIG. 13 illustrates the dependency of nvPM number upon fuel flow rate for the arrangement of FIG. 12.
Figure 14:
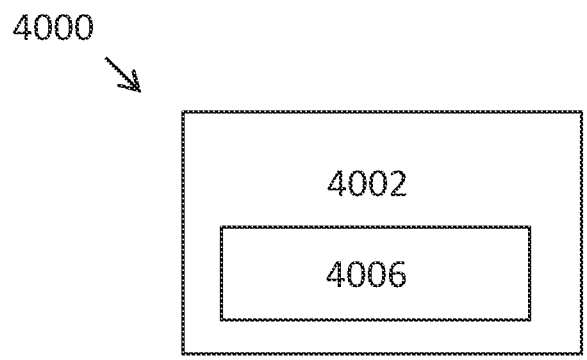
FIG. 14 illustrates another method of operating a gas turbine engine.

FIGS. 12, 13 and 14

In the example shown in FIGS. 9, 10 and 11, the advantageous reduction in nvPM number (relative to the default fuel composition) observed particularly within pilot-only operation (i.e. to the left of point SP) is made possible by the prioritisation of SAF to the pilot fuel injectors, thus enabling a higher SAF percentage in the fuel composition supplied to those fuel injectors. However, during pilot-and-main operation (in which soot production is minimal even when running on fossil kerosene) nonetheless a SAF-rich fuel composition is still being supplied to the pilot fuel injectors. A yet more efficient use of SAF rich fuel may be obtained by providing further flexibility of fuel delivery to the combustor.

FIG. 12 illustrates an example in which the fuel delivery regulator 306 is arranged to switch delivery of fuel to the pilot fuel injectors 313 between the first fuel source 302 and the second fuel source 304. In the described example the switching occurs at the boundary of the pilot-only range of operation (e.g. at the staging point SP). In other examples, there may be multiple switching points including at the boundary and/or within the pilot-only range of operation. More generally therefore, the fuel delivery regulator 306 is arranged to switch delivery of fuel to the pilot fuel injectors 313 between the first and second fuel source 302, 304 at one or more operating points within, or at a boundary of, the pilot-only range of operation.

Referring to FIG. 12, the pilot regulator 306a comprises two separate independently controllable regulators, a first regulator 315a in fluid communication with the first fuel source 302, and a second regulator 315b in fluid communication with the second fuel source 304. The first and second regulators 315a, 315b of the pilot regulator 306a are controllable by signals received from the EEC 42. Both of the first and second regulators 315a, 315b are in fluid communication with the pilot manifold 309 so that they may control the delivery of fuel to the pilot fuel injectors 313.

The fuel delivery regulator 306 is arranged to switch delivery of the fuel to the pilot fuel injectors 313 between fuel from the first fuel source 302 and fuel from the second fuel source 304 according to a mode signal indicative of a change in the range of operation of the staged combustion system. The mode signal may be obtained by the EEC 42 from the combustion system 64 (or combustor 16) and a corresponding control signal sent to the regulators 315a, 315b so that the switching may occur at the staging point between the pilot-only range of operation and the pilot-and-main range of operation. The fuel delivery regulator 306 is thus arranged to switch the pilot fuel injectors 313 between the first fuel and the second fuel (or vice versa) each time the staging point SP is crossed. The EEC may be configured to receive from the combustion system 64 (or combustor 16) a signal indicative of its mode of operation (pilot-only or pilot-and-main). Alternatively, the EEC 42 may instruct the combustion system 64 to switch from one mode of operation to the other. In this example, the mode signal may already be available at the EEC 42, and may be used to switch fuel delivery by the fuel delivery regulator 306. Switching delivery of the fuel according to a mode signal indicative of a change in mode of the combustor 16 may ensure an acceptable level of synchronisation between the combustor's mode of operation and the pilot fuel injectors' fuel composition. This may help to ensure quick switching between fuel sources as the staging point is crossed.

In the presently described example, the pilot regulator 306a is arranged to switch between supplying fuel exclusively from the first fuel source 302 and exclusively from the second fuel source 304. The first and second fuel regulators 315a, 315b may therefore be arranged to switch between operating where: i) the first is fully closed (so that no fuel from the corresponding source is provided to the combustor 16), and the second is used to control the rate of flow from the other fuel source; and ii) the second is fully closed (so that no fuel from the corresponding source is provided to the combustor 16), and the first is used to control the rate of flow from the other fuel source. In other examples, any other suitable arrangement of pilot fuel regulator 306a may be provided in order to allow switching between fuel sources.

The fuel delivery regulator 306 illustrated in FIG. 12 may be arranged to deliver fuel such that when the engine 10 is operating in pilot-only mode, the pilot fuel injectors 313 are supplied with a SAF-rich fuel composition, and when the engine is operating in pilot-and-main mode, both the pilot fuel injectors 313 and the main fuel injectors 314 are supplied with a SAF-poor fuel composition.

In this example, the SAF-rich fuel composition will be determined by the following factors:

a) The amount of SAF available to or allocated to a proposed flight;
b) The total fuel requirement for the pilot fuel injectors during pilot-only operation for the entire flight (calculated according to methods known to the skilled person); and
c) Any limits on the maximum allowable percentage of SAF, for example certification limits, or for example technical limits related to the specific aircraft and/or to the pilot fuel injectors themselves, or the maximum percentage blend in which SAF is available at the point of fuel loading.

The desired SAF percentage in the SAF-rich fuel composition is then simply 100% times factor a) divided by factor b), subject to a maximum allowable value which is the minimum of the various potential limits identified in factor c). An adjustment may be necessary to take into account the different volumetric energy densities of SAF and fossil kerosene, using methods known to the skilled person.

The SAF-poor fuel composition may be determined using the same method and constraints as for the example described in connection with FIGS. 9, 10 and 11, additionally constrained by any practical limits related to the pilot fuel injectors 313 if required.

FIG. 13 illustrates the dependency of nvPM number upon fuel flow rate $W_P$ for the fuel delivery regulator of FIG. 12 (dashed line) in comparison with the corresponding dependency for a default fuel composition such as fossil kerosene (solid line). In this illustration it is assumed that the SAF-rich fuel composition corresponds to fuel composition B from FIG. 7 and that the SAF-poor fuel composition corresponds to the default fuel composition.

As can be seen in FIG. 13, for a fixed amount SAF allocated to an individual flight, the fuel delivery regulator 316 of FIG. 12 enables the SAF-rich fuel composition to have a higher percentage SAF content compared to the example of FIG. 9, due to further restricting use of the SAF-rich fuel composition to pilot-only operation. As a result, SAF is more effectively prioritised to a region of operation in which the advantageous reduction in nvPM is greater.

As with the example of FIGS. 9, 10 and 11, fuel-tank capacities may prevent operation according to the example of FIG. 12 for some flights, because it may be difficult to match the volumes of the various fuel tanks to the required volumes of the SAF-rich and SAF-poor fuel compositions.

FIG. 14 illustrates a method of operating a gas turbine engine 10 which may be performed using the staged combustor system of FIG. 12. Method steps common to the method of FIG. 11 are labelled accordingly. In this example, regulating 4002 the fuel delivery comprises switching 4006 delivery of the fuel to the pilot fuel injectors 313 between the first fuel source 302 and the second fuel source 304 at the staging point SP. Any of the features described above in connection with FIG. 12 may be incorporated into the method of FIG. 14, even though they are not repeated here.

Figure 15:
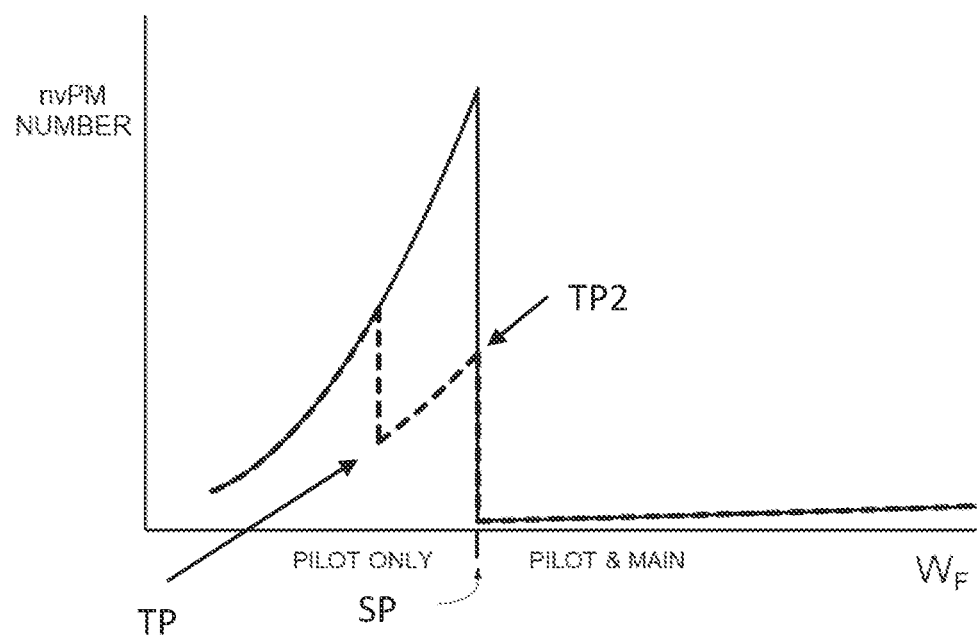
FIG. 15 illustrates another example of the dependency of nvPM number upon fuel flow rate for the arrangement of FIG. 12.
Figure 16:
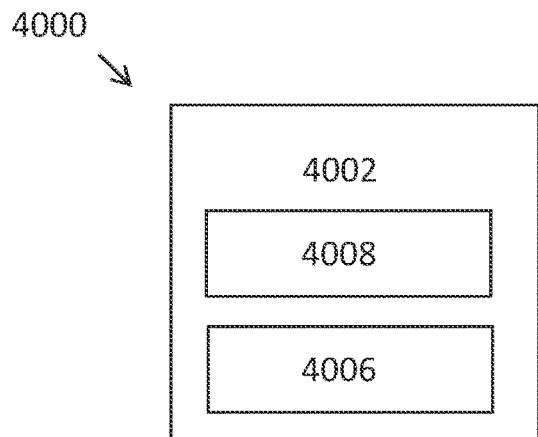
FIG. 16 illustrates another method of operating a gas turbine engine.

FIGS. 15 and 16

The fuel delivery regulator of FIG. 12 may in some examples be arranged to further switch delivery of fuel to the pilot fuel injectors 313 between the first fuel source 302 and the second fuel source 304 at a threshold point TP within the pilot-only range of operation. Fuel from the second fuel source 304 may be delivered to the pilot fuel injectors 313 at fuel flow rates below the threshold point, fuel from the first fuel source 302 delivered to the pilot fuel injectors 313 at fuel flow rates between the threshold and the boundary of the pilot-only range of operation (staging point), and fuel from the second fuel source 304 may be delivered to the pilot fuel injectors 313 at fuel flow rates above the boundary. The main fuel injectors 314 may be supplied with fuel from the second fuel source 304 at all times.

Similarly to the previously described examples, the first fuel contained in the first fuel source 302 may be a low nvPM associated fuel such as a SAF-rich fuel, while the second fuel contained in the second fuel source 304 may be associated with high nvPM such as a SAF-poor fuel. When the combustor 16 is operating in pilot-only mode close to the staging point SP (as determined by the position of the threshold) the pilot fuel injectors 313 are supplied with the SAF-rich fuel composition. At all other times the pilot fuel injectors 313 are supplied with a SAF-poor fuel composition.

This example may provide a still more efficient use of SAF and may be further advantageous compared to examples where switching occurs only at the staging point SP in cases where the SAF percentage in the SAF-rich fuel composition of the second example is limited by availability of SAF rather than by certification limits of the engine. The present example in which two switching points are provided may also overcome difficulties with potential mismatches between individual fuel-tank capacities and the required volumes of SAF-rich and SAF-poor fuel compositions.

The position of the switching threshold TP may be determined according to one or more different factors so that the switching occurs "close" to the staging point SP. For example, the threshold may be:

a) a first threshold fuel flow rate beyond which the production of nvPM by the gas turbine engine 10 passes a threshold amount of the nvPM produced by the gas turbine engine during operation in which the pilot fuel injectors 313 are delivered fuel having the second fuel composition. For example, the threshold may be defined as operation in pilot-only mode at a fuel flow rate which, for a default fuel composition such as fossil kerosene, would correspond to soot emissions exceeding a threshold. The soot emissions or nvPM produced by the gas turbine engine may be defined either as a number of soot particles emitted per unit mass of fuel (i.e. a number emission index) or as a number of soot particles emitted per unit time (i.e. also taking into account the fuel flow rate) or as a number of soot particles emitted per unit distance of flight (i.e. also taking into account the speed of the aircraft).

b) a second threshold defined as a predefined threshold fuel flow rate less than the fuel flow rate at the staging point SP (as defined for the current flight conditions such as the current altitude). The predefined threshold may be either a percentage of the fuel flow rate at the staging point or an absolute value of flow less than that at the staging point.

The first threshold and/or the second threshold may be defined with reference to the quantity of SAF available for a proposed flight, working on the assumption that as much as possible of the available SAF will be incorporated into the SAF-rich fuel composition, subject to previously-identified constraints, and taking into account the fuel volume requirement for a proposed flight for the pilot fuel injectors when operating "close to point SP" according to a candidate value of the first threshold and/or the second threshold, the fuel volume requirement being determined using methods familiar to the skilled person.

The second threshold may be defined with reference to the fuel-tank volume available on board the aircraft 1 for the SAF-rich fuel composition, again taking into account the fuel volume requirement for a proposed flight for the pilot fuel injectors when operating "close to point SP", the fuel volume requirement being determined using methods familiar to the skilled person. For some flights, particularly long-range flights for which all available fuel capacity must be used, the size of the available fuel tanks 53, 55 may limit the available options concerning the second threshold, to ensure that capacity of the fuel tank used for the SAF-rich fuel composition is fully used. This would place corresponding constraints on SAF percentage within the SAF-rich fuel composition In cases where the first threshold and/or the second threshold have not been defined with reference to the available quantity of SAF, the SAF-rich fuel composition may be determined by one or more of following factors:

a) The amount of SAF available to or allocated to a proposed flight;

b) The total fuel requirement for the pilot fuel injectors during pilot-only operation close to the staging point for the entire flight (calculated according to methods known to the skilled person and taking account of relevant fuel-tank volumes as described above); and c) Any limits on the maximum allowable percentage of SAF, for example certification limits, or for example practical limits related to the specific aircraft and/or to the pilot fuel injectors themselves, or the maximum percentage blend in which SAF is available at the point of fuel loading.

The SAF percentage in the SAF-rich fuel composition is then simply 100% times factor a) divided by factor b), subject to a maximum allowable value which is the minimum of the various potential limits identified in factor c). An adjustment may be necessary to take into account the different volumetric energy densities of SAF and fossil kerosene, using methods known to the skilled person.

The SAF-poor fuel composition may be determined using the same method and constraints as for example described in connection with FIG. 12.

FIG. 15 illustrates the dependency of nvPM number upon fuel flow rate $W_F$ (dashed line) for an example in which two switching points are provided, one at a threshold TP within the pilot-only range of operation and a second TP2 at the staging point SP, in comparison with the corresponding dependency for a default fuel composition such as fossil kerosene (solid line). In this illustration it is assumed that the SAF-rich fuel composition corresponds to fuel composition C from FIG. 7 and that the SAF-poor fuel composition corresponds to the default fuel composition. The switching points TP, TP2 can be seen by the rapid changes in nvPM number at the corresponding fuel flow rate.

FIG. 16 illustrates a method 4000 of operating a gas turbine engine 10 which may be performed using the staged combustor system of FIG. 12 in which two switching points TP, TP2 are provided. Method steps common to the method of FIG. 14 are labelled accordingly. In this example, the regulating 4002 of the fuel delivery further comprises a step of switching 4008 delivery of fuel to the pilot fuel injectors between the first fuel source 302 and the second fuel source 304 at a threshold point within the pilot-only range of operation in addition to the switching 4006 at the staging point. Any of the features described above in connection with FIG. 15 may be incorporated into the method of FIG. 16.

Figure 17:
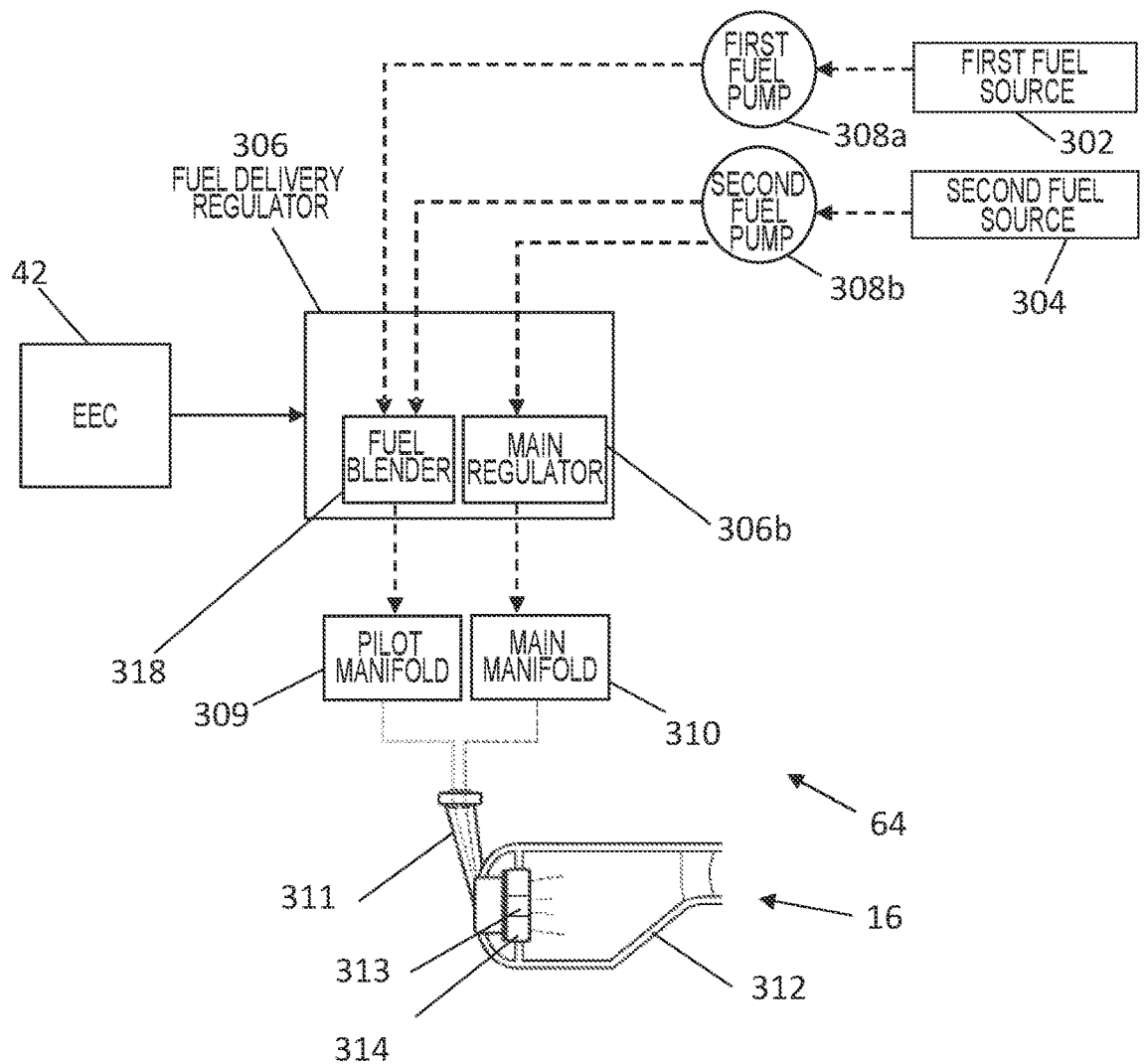
FIG. 17 shows a schematic view of another combustion system.
Figure 18:
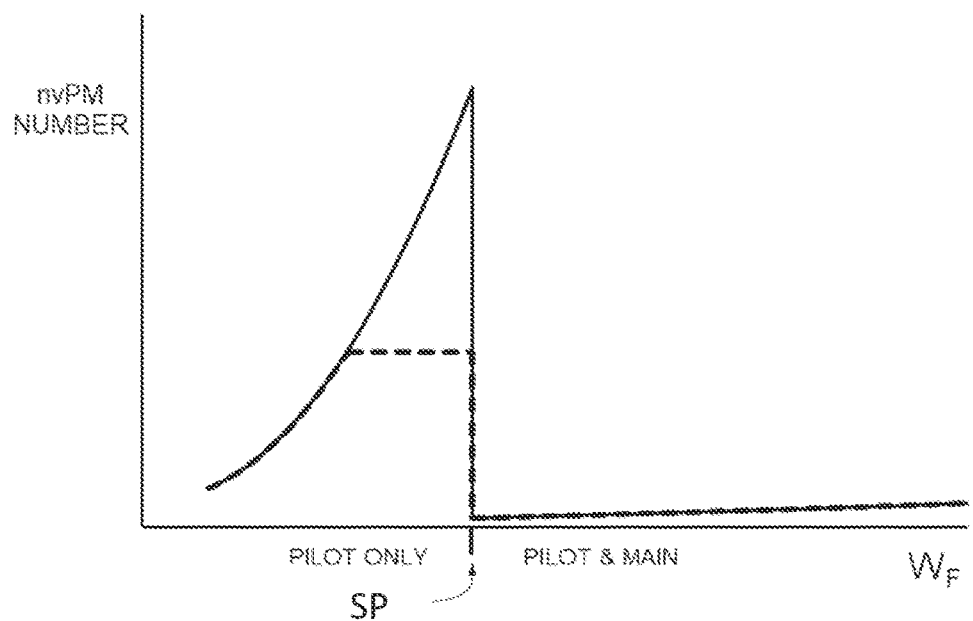
FIG. 18 illustrates the dependency of nvPM number upon fuel flow rate for the arrangement shown in FIG. 17.
Figure 19:
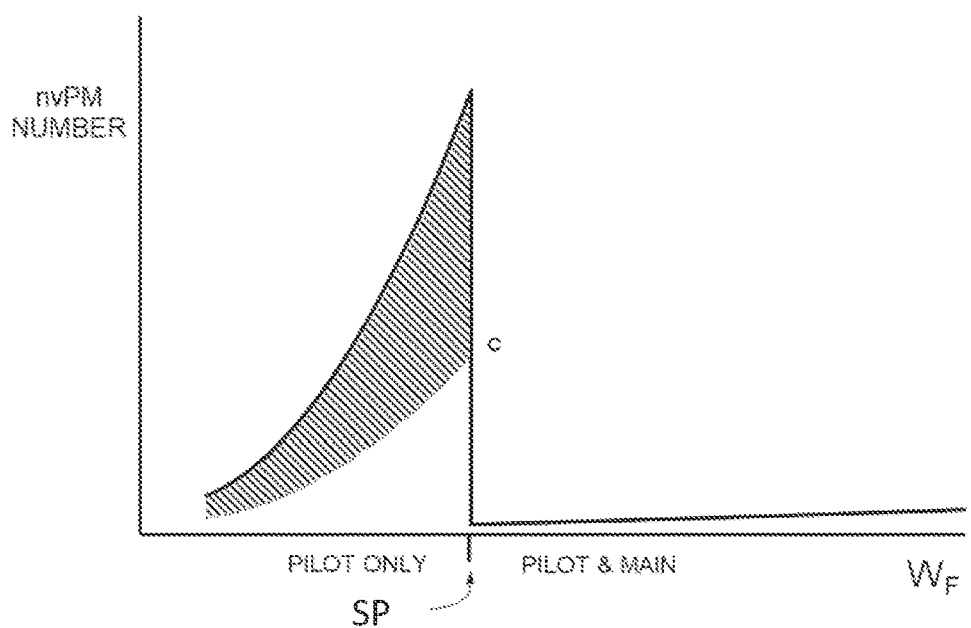
FIG. 19 illustrates a region of feasible nvPM numbers in dependence upon fuel flow rate for the arrangement shown in FIG. 17.

FIGS. 17, 18 and 19

In the previously described examples, the fuel supplied to the pilot and main fuel injectors 313, 314 is limited to the characteristics of the two pre-defined fuels (the first and second fuels) contained within the first and second fuel sources 302, 304. The inventors have determined that further advantages can be obtained by providing fuel containing a blend of fuel from the first and second fuel sources 302, 304 to the combustor 16 to give greater flexibility of the fuel composition provided to the fuel injectors 313, 314.

FIG. 17 illustrates an example in which the fuel delivery regulator 306 comprises a fuel blender 318. The fuel blender 318 is arranged to receive a supply of fuel from both the first and second fuel sources 302, 304 and output fuel from the first fuel source 302, fuel from the second fuel source 304, or a blend thereof (e.g. a blending ratio which can vary between 100% of the first fuel and 0% of the second fuel, to 0% of the first fuel and 100% of the second fuel and any ratio in between). The fuel blender 318 is in fluid communication with the pilot manifold 309, and is arranged to deliver fuel to the pilot fuel injectors 313. The fuel delivery regulator 306 comprises a main regulator 306b connected to the second fuel source 304 and arranged to supply the main manifold 310 and main fuel injectors 314 similarly to other examples. In other examples, the blender may be arranged to supply both the main and pilot fuel injectors 313, 314. By using the fuel blender 318 a blend of fuel may be delivered to the pilot fuel injectors 313 during at least part of the pilot-only range operation. For other parts of the pilot-only operation, and during pilot-and-main operation, the pilot fuel injectors 313 may be provided with fuel from only one of the fuel sources by the fuel blender 313. A blend of fuel from both sources may also be provided during all of the pilot-only range of operation and/or during the pilot-and-main range of operation.

Similarly to the previously described examples, the first fuel contained in the first fuel source 302 may be a low nvPM associated fuel such as a SAF-rich fuel, while the second fuel contained in the second fuel source 304 may be associated with high nvPM emission such as a SAF-poor fuel. When the combustor 16 is operating in pilot-only mode a blend of fuel may be provided to the pilot fuel injectors 313 so that the blended fuel provided is associated with a lower nvPM compared to fuel provided to the main and/or pilot fuel injectors 313, 314 during pilot-and-main operation where nvPM is inherently lower. This may make yet more efficient use of low nvPM producing fuel. The fuel supplied to the pilot fuel injectors 313 during at least part of the pilot-only operation may therefore contain more of the first fuel compared to the fuel provided to the main fuel injectors 314 during pilot-and-main operation. In the example of FIG. 17, the fuel delivery regulator 306 allows fuels from the first and second sources 302, 304 to be mixed by the fuel blender 318 at a desired blend ratio and supplied to the pilot manifold 309. This is in contrast to the example of FIGS. 12, 13 and 14, where a blend of fuel formed by mixing an amount of fuel from the first source 302 and an amount of fuel from the second source 304 cannot be provided.

A number of advantages are associated with providing blended fuel in this way. For example, a hard boundary or switching point (e.g. threshold point TP described above) within the pilot-only region, below which SAF-poor fuel composition is supplied to the pilot fuel injectors 313 and above which SAF-rich fuel composition is supplied to the pilot fuel injectors 313, may be avoided. This may reduce the risk of a sudden increase in soot emissions as fuel flow is reduced, which could otherwise result in unnecessarily high soot emissions during, for example, approach and/or final approach flight phases.

Blending fuel may also be further advantageous because a more nvPM reducing blend of fuel can be used close to the staging point SP (i.e. at fuel flow rates just below the staging point) where nvPM number is at a maximum. This can provide greater overall control of nvPM emission, and more effectively make use of low nvPM fuels.

The percentage of SAF within the SAF-rich first fuel may be as high as possible, subject to any limits on the maximum allowable percentage of SAF, for example certification limits, or for example technical limits related to the specific aircraft and/or to the pilot fuel injectors themselves, or the maximum percentage blend in which SAF is available at the point of fuel loading.

The percentage of SAF within the SAF-rich first fuel may also be constrained by the required filling-factor of the fuel tank(s) used for the SAF-rich fuel composition, in conjunction with the quantity of SAF allocated to the proposed flight. For example, on long range flights requiring complete filling of all fuel tanks 53, 55, the volume of SAF-rich fuel composition may not be less than the capacity of the smallest individual fuel tank that could comprise the first fuel source.

The SAF-poor fuel composition, i.e. the second fuel, may be determined using the same method and constraints as for the previously described examples.

In some examples, the fuel delivery regulator 306 may be arranged to provide a constant ratio blend of fuel from the first fuel source 302 and fuel from the second fuel source 304. This may allow a fuel to be provided to the combustor having characteristics different from the fuels available to supply the aircraft 1. This may provide further flexibility and improved nvPM control. For example, the blend ratio may be determined and fixed for a particular flight once the amount of the fuel in the first and second fuel sources 302, 304 allocated to the flight is known.

In other examples, the fuel blender 318 is arranged to deliver a blend of fuel to the pilot fuel injectors 313 having a varying blend ratio of fuel from the first fuel source 302 and fuel from the second fuel source 304. The blend ratio may be varied within the pilot-only range of operation according to the fuel flow rate, or according to the fuel flow rate divided by the fuel flow rate at the staging point SP. In some examples, fuel blend may be varied such that the proportion of fuel from the first fuel source 302 compared to that from the second fuel source 304 is reduced with decreasing fuel flow rate within the pilot-only range of operation. This may allow the amount of low nvPM producing fuel (e.g. SAF) to be a reduced as the flow rate reduces. In other examples, the opposite dependencies of first fuel content with fuel flow rate may be provided. For example, in some cases, the percentage reduction in nvPM due to the use of SAF may be greater at low power settings (e.g. low fuel flow) than at higher power settings (e.g. high fuel flow).

The fuel delivery regulator 306 of the example of FIG. 17 may be arranged to:

a) Deliver fuel from the second fuel source 304, e.g. high nvPM producing fuel such as SAF-poor fuel for both the pilot fuel injectors 313 and main fuel injectors 314 at fuel flow rates above the staging point;

b) Deliver fuel to the pilot fuel injectors 313 from the first fuel source 302 e.g. low nvPM producing fuel such as SAF-rich fuel at and/or immediately below the fuel flow rate at the staging point SP; and c) Deliver fuel to the pilot fuel injectors 313 having a blend comprising progressively less of the first fuel from the first fuel source 302 and correspondingly more of the second fuel from the second fuel source 304 as overall fuel flow rate is reduced below the staging point.

The ratio of the first fuel and second fuel being supplied to the pilot fuel injectors 313 during pilot-only operation may be varied according to a fuel blending schedule. The fuel blending schedule may be determined by the EEC 42 and used to send control signals to the fuel delivery regulator 306 to control the blend ratio.

In some examples, the dependence of the proportion of fuel from the first fuel source 302 compared to that from the second fuel source 304 on fuel flow rate may be determined according to a desired resultant level of nvPM at a particular fuel flow rate. For example, the blend ratio may be determined such that the nvPM number for any specific fuel flow rate does not exceed a predetermined threshold. For a given flight condition (such as altitude and forward speed), a lookup table may be used to determine the blend ratio (e.g. SAF percentage) necessary to achieve a particular level of nvPM number at a particular $W_F$. Given knowledge of the characteristic values of the first and second fuels (i.e. SAF percentage within each of the two predetermined fuel compositions, SAF-rich and SAF-poor) the proportion of SAF-rich fuel composition required to be delivered to the pilot fuel injectors can be determined. The proportion of SAF-poor fuel blended with the SAF-rich fuel to produce an instantaneous fuel composition to be supplied to the pilot fuel injectors 313 can then also be determined in order to keep nvPM production within a threshold limit throughout the pilot-only operation. The determination of the proportion of each fuel making up the blend may be determined by the EEC 42 based on information obtained from the lookup table, information on the characteristics of the fuel contained within the first and second fuel sources and the current fuel flow rate. Once a blend ratio is determined by the EEC 42 the blender 318 may be controlled accordingly by control signals sent from the EEC 42 to the fuel delivery regulator 306. In some examples, the EEC 42 may calculate the blend ratio in real time in response to changes in current flight condition or current atmospheric conditions.

In another example, the fuel blending schedule (taking account of the variation with $W_F$ of the nvPM # (or nvPM mass) reduction factor for a given fuel composition relative to that for the default or SAF-poor composition) may be determined so as to minimise (or keep within a predefined threshold) the total number (or mass) of emitted nvPM during a period of operation of the gas turbine engine 10, such as a landing and take-off (LTO) cycle.

In advance of a flight, using knowledge of the desired dependency of nvPM number upon $W_F$ and flight conditions, the characteristics of each of the first and second fuels, and knowledge of how much fuel will be used at each value of $W_F$ at each flight condition, the total quantity of each of the first and second fuels that are required for a proposed flight can be determined as described later. The aircraft can therefore be loaded with suitable amount of fuel before the flight.

FIG. 18 illustrates an example of the dependency of nvPM number upon fuel flow rate $W_F$ for the example shown in FIG. 17 (dashed line) in comparison with the corresponding dependency for a default fuel composition such as fossil kerosene (solid line). In this example, the first fuel is a SAF-rich fuel composition which corresponds to fuel composition C from FIG. 7 and the second fuel is a SAF-poor fuel composition that corresponds to the default fuel composition in FIG. 7.

In the example of FIG. 18, the characteristic of the fuel supplied to the pilot fuel injectors 313 during pilot-only operation is determined such that nvPM number does not exceed a predetermined threshold which in the example shown corresponds to the nvPM number of the SAF-rich fuel composition at the staging point SP. In this example there is a region of operation at low values of $W_F$ in which the pilot fuel injectors 313 are supplied with the SAF-poor fuel composition. As $W_F$ increases and nvPM number rises, at some point it is necessary to start blending in some SAF-rich fuel composition in order to prevent nvPM number from rising above the predetermined threshold. As $W_F$ rises further still, the proportion of SAF-rich fuel composition within the blend continues to rise until, at the staging point SP, it reaches 100%. At still higher values of $W_F$, corresponding to pilot-and-main operation, the pilot fuel injectors 313 are once again supplied with SAF-poor fuel composition.

Although FIG. 18 shows a capped nvPM number dependency upon $W_F$, it will be appreciated that through suitable determination of blending ratio dependency upon $W_F$ throughout the region of pilot-only operation, it is possible to achieve any desired dependency of nvPM number upon $W_F$, subject to an upper limit corresponding to the dependency of the second fuel (i.e. the high nvPM associated fuel, such as the SAF-poor fuel composition) and a lower limit corresponding to the dependency of the first fuel (i.e. the low nvPM associated fuel, such as the SAF-rich fuel composition). If the SAF-rich fuel composition corresponds to fuel composition C from 7, the addressable region is shown by the hatched area in FIG. 19.

Figure 20:
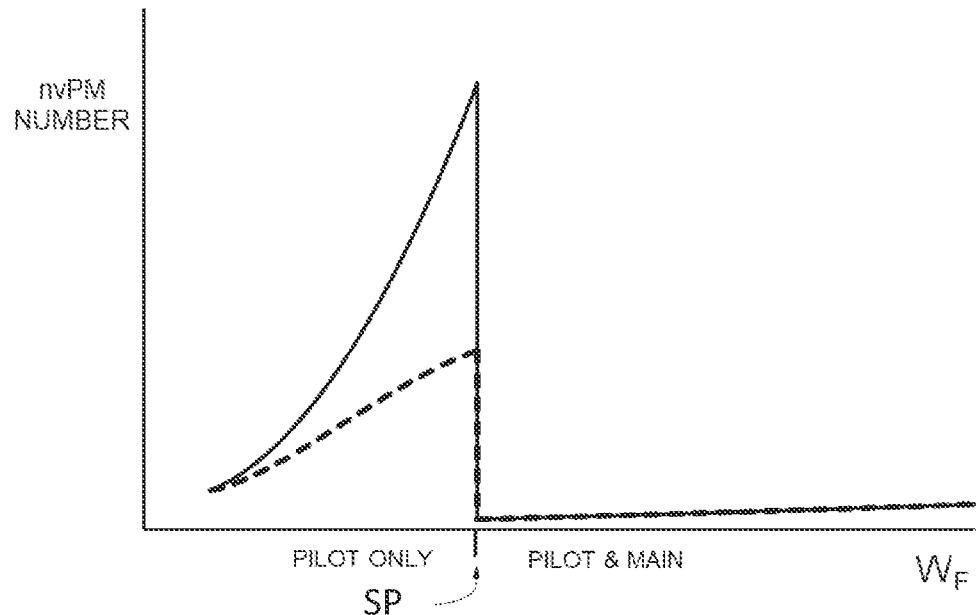
FIG. 20 illustrates another dependency of nvPM number upon fuel flow rate for the arrangement shown in FIG. 17.

Within the addressable region, any single-valued function of nvPM number versus $W_F$ can in principle be achieved by a suitable blending schedule in dependency upon $W_F$ within pilot-only operation. FIG. 20 shows one further example of how the nvPM number may depend on fuel flow rate.

By providing a blend of fuel to the pilot fuel injectors in this way within pilot-only operation (or at least within one or more regions within pilot-only operation) the magnitude of the rate of change of nvPM number with $W_F$ can be made substantially less than that for the default fuel composition such as fossil kerosene, and also less than that for other examples in which switching between fuel sources 302, 304 occurs. As a result, within pilot-only operation, using the example of FIG. 17, $W_F$ could be varied for reasons other than soot emissions without causing very substantial changes in soot emissions. For example, in US2022042465, the fuel flow rates of individual engines are varied during final approach in order to limit handling bleed noise. If we assume that the thrust requirement during final approach corresponds to a region of pilot-only operation, then the examples herein in which fuel is blended by the fuel blender 318 of the present invention may substantially reduce the change in soot emissions that would otherwise accompany such noise-motivated fuel flow changes.

The examples shown in FIGS. 13 and 15 can be thought of as special cases of the blended fuel example in which the SAF-rich fuel composition is used not only at the staging point SP but also throughout a region extending some way to the left of point the staging point (i.e. at lower fuel flow rates). In the example of FIG. 13 that region extends all the way to the left-hand side of the chart. In the example of FIG. 15 there is a switching point at which the fuel composition is switched sharply to the SAF-poor fuel composition within the pilot-only range of operation. It will be appreciated that switching from one fuel type to the other is equivalent to changing the blending ratio from 0:100 to 100:0, or vice versa.

Figure 21:
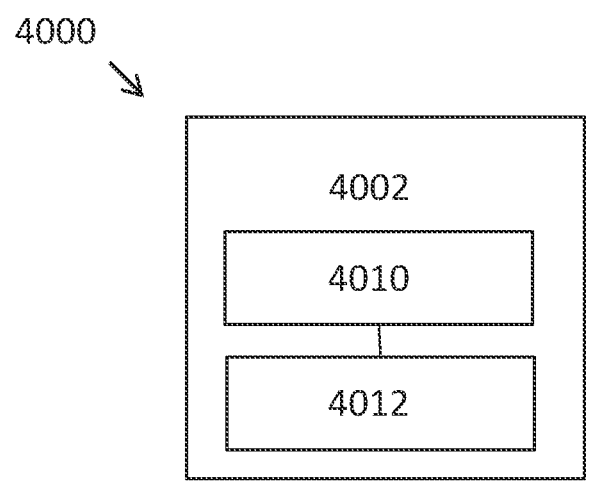
FIG. 21 illustrates another method of operating a gas turbine engine.

FIG. 21 illustrates a method 4000 of operating a gas turbine engine 10 which may be performed using the system of FIG. 17. Steps common to other methods previously described are labelled accordingly. In this example, regulating 4002 the fuel delivery comprises: blending 4010 a supply of fuel from both the first and second fuel sources 302, 304 to form a blended fuel consisting of fuel from the first fuel source 302, fuel from the second fuel source 304, or a blend thereof; and delivering 4012 the blended fuel to the pilot fuel injectors 313. Any of the features described above in connection with FIG. 17 may be incorporated into the method of FIG. 21, even though they are not repeated here.

nvPM Cost Function

In the examples described above control of the fuel characteristics provided to the fuel injectors is based on a desired form of the dependency of nvPM number upon $W_F$ from which the fuel characteristic(s) to be used at each value of $W_F$ are determined to enable that desired form to be achieved. The fuel delivery regulator in these examples may therefore be controlled to minimise nvPM production of the engine. The nvPM production may be in terms of the nvPM content of the engine exhaust e.g. mass or number of nvPM particles produced.

In order to provide yet further improved control of nvPM emission, further factors may be taken into account because the inventors have identified that one emitted soot particle is not equally as disadvantageous as another emitted soot particle. In some examples therefore, the amount of cost or harm caused by each soot particle emitted can be taken into account. For example, soot particles emitted close to the ground may be considered to have a higher human health impact than soot particles emitted several thousand feet above the ground (indeed soot emissions less than 3000 ft above runway altitude are regulated, whereas soot emissions at higher altitudes are not).

The fuel regulator of any of the examples described herein may be arranged to deliver fuel to the pilot fuel injectors in order to control (e.g. optimise or reduce) the nvPM impact of the engine exhaust. The fuel delivery regulator 306 may therefore be arranged to deliver fuel to the pilot fuel injectors to minimise a cost function dependent on one or more nvPM impact parameters. The nvPM impact parameters may relate to the cost or harm of nvPM (e.g. soot) emission of a particular type or in a certain situation. This may allow the gas turbine engine 10 to be operated in such a way as to reduce nvPM emissions that would otherwise cause the most harm compared to those that have less an effect on the environment and/or human health.

The one or more nvPM impact parameters on which the cost function is based may include any one or more of:

i) Height above ground level at which the nvPM production takes place;

ii) Position (e.g. location e.g. longitude and latitude) of the nvPM production. The cost of nvPM emission may be defined as a function of 3D position of soot emissions (e.g. altitude, longitude, latitude), and may take into account proximity to population centres or other important locations;

iii) Weather/atmospheric conditions at a location of the nvPM production. For example the cost function may take into account prevailing winds, weather patterns and atmospheric behaviour such as removal processes in order to assess the future location of emitted soot particles relative to population centres or other important locations;

iv) Climate impacts associated with location of the nvPM production. For example, the climate impacts of the deposition of soot in certain locations may be taken into account. Such locations may include otherwise high-albedo surfaces, e.g. ice;

v) Mass/size of the individual nvPM particles produced. The cost function may be defined so as to prioritise reductions of nvPM number and/or mass in one or more specific particle size range, relative to reductions of nvPM number and/or mass in one or more further size range. The cost function may, for example, comprise a weighted sum over the number (or mass) of particles in different size ranges, the weighting defined so as to reflect the notion that some size ranges might be more harmful to health, or result in a more disadvantageous environmental outcome, than others (and thus carry more importance within the cost function), but without completely ignoring the other size ranges;

vi) Potential contrail production and/or contrail characteristics. For example, the cost function could take into account the likelihood of certain nvPM emission to cause production of a contrail by the aircraft, or to influence the properties or characteristics of a contrail produced by the aircraft. This may specifically apply to contrails formed at the top of the aircraft descent phase where operation of the combustor would likely be substantially below the staging point and the use of low nvPM fuel can have a greater effect;

vii) local air quality (LAQ) impact of nvPM production; and/or viii) Amount of nvPM produced. The cost function may take into account the amount of nvPM emission produced by the engine e.g. in terms of total mass and/or number of nvPM particles in a given time, or an emissions index of the mass (or number) of a nvPM per unit mass of fuel consumed.

Any number of the above impact parameters may be defined in order to define a cost function that is to be minimised and the fuel delivery regulator 306 controlled to provide fuel of the required characteristics to the combustor 16. In some examples, the nvPM production cost function could be incorporated into a wider cost function comprising other costs.

The control of the fuel delivery regulator 306 of any example described herein can be based on the cost function. For example, the on-board blending of the first and second fuel (SAF-rich and SAF-poor) may be used to achieve a desired nvPM number at each operating condition within pilot-only operation. The fuel characteristics supplied to the pilot fuel injectors 313 within pilot-only operation (and hence the corresponding blending ratio of the quantity of the SAF-poor composition to the quantity of the SAF-rich fuel composition) may no longer be a simple function of $W_F$ (indeed it may not even be a single-valued function of $W_F$) but may vary according to other parameters so as to minimise an overall cost function.

Switching Between Pilot-Only and Pilot-and-Main Operation During Cruise

In known staged combustion systems, the staging point SP is typically chosen such that cruise operation takes place within the pilot-and-main region of operation. Operation at low-power settings, such as taxi, descent, and approach, often take place within the pilot-only region of operation.

The inventors have determined that it is further advantageous to operate a staged combustion system so that it is in pilot-only mode during at least some of its cruise operation, while also selectively providing fuel from two different sources to the combustor during the cruise operation.

In another example of the present application, the staged combustion system 64 illustrated in FIG. 5 is additionally or alternatively arranged to switch between the pilot-only range of operation and the pilot-and-main range of operation at a staging point selected so that it corresponds to a steady state cruise mode of operation of the engine 10. The staging point in this example is arranged such that it defines a boundary between a first engine cruise operation range and a second engine cruise operation range. In other words, the staging point is selected to occur at an engine power setting (or other engine operating parameter indicative of the engine power setting) that is above the minimum engine power setting at which the engine operates in a steady state cruise. This defines a range of relatively lower cruise engine power conditions, in which the staged combustion system operates in the pilot-only mode of operation, compared to pilot-and-main operation at relatively higher cruise engine power settings. This effectively moves the staging point to a higher power setting such that the combustion system can still operate in pilot-only operation at higher powers than the minimum cruise power setting. The pilot-only and pilot-and-main ranges are therefore redefined such that the staged combustion system 84 switches between modes of operation at a different $W_F$ i.e. the boundary separating the ranges is changed compared to prior art systems.

In this example, the fuel delivery regulator 306 is arranged to deliver fuel to the pilot fuel injectors 313 during at least part or preferably all of the first cruise operation range having a different fuel characteristic from fuel delivered to one or both of the pilot fuel injectors 313 and main fuel injectors 314 during the second cruise operation range. More specifically, during the first cruise operation range, the fuel regulator 306 supplies fuel to the pilot fuel injectors from the available fuel sources that is different from that supplied to the fuel injectors during the second cruise operation range. This may be fuel supplied to both main and pilot fuel injectors during main-and-pilot operation.

The inventors have determined that by setting the staging point so that lower power cruise operation may take place in pilot-only mode certain engine emissions may be reduced and combustion efficiency improved. When combined with selectively using fuels having different characteristics, the inventors have determined that disadvantageous effects on emissions that would otherwise result in moving the staging point can be mitigated. This therefore provides an overall improvement in combustion efficiency and reduced emissions by a combination of these factors.

Figure 22:
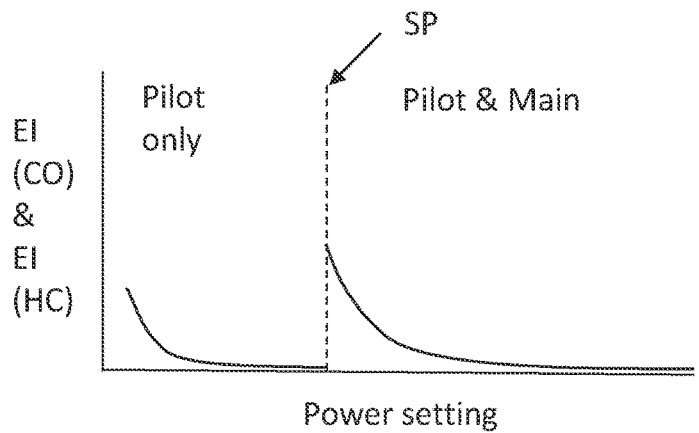
FIG. 22 illustrates the dependence of the carbon monoxide (CO) emission index (EI) and unburnt hydrocarbon (HC) emission index on engine power setting.

Emissions of pollutants may be characterised by an emission index (EI), detailing the mass (or number) of a particular pollutant per unit mass of fuel consumed. The inventors have observed that in pilot-only operation, at very low engine powers, the mass emission index of carbon monoxide (CO) and of unburned hydrocarbons (HC) can be relatively high. Not only does this represent a release of pollutants to the atmosphere, it also reduces fuel efficiency due to incomplete combustion of fuel i.e. not all fuel is fully burned. This may mean mission fuel burn is increased and/or payload-range capability of the aircraft is reduced. As engine power increases (still within pilot-only operation), the EI(CO) and EI(HC) both decrease and thereafter remain low. However, upon moving to still higher engine power settings and making the transition to pilot-and-main operation, EI(CO) and EI(HC) again become high before subsiding once again at still higher engine power settings. This is illustrated FIG. 22, which shows the dependence of EI(CO) and EI(HC) on engine power setting, where the vertical dashed line represents the staging point SP.

During the first cruise operation range, the engine operates at relatively low power settings, such that were the staging point selected to cause the combustion system to operate in pilot-and-main mode, the CO and HC emission would be relatively high. This is because even if the staging point were chosen such that cruise operation takes place in pilot-and-main mode i.e. above the staging point SP, some parts of cruise operation may lie fairly close to the staging point (e.g. just above it). Disadvantageously this would mean that HC and CO emissions may be high during such operation, and combustion efficiency may be disadvantageously and materially reduced as a result (resulting in higher fuel consumption and/or reduced aircraft payload-range capability).

Figure 23:
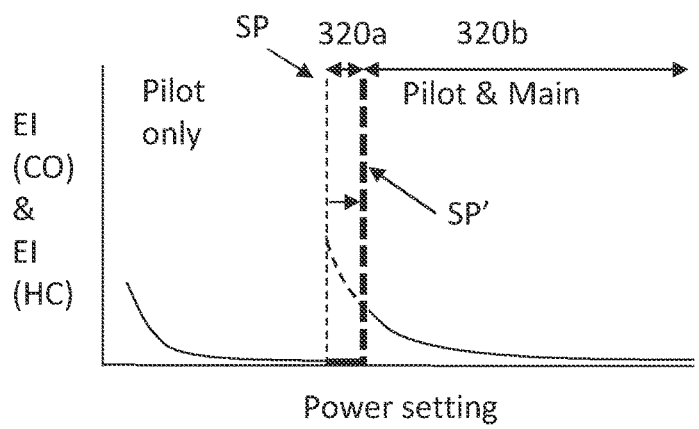
FIG. 23 illustrates the dependence of carbon monoxide (CO) emission index (EI) and unburnt hydrocarbon (HC) emission index on engine power setting with a staging point (SP) set to define first and second cruise operation ranges.

By setting the staging point so that low power cruise operation takes place in pilot-only mode, this disadvantageous emission of CO and HC can be reduced or avoided. This is illustrated in FIG. 23, which shows the effect of setting the staging point SP' to define a first cruise operation range 320a and a second cruise operation range 320b. As can be seen in FIG. 23, the first cruise operation range 320a corresponds to low power cruise, that is below the staging point SP', with the second cruise operation range 320b corresponding to higher power cruise operation above the staging point SP'. Within the first cruise operation range 320a, the staged combustion system 64 is configured to operate in pilot-only mode, thus providing low CO and HC emissions. As a result of moving the staging point to a higher power setting (e.g. from the thin to the thick dashed lines in FIG. 23 marked respectively SP and SP'), CO and HC emissions remain low over a wider range of engine power settings (e.g. the thick solid line versus the thin dotted line in the dependence of EI(CO) and EI(HC) on power setting).

Figure 24:
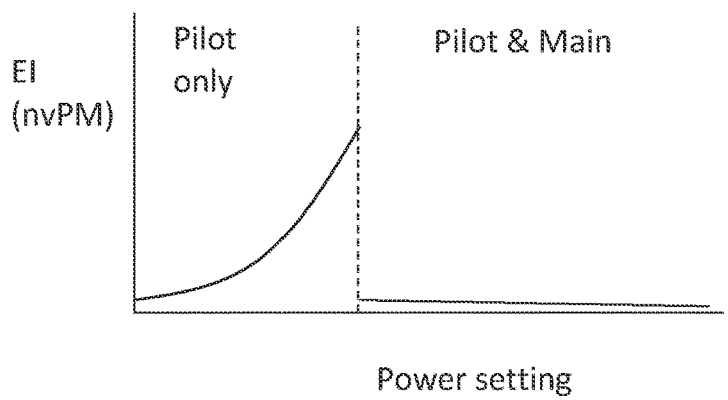
FIG. 24 illustrates the dependence of nvPM emission index on engine power setting.

The inventors have further observed that the emission index of nvPM rises rapidly with engine power in pilot-only mode but is typically uniformly low in pilot-and-main mode. For nvPM, the emissions index may be described with reference to the mass of nvPM or to the number of nvPM particles (per unit mass of fuel). An example of the dependence of nvPM on engine power setting is illustrated in FIG. 24.

As a result of effectively moving the staging point to a higher power setting, default EI(nvPM) is disadvantageously increased. As can be inferred from FIG. 24, operation in pilot-only mode at higher powers would lead to increased nvPM production as there would be less of the engine power range occurring in pilot-and-main operation where nvPM production is low, and the nvPM increases rapidly at higher powers in pilot-only mode of operation.

The inventors have determined that this otherwise detrimental increase in nvPM can be mitigated by the selective use of a fuel of a different fuel characteristic during at least the part of the pilot-only cruise range of operation at which high nvPM would otherwise be produced. For example, the fuel delivered to the pilot fuel injectors 313 during the first engine cruise operation range 320a may be selected to be fuel associated with a level of nvPM production which is less than that of the fuel delivered to one or both of the pilot and main fuel injectors 313, 314 during at least part of the second engine cruise operation range 320b. This can be achieved by the fuel contained within the first fuel source 302 being associated with low nvPM production compared to the second fuel source 304 (at corresponding combustion condition conditions).

Figure 25:
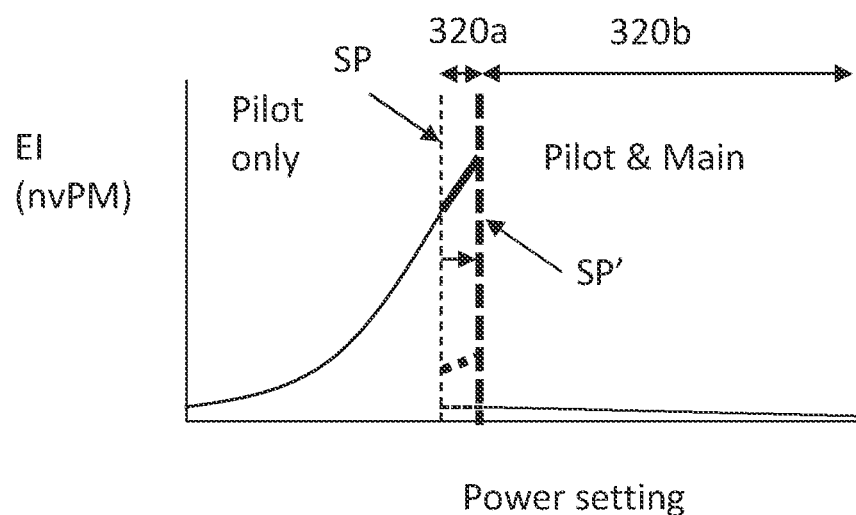
FIG. 25 illustrates the dependence of nvPM emission index on engine power setting to illustrate the result of selectively using fuel of a different characteristic during a first engine cruise operation.

The effect of selectively using fuel of a different characteristic during the first engine cruise operation range 320a is illustrated in FIG. 25. The thick solid line in the EI(nvPM) dependence on power can be compared to the thick dotted line in the first cruise operation range 320a that is produced by using a lower nvPM producing fuel.

In some examples, the fuel characteristic by which fuel from the first fuel source 302 differs from fuel from the second fuel source 304 may be the percentage of sustainable aviation fuel (SAF) present in the respective fuel as discussed above. The fuel delivered to the pilot fuel injectors 313 during at least part of the pilot-only cruise range of operation would similarly have a different percentage of SAF compared to the fuel delivered to one or both of the pilot fuel injectors 313 and main fuel injectors 314 during at least part of the pilot-and-main range of operation. As discussed above, compared to fossil kerosene, SAF offers substantially lower nvPM, and can therefore be used to mitigate the increase in nvPM that would otherwise result from the additional pilot-only cruise operation. For example, the fuel provided to the pilot fuel injectors during the first cruise operation range 320a may have a greater proportion of SAF compared to that provided to the fuel injectors during the second cruise operation range 320b. This allows a limited available amount of SAF (or other low nvPM fuel) to be used selectively to reduce overall nvPM, CO and HC emissions.

This may however not always be the case. In some examples, fossil kerosene may be treated to remove aromatic components, particularly naphthalenes, in order to produce a largely paraffinic fuel of fossil origin which would be a low nvPM producing fuel. Other fuel characteristics may therefore be associated with low nvPM, such as the percentage of aromatic content or naphthalene content.

The inventors have therefore found that through a combination of selectively using two fuel types and operating in pilot-only mode at low power cruise the advantageous reduction in CO and HC emissions is accompanied by a smaller disadvantageous increase in nvPM than would be the case without use of a SAF-rich fuel composition (or other low nvPM associated fuel) in the relevant range of engine power settings.

The selective pilot-only cruise operation and selective fuel use of the present application is advantageous over other known methods to reduce overall nvPM, HC and CO emission. For example, alternative solutions include having a "pilot-and-half-main" region of operation which lies between the pilot-only region and the pilot-and-main region. When the engine power setting corresponds to the pilot-and-half-main region, instead of igniting all of the main fuel burners, only a proportion (e.g. half) of them are lit, with for example, an alternate on-off-on-off distribution around the combustor annulus (other arrangements could be contemplated such as lighting main burners on one half of the annulus and not on the other half). However, this gives rise to uneven combustion properties around the combustor annulus and may also be disadvantageous for turbine operation and turbine life. Another approach is to have a staged pilot system in which the "pilot-only" region of operation is divided into sub-regions, in which progressively greater numbers of pilot burners are switched on at progressively higher engine power settings within the overall "pilot-only" region. Such a configuration disadvantageously adds weight and complexity which can be avoided by the methods of the present application.

In one example, the first cruise operation range corresponds to operation of the aircraft in a later part of a cruise segment of a flight, and the second operation range corresponds to operation of the aircraft in a relatively earlier part of the cruise segment. For example, during an aircraft flight cycle the cruise operation may be divided into one or more cruise segments. These may correspond to steady state cruise operation at different altitudes. Towards the end of a cruise segment, the engine power setting required to maintain steady state cruise at the specified Mach number and altitude will reduce as the aircraft burns fuel and reduces in weight. As less thrust is therefore required at a later part of the cruise segment, the engine power setting is reduced. The combustion system of the present application may therefore be arranged to switch to pilot-only operation at low engine powers towards the end of a cruise segment, rather than remain in pilot-and-main operation throughout the cruise segment (or segments if there are more than one) of the flight. This helps to reduce HC and CO production that might otherwise occur towards the end of the cruise segment.

In another example, the first cruise operation range 320a corresponds to steady state subsonic cruise operation of the engine and the second cruise operation range 320b corresponds to steady state supersonic cruise operation of the engine. In this example, the gas turbine engine 10 is arranged to provide both subsonic and supersonic cruise operation of the aircraft to which it is mounted. The staging point may be determined such that the pilot-only cruise operation corresponds to relatively low engine power subsonic operation, whereas the pilot-and-main cruise operation corresponds to higher engine power supersonic operation.

For a supersonic aircraft, supersonic cruise is likely to be possible over oceans, but over land cruise may be constrained to be subsonic for compliance with noise regulations. In such an example, supersonic cruise may correspond to a high engine power setting, well above the staging point. Subsonic cruise may however in this example correspond to much lower engine power settings that might sit close to a default or prior art staging point, resulting in low combustion efficiency and high emissions of CO and HC during subsonic cruise. A supersonic aircraft may consume a material proportion of its fuel in subsonic cruise, and so combustion efficiency at that operating condition is of high importance. By operating in pilot-only mode during subsonic cruise, emissions of CO and HC can be reduced, while fuel of a different characteristic can be supplied to minimise any increase in nvPM production. The steady state supersonic cruise operation may occur before the steady state subsonic cruise operation, or vice versa. In some examples, the steady state subsonic cruise operation may be subsonic cruise operation over land, while the steady state supersonic cruise operation may be supersonic cruise operation over water (e.g. over the sea).

In order to supply fuel to the pilot fuel injectors 313 during the first cruise operation that is different from that supplied to the combustor during the second cruise operation the fuel delivery regulator 306 is arranged to supply fuel selectively from the first and second fuel sources 302, 304 as described above (e.g. fuel from only the first fuel source 302, fuel from only the second fuel source 304, or a mixture thereof). In one example, the fuel delivery regulator 306 may comprise a fuel blender 318 as shown in FIG. 17. Similarly to as described above, the fuel blender is arranged to receive a supply of fuel from both the first and second fuel sources 302, 304 and output a fuel consisting of fuel from the first fuel source, fuel from the second fuel source, or a blend thereof. This blended fuel is supplied to the pilot fuel injectors 313, with fuel from a single fuel source (the second fuel source 304 in the example above) being supplied to the main fuel injectors 314. In other examples, the blender may be arranged to supply both the main and pilot fuel injectors with an appropriate blend of fuel. In yet other examples, the fuel delivery regulator 306 of any of the examples described herein may be used to supply fuel in the first and second cruise operation ranges (for example, those using separate regulators for the first and second fuel sources or a pilot regulator arranged to switch between fuel sources).

As discussed above in connection with the example shown in FIG. 17, the dependence of the proportion of fuel from the first fuel source 302 compared to that from the second fuel source 304 on fuel flow rate may be determined according to a desired resultant level of nvPM at a particular fuel flow rate. For example, the proportion of fuel delivered from the first fuel source 304 compared to that from the second fuel source 304 may be determined according to a desired resultant level of nvPM at a particular fuel flow rate within the first engine cruise operation range. The amount of fuel supplied from each fuel source may be determined such that the nvPM does not exceed a predetermined threshold or such that the nvPM production is minimised over a period of operation of the gas turbine engine as described above. In any of the examples described herein this may be achieved by suitable control of the blender 318, or any of the other fuel delivery regulators 306 described herein.

In some examples, the proportion of fuel delivered from the first fuel source 302 compared to that delivered from the second fuel source 304 during the first cruise operation range may be determined at least partly according to any one or more of:

a) the amount of fuel having the first fuel characteristic and the amount of fuel having the second fuel characteristic available for a proposed flight. This may for example, be provided by an estimate or measurement of the amount of fuel in the fuel tanks 53, 55 making up first and second fuel sources;

b) the amount of total fuel requirement for the fuel injectors 313 during pilot-only operation for the entire flight in a range of operation in which fuel is provided from the first fuel source 302; and/or c) a fuel composition limit parameter (e.g. a certification limit, fuel composition available for fueling, or aircraft/engine limits).

Figure 26:
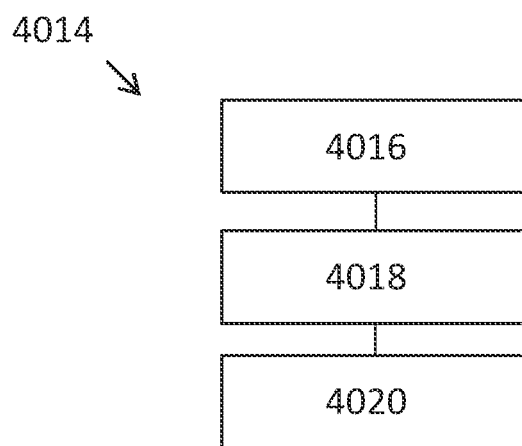
FIG. 26 illustrates another method of operating a gas turbine engine.

FIG. 26 illustrates a method 4014 of operating a gas turbine engine according to the example above in which fuel of a different characteristic is delivered to the pilot fuel injectors during the first engine cruise operation range. The method 4014 comprises regulating 4016 fuel delivery to the pilot and/or main fuel injectors 313, 314 from the first fuel source 302 containing a first fuel having a first fuel characteristic and the second fuel source 304 containing a second fuel having a second fuel characteristic, as described above using the fuel delivery regulator 306 of any example herein (i.e. fuel from only the first fuel source 302, fuel from only the second fuel source 304, or a blend thereof). The second fuel characteristic is different from the first as described above.

The method further comprises switching 4018 between the pilot-only range of operation and the pilot-and-main range of operation at a staging point during a steady state cruise mode of operation of the engine to define a first engine cruise operation range 320a and a second engine cruise operation range 320b. The method further comprises delivering 4020 fuel to the pilot fuel injectors 313 during at least part of the first engine cruise operation range 320a having a different fuel characteristic from fuel delivered to one or both of the pilot and main fuel injectors 313, 314 during the second engine cruise operation range 320b. Any of the features described above in connection with the examples in which different fuel is supplied in the first and second engine cruise operation ranges may be incorporated into the method 4014, even though they are not repeated here.

Varying Staging Ratio in Steady State Cruise Close to Staging Point

In another example of the present application, the staged combustion system 64 illustrated in FIG. 5 is additionally or alternatively arranged to operate in a transition range of operation between the pilot-only range of operation and the pilot-and-main range of operation. In the present examples the transition range of operation is provided during steady state cruise operation of the engine. Within the transition range of operation, fuel is delivered to both the pilot fuel injectors and main fuel injectors 313, 314 at a transition staging ratio. As defined elsewhere herein, the staging ratio defines the relative fuel flow mass rates attributable to the pilot fuel injectors 313 compared to the main fuel injectors 314. In the pilot-only range of operation, the stating ratio is, by definition, 100:0. In the pilot-and-main range of operation, the combustor is configured to operate with a pilot-and-main staging ratio which may be 20:80 or 30:40 etc. Within the transition range of operation the combustor is configured to operate using a transition staging ratio which is different from the pilot-and-main stating ratio (and different from the pilot-only staging ratio, as fuel is delivered to both the main and pilot fuel injectors during the transition range of operation). More specifically, in the transition range of operation, the proportion of fuel flow rate attributable to the pilot fuel injectors compared to the main fuel injectors is greater than for the pilot-and-main staging ratio. In other words, a smooth or intermediate transition is provided in which a greater proportion of fuel is provided to the pilot fuel injectors compared to switching directly between all of the fuel being supplied to the pilot fuel injectors in pilot-only mode, and the pilot-and-main staging ratio in which a smaller proportion of fuel is supplied to the pilot fuel injectors. In other words, rather than moving the sharp staging point to a higher power setting (as described elsewhere herein), the inventors have determined that a transition region can be included that is characterised by a slower transition (with respect to engine power setting) from the pilot-only staging ratio (100:0) to the chosen pilot-and-main staging ratio (e.g. 20:80).

Figure 27:
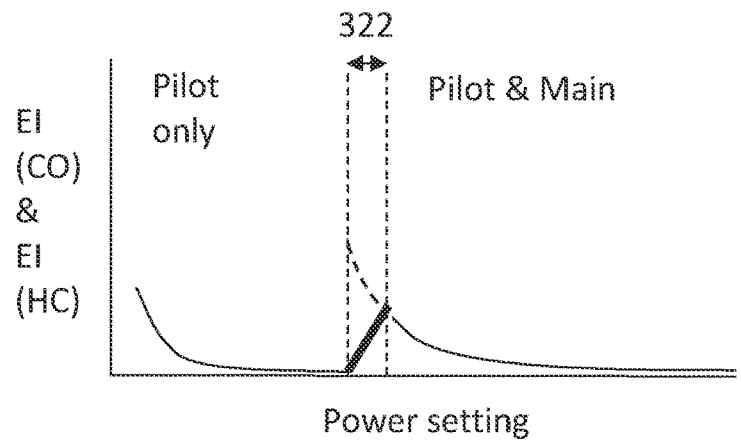
FIG. 27 illustrates the dependence of CO and HC emission index (EI) on engine power setting to illustrate the effect of a transition range of operation between a pilot-only and pilot-and-main range of operation.

The inventors have determined that by configuring the staged combustion system 64 to operate in a transition range (i.e. a transition range of operation) between the pilot-only and pilot-and-main operation the amount of CO and HC emission operating within that range of engine power settings can be reduced. This is illustrated in FIG. 27, which shows the dependence of CO and HC emission index (EI) for a staged combustor (such as those described herein) on engine power setting. The transition range is labelled 322, and lies at an engine power range between pilot-only operation and pilot-and-main operation. At engine powers within the transition range a high level of HC and CO would be emitted if the combustor 16 were to operate at the pilot-and-main staging ratio, as shown by the dotted line in the HC and CO curve of FIG. 27. By operating at the transition staging ratio (which in this case gradually reduces as engine power increases), the CO and HC emission index is reduced, as shown by the thick solid line in the HC and CO curve within the transition range.

Figure 28:
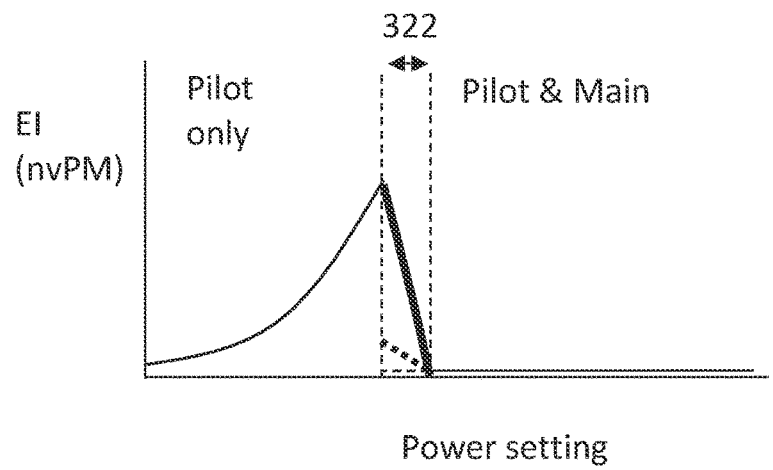
FIG. 28 illustrates the dependence of nvPM emission index on engine power setting to further illustrate the effect of the transition range of operation.

In this example, the fuel delivery regulator 306 is arranged to deliver fuel to one or both of the pilot 313 and main 314 fuel injectors during the transition range of operation having a different fuel characteristic from fuel delivered to one or both of the pilot and main fuel injectors 313, 314 during at least part of the pilot-and-main range of operation The inventors have further determined that, disadvantageously, default EI(nvPM) within the transition range 322 is increased for fuel of the same characteristics. This can be seen in FIG. 28, which illustrates the dependence of the nvPM emission index on engine power for a staged combustor. The thin dotted line in FIG. 28 represents the nvPM emissions should the transition range 322 not be provided. The thick solid line shows the effect on nvPM emissions of introducing the transition range 322. In the present example, the inventors have determined that EI (nvPM) in the transition range 322 can be mitigated by the use of fuel of a different characteristic (e.g. SAF-rich fuel) as shown by the thick dotted line in the nvPM curve within the transition range. Thus, the nvPM penalty (required to achieve lower CO/HC emissions in the transition range 322) is reduced by using SAF-rich fuel composition within the transition range 322 rather than using a default fuel composition within the transition range 322.

In some examples therefore the fuel delivered to at least the pilot fuel injectors 313 by the fuel delivery regulator 306 during the transition range of operation 322 may be selected to be fuel associated with a level of nvPM production which is less than that of the fuel delivered to one or both of the pilot and main fuel injectors 313, 314 during at least part of the pilot-and-main range of operation. This can be achieved by the fuel contained within the first fuel source 302 being associated with low nvPM production compared to the fuel contained within the second fuel source (at corresponding combustion condition conditions). In some examples, fuel delivered to both the pilot and main fuel injectors 313, 314 by the fuel delivery regulator 306 during the transition range of operation 322 is low nvPM producing fuel. In some other examples, only the fuel delivered to the pilot fuel injectors 313 during the transition range of operation 322 is selected to be associated with a low level of nvPM (i.e. with the fuel delivered to the main fuel injectors remaining the same). This may make better use of the amount of low nvPM fuel available, as supplying fuel to the main fuel injectors (i.e. the lean part of the fuel system) may provide less of an effect on the reduction in nvPM.

In some examples, the fuel characteristic by which fuel from the first fuel source 302 differs from fuel from the second fuel source 304 may be the percentage of sustainable aviation fuel (SAF) present in the respective fuel as discussed above. The fuel delivered to the pilot fuel injectors 313 during the transition range 322 of operation would similarly have a different percentage of SAF compared to the fuel delivered to one or both of the pilot fuel injectors 313 and main fuel injectors 314 during at least part of the pilot-and-main range of operation. As discussed above, compared to fossil kerosene, SAF offers substantially lower nvPM, and can therefore be used to mitigate the increase in nvPM that would otherwise result from the additional cruise operation. For example, the fuel provided to the pilot fuel injectors during the transition operation range may have a greater proportion of SAF compared to that provided to the fuel injectors during the pilot-and-main operation range. This allows a limited available amount of SAF (or other low nvPM fuel) to be used selectively to reduce overall nvPM, CO and HC emission.

This may however not always be the case. In some examples, fossil kerosene may be treated to remove aromatic components, particularly naphthalenes, in order to produce a largely paraffinic fuel of fossil origin which would be a low nvPM producing fuel. Other fuel characteristics may therefore be associated with low nvPM, such as the percentage of aromatic content or naphthalene content. The first and second fuels may therefore differ by characteristics other than the SAF content while still achieving the desired effect on nvPM emissions.

During the transition range of operation 322 the transition staging ratio may vary with changing engine power setting. In one example, the transition staging ratio has a continuous variation with changing engine power within the transition range of operation 322. This may provide a smooth transition between the staging ratio in the pilot-only and pilot-and-main range of operation. The continuous variation may be such that the proportion of the total fuel flow to the fuel injectors (i.e. total being delivered to the pilot and main fuel injectors) that is attributable to fuel flow to the pilot fuel injectors 313 decreases with increasing engine power during the transition range of operation 322. The proportion of the total fuel flow to the fuel injectors that is attributable to fuel flow to the main fuel injectors 314 on the contrary increases with increasing engine power within the transition range of operation 322.

In other examples, the transition staging ratio may have a constant intermediate value that is different from the pilot-and-main staging ratio. The transition staging ratio may lie between the pilot-only ratio and the pilot-and-main ratio. This therefore provides a more gradual transition from the pilot-only to pilot-and-main staging ratios. For example, the transition staging ratio may be 70:30, which is between 100:0 in the pilot-only range, and a pilot-and-main staging ratio which is for example 20:80 or 30:70.

In yet other examples, the transition staging ratio varies between a series of constant intermediate values, each being different from the pilot-and-main staging ratio. Moreover, each of the intermediate ratios may lie between that of the pilot-only range and that of the pilot-and-main range. For example, the transition staging ratio may be a series of values of 80:20, 60:40 and 40:60. The pilot-and-main ratio may in this example be 20:80. The intermediate staging ratios may thus decrease towards the pilot-and-main ratio (i.e. a progressively smaller proportion of the total fuel is provided to the pilot fuel injectors, and a progressively greater proportion of the total fuel is provided to the main fuel injectors). This is however only one example, and any other number and values of intermediate transition staging ratios may be used.

In some examples, the transition staging ratio may have a continuous variation with engine power in part of the transition range of operation and may have one or more constant values in another part of the transition range of operation. The examples above may therefore be combined. In other examples, the staging ratio may have a continuous variation over all of the transition range of operation, or one or more constant values across all of the transition range of operation.

In order to supply fuel to the pilot fuel injectors 313 during the transition operation range 322 that is different from that supplied to the combustor 16 during the pilot-and-main range of operation the fuel delivery regulator 306 is arranged to supply fuel selectively from the first and second fuel sources 302, 304 as described above (e.g. from only the first fuel source 302, only the second fuel source 304, or a mixture thereof). In one example, the fuel delivery regulator 306 may comprise a fuel blender 318 as shown in FIG. 17. Similarly to as described above, the fuel blender is arranged to receive a supply of fuel from both the first and second fuel sources 302, 304 and output fuel from the first fuel source, fuel from the second fuel source, or a blend thereof. This blended fuel is supplied to the pilot fuel injectors 313, with fuel from a single fuel source (the second fuel source 304 in the example above) being supplied to the main fuel injectors 314. In other examples, the blender may be arranged to supply both the main and pilot fuel injectors with an appropriate blend of fuel. In yet other examples, the fuel delivery regulator 306 of any of the examples described herein may be used to supply fuel in the pilot-only, transition and pilot-and-main ranges (for example, those using separate regulators for the first and second fuel sources or a pilot regulator arranged to switch between fuel sources).

As discussed above in connection with the example shown in FIG. 17, the dependence of the proportion of fuel from the first fuel source 302 compared to that from the second fuel source 304 on fuel flow rate may be determined according to a desired resultant level of nvPM at a particular fuel flow rate. For example, the proportion of fuel delivered from the first fuel source 302 compared to that from the second fuel source 304 may be determined according to a desired resultant level of nvPM at a particular fuel flow rate within the transition range 322. The amount of fuel supplied from each source may be determined such that the nvPM does not exceed a predetermined threshold or such that the nvPM production is minimised over a period of operation of the gas turbine engine as described above. In any of the examples described herein this may be achieved by suitable control of the blender 318, or any of the other fuel delivery regulators 306 described herein.

In some examples, the proportion of fuel delivered from the first fuel source 302 compared to that delivered from the second fuel source 304 during the transition operation range 322 may be determined at least partly according to any one or more of:

a) the amount of fuel having the first fuel characteristic and the amount of fuel having the second fuel characteristic available for a proposed flight. This may for example, be provided by an estimate or measurement of the amount of fuel in the fuel tanks 53, 55 making up first and second fuel sources;

b) the amount of total fuel requirement for the fuel injectors 313 during pilot-only operation for the entire flight in a range of operation in which fuel is provided from the first fuel source 302; and/or c) a fuel composition limit parameter (e.g. a certification limit, fuel composition available for fueling, or aircraft/engine limits).

Figure 29:
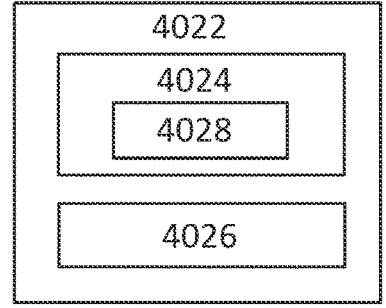
FIG. 29 illustrates another method of operating a gas turbine engine.

FIG. 29 illustrates a method 4022 of operating a gas turbine engine according to the example above in which fuel of a different characteristic is delivered to the pilot fuel injectors during the transition range 322 compared to the pilot-and-main range of operation. The method 4022 comprises regulating 4024 fuel delivery to the pilot and/or main fuel injectors 313, 314 from the first fuel source 302 containing a first fuel having a first fuel characteristic and the second fuel source 304 containing a second fuel having a second fuel characteristic as described above using the fuel delivery regulator 306 of any example herein (e.g. such that the fuel delivered is fuel from only the first fuel source, fuel from only the second fuel source, or a blend thereof). The second fuel characteristic is different from the first as described above.

The method further comprises operating 4026 the staged combustion system in a transition range of operation 322 between the pilot-only and the pilot-and-main ranges of operation in which fuel is delivered to both the pilot and main fuel injectors at a transition staging ratio which is different from the pilot-and-main staging ratio. The regulating 4024 fuel delivery to the pilot and/or main fuel injectors comprises delivering 4028 fuel to one or both of the pilot and main fuel injectors during the transition range of operation 322 having a different fuel characteristic from fuel delivered to one or both of the pilot and main fuel injectors during at least part of the pilot-and-main range of operation Any of the features described above in connection with the examples in which different fuel is supplied in the transition range 322 may be incorporated into the method 4022, even though they are not repeated here.

Staged Combustor Control During Acceleration

An engine acceleration is caused by deliberately increasing fuel flow rate to a value above that necessary to maintain steady-state operation. The inventors have observed that this "over-fueling" causes in initial increase in fuel-air-ratio in the combustor and may give rise to increased production of nvPM (soot or smoke), particularly at engine power settings corresponding to pilot-only operation.

To reduce the production of excessive amounts of nvPM during acceleration, it is known to switch to an "acceleration" mode of operation of a gas turbine engine in which the staging point occurs at a lower engine power setting. Thus, the transition to pilot-and-main operation takes place at a lower engine power setting than would be the case during steady state operation. This helps to reduce the overall amount of nvPM produced during the acceleration.

The inventors have observed that switching to such a known acceleration mode however may have a number of drawbacks. For example, an increase in HC and CO emissions may be caused. In some known solutions, maintaining acceptable CO and HC results in higher $NO_x$ emissions as the leanest flames that produce the lowest $NO_x$ in this region produce too much CO and HC, and conversely design changes aimed at reducing CO and HC can result in higher NOx emissions over the whole power curve. For example one known solution could be to physically change and richen the whole main fuel injector to reduce the CO and HC emissions, which would then lead to higher NOx at all powers.

In another example of the present application, the staged combustion system 64 illustrated in FIG. 5 is additionally or alternatively arranged to operate in an acceleration mode of operation. In the acceleration mode the fuel delivery regulator 306 is arranged to deliver fuel to the fuel injectors (i.e. the pilot and/or main fuel injectors 313, 314) having a different fuel characteristic from fuel delivered to the fuel injectors (i.e. the pilot and/or main fuel injectors 313, 314) during at least a part of the steady state mode of operation.

The acceleration mode of the engine is one in which the fuel delivery regulator 306 is arranged to deliver fuel to the fuel injectors 313, 314 at a rate greater than that sufficient to maintain steady-state operation of the engine. This causes acceleration of the engine, by which we mean increasing the angular velocity of one or more spools of the engine. In the steady state mode of operation the fuel injectors are not over-fueled such that no engine acceleration occurs.

The inventors have determined that increased nvPM emissions when the engine operates in the acceleration mode can be avoided or reduced by using a fuel with different characteristics from that which is used during steady state operation. This allows the staging point during the acceleration mode to remain the same or similar to that of the steady state mode of operation, thus avoiding or reducing/limiting any disadvantageous increase in HC or CO emissions.

In some examples therefore the fuel delivered to the fuel injectors (e.g. one or both of the pilot and main fuel injectors 313, 314) during the acceleration mode of operation may be selected to be fuel associated with a level of nvPM production which is less than that of the fuel delivered to the fuel injectors (e.g. one or both of the pilot and main fuel injectors 313, 314) during at least some of the steady state mode of operation. This can be achieved by the fuel contained within the first fuel source 302 being associated with low nvPM production compared to the fuel contained within the second fuel source 304 (at corresponding combustion conditions). Fuel associated with a lower nvPM production may be provided to at least the pilot fuel injectors 313 during operation in the acceleration mode as that will have the most significant effect on nvPM production. Preferably, fuel associated with a lower nvPM production may be provided to only the pilot fuel injectors during the acceleration mode to make better use of a limited supply of that fuel.

In some examples, the fuel characteristic by which fuel from the first fuel source 302 differs from fuel from the second fuel source 304 may be the percentage of sustainable aviation fuel (SAF) present in the respective fuel as discussed above. The fuel delivered to the fuel injectors during the acceleration mode of operation would similarly have a different percentage of SAF compared to the fuel delivered to one or both of the pilot fuel injectors 313 and main 314 fuel injectors during at least part of the steady state mode of operation. As discussed above, compared to fossil kerosene, SAF offers substantially lower nvPM, and can therefore be used to mitigate the increase in nvPM that would otherwise result from over-fueling the combustor during the acceleration mode. For example, the fuel provided to the fuel injectors 313, 314 during the acceleration mode may have a greater proportion of SAF compared to that provided to the fuel injectors during the steady state mode. This allows a limited available amount of SAF (or other low nvPM fuel) to be used selectively to reduce overall nvPM, CO and HC emission.

As discussed above in connection with other examples, this may however not always be the case. In some examples, fossil kerosene may be treated to remove aromatic components, particularly naphthalenes, in order to produce a largely paraffinic fuel of fossil origin which would be a low nvPM producing fuel. Other fuel characteristics may therefore be associated with low nvPM, such as the percentage of aromatic content or naphthalene content. The first and second fuels may therefore differ by characteristics other than the SAF content while still achieving the desired effect on nvPM emissions.

In some examples, the fuel delivery regulator 306 is arranged to deliver fuel having a different fuel characteristic during an acceleration mode of operation which follows a steady state mode of operation in which the combustor system 64 is operating in pilot-only mode. In some examples therefore, fuel characteristics are only changed for engine accelerations that start from an engine power setting which is below the steady-state staging point. As the power setting is below the steady-state staging point the combustor will be operating in pilot-only mode, and acceleration may lead to nvPM emissions increase without the change of fuel characteristic provided by the methods of the present application. In other examples however, the acceleration may be from any steady state operation mode, whether operation in pilot-only or pilot-and-main ranges of operation.

The staged combustion system 64 may be arranged to switch between the pilot-only range of operation and the pilot-and-main ranges of operation at the same or higher engine power in the acceleration mode compared to the steady state mode. In other words, the staged combustion system 64 is controlled (e.g. by the EEC) using a staging point that is at the same or higher engine power setting in the acceleration mode compared to the steady state mode. This means that the staging point is not reduced to a lower engine power setting during the acceleration mode, thus avoiding or reducing any increase in HC or CO emissions, or needing to richen all of the main fuel injectors for all engine powers. More specifically, in some examples, the staging point may be the same in both acceleration and steady state operation modes. The staging point used in the acceleration mode may be referred to as an "acceleration staging point", whereas the staging point used during steady state operation may be referred to as a "cruise staging point". In this example therefore, the acceleration staging point is at a power setting greater than or equal to the cruise staging point.

In other examples, the staged combustion system may be arranged to switch between the pilot-only range of operation and the pilot-and-main range of operation at a lower engine power in the acceleration mode compared to the steady state mode. The staged combustion system 64 is controlled (e.g. by the EEC) in this example using a staging point that is at a lower engine power setting in the acceleration mode compared to the steady state mode. In this example, the acceleration staging point is greater than a default acceleration staging point according to which the combustion system would be controlled if fuel of a different characteristic is not able to be provided to the combustor. The acceleration staging point is therefore reduced (relative to the cruise staging point) by an amount less than the reduction to the default acceleration staging point that would be found in known systems.

The fuel delivery regulator 306 may in some examples be arranged to deliver fuel to the pilot fuel injectors 313 during pilot-only operation in the acceleration mode that has a different fuel characteristic from fuel delivered to the main fuel injectors 314 during pilot-and-main operation in the steady state mode of operation of the engine. In this example, fuel of a different characteristic (e.g. SAF rich fuel) is delivered to the pilot fuel injectors 313 when they are operating in pilot-only mode during acceleration of the engine. Fuel that is associated with a high nvPM (e.g. SAF poor fuel) is then provided to the main fuel injectors 314 during pilot-and-main steady state operation where nvPM emission is inherently lower. This allows a limited amount of fuel within the first fuel source (e.g. SAF rich fuel) to be used more effectively by selectively using it during pilot-only engine acceleration. In this example therefore, the fuel of a different fuel characteristic is delivered to the pilot fuel injectors 313 in only part of the acceleration operation mode. Once the staging point is reached within the acceleration mode, fuel delivery may return to the same as that used during steady state operation (e.g. may return to using a SAF poor fuel). In other examples, the SAF rich fuel (or fuel of another different characteristic) may be used at all engine powers within the acceleration mode (e.g. in pilot-only and pilot-and-main operation).

In one example, the fuel delivery regulator 306 is arranged to deliver fuel during the pilot-only range of operation in the acceleration mode having a fuel characteristic determined based on a fuel-to-air ratio in the combustor 16. In this example, as the fuel-to-air ratio decreases, the proportion of fuel associated with low nvPM production delivered to the pilot fuel injectors may also be decreased. As the fuel-to-air ratio reduces (e.g. because as the engine spool speed increases so the air mass flow within the combustor also increases) the amount of a low nvPM producing fuel (e.g. a SAF rich fuel) may also be reduced. This allows the low nvPM producing fuel to be used during a part of the acceleration mode of operation in which its benefits are greater, thus making better use of a limited availability of that fuel. In other examples, the fuel characteristics may be determined based on another suitable control parameter that is linked to combustor nvPM formation other than the fuel-to-air ratio.

In other examples, the fuel delivery regulator 306 is arranged to switch delivery of fuel to the fuel injectors (one or both of the main and pilot fuel injectors 313, 314) to that having a different fuel characteristic at a start point of a period of operation in the acceleration mode. In this example therefore, the fuel composition may be switched to an alternative composition (e.g. switched to a SAF rich fuel) at the start of a period of acceleration. In some examples, the fuel regulator 306 may continue to deliver the same fuel throughout the acceleration mode of operation. In other examples, the fuel delivery regulator 306 is arranged to return to delivery of fuel having the same fuel characteristic as that delivered in the steady state mode following a transition to pilot-and-main operation. The fuel composition is therefore switched back to the default steady state fuel characteristics once the staging point has been passed. This may also help to restrict the use of fuel associated with low nvPM emissions to only part of the acceleration mode, thus making more effective use of a limited supply of that fuel.

In order to supply fuel to the pilot and/or main fuel injectors 313, 314 during the acceleration mode of the combustion system that is different from that supplied to the combustor during the steady state mode of operation the fuel delivery regulator 306 is arranged to supply fuel selectively from the first and second fuel sources 302, 304 as described above. In one example, the fuel delivery regulator 306 may comprise a fuel blender 318 as shown in FIG. 17. Similarly to as described above, the fuel blender is arranged to receive a supply of fuel from both the first and second fuel sources 302, 304 and output fuel from the first fuel source 302, fuel from the second fuel source 304, or a blend thereof. This blended fuel is supplied to the pilot fuel injectors 313, with fuel from a single fuel source (the second fuel source 304 in the example above) being supplied to the main fuel injectors 314. In other examples, the blender may be arranged to supply both the main and pilot fuel injectors 313, 314 with an appropriate blend of fuel. In yet other examples, the fuel delivery regulator 306 of any of the examples described herein may be used to supply fuel during at least part of the acceleration mode (to either or both of the pilot and main fuel injectors) that is different from that delivered during at least part of the steady state mode of operation (for example, those using separate regulators for the first and second fuel sources or a pilot regulator arranged to switch between fuel sources).

As discussed above in connection with the example shown in FIG. 17, the dependence of the proportion of fuel from the first fuel source 302 compared to that from the second fuel source 304 on fuel flow rate may be determined according to a desired resultant level of nvPM at a particular fuel flow rate. For example, the proportion of fuel delivered from the first fuel source 302 compared to that from the second fuel source 304 may be determined according to a desired resultant level of nvPM at a particular fuel flow rate during the acceleration mode. The amount of fuel supplied from each source may be determined such that the nvPM does not exceed a predetermined threshold or such that the nvPM production is minimised over a period of operation of the gas turbine engine as described above. In any of the examples described herein this may be achieved by suitable control of the blender 318, or any of the other fuel delivery regulators 306 described herein.

In some examples, the proportion of fuel delivered from the first fuel source 302 compared to that delivered from the second fuel source 304 during the acceleration mode of the combustion system may be determined at least partly according to any one or more of:

a) the amount of fuel having the first fuel characteristic and the amount of fuel having the second fuel characteristic available for a proposed flight. This may for example, be provided by an estimate or measurement of the amount of fuel in the fuel tanks 53, 55 making up the first and second fuel sources 302, 304;

b) the amount of total fuel requirement for the pilot fuel injectors 313 during pilot-only operation for the entire flight in a range of operation in which fuel is provided from the first fuel source 302; and/or c) a fuel composition limit parameter (e.g. a certification limit, fuel composition available for fueling, or aircraft/engine limits).

Figure 30:
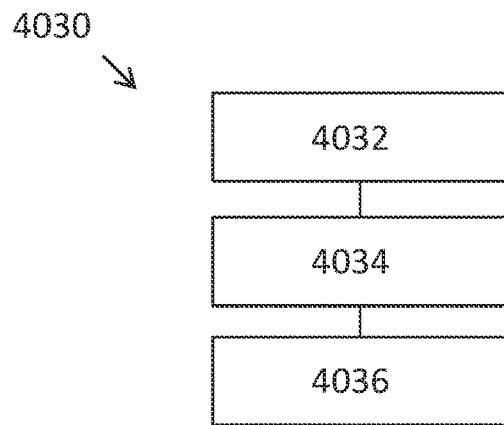
FIG. 30 illustrates another method of operating a gas turbine engine.

FIG. 30 illustrates a method 4030 of operating a gas turbine engine according to the example above in which fuel of a different characteristic is delivered to the fuel injectors (e.g. one or both of the pilot and main fuel injectors 313, 314) during at least part of the acceleration mode compared to during at least part of the steady state mode. The method 4030 comprises regulating 4032 fuel delivery to the pilot and/or main fuel injectors 313, 314 from the first fuel source 302 containing a first fuel having a first fuel characteristic and from the second fuel source 304 containing a second fuel having a second fuel characteristic, as described above using the fuel delivery regulator 306 of any example herein. The second fuel characteristic is different from the first as described above.

The method further comprises operating 4034 the staged combustion system 64 in an acceleration mode in which acceleration of the engine from a steady state mode of operation is caused. The method 4030 further comprises delivering 4036 fuel to the fuel injectors (e.g. one or both of the pilot and main fuel injectors 313, 314), during at least part of operation in the acceleration mode, having a different fuel characteristic from fuel delivered to the fuel injectors (e.g. one or both of the pilot and main fuel injectors 313, 314) during at least a part of the steady state mode of operation of the engine.

Any of the features described above in connection with the examples in which different fuel is supplied in the acceleration mode compared to during steady state cruise mode of operation may be incorporated into the method 4030 of FIG. 30, even if they are not repeated here.

Staging Point Determination Based on Fuel Characteristics

In other examples of the present application, the staging point according to which the staged combustion system 64 is operated may be determined based on a determination of the characteristics of the fuel with which it is provided. The inventors have determined that the staging point can be based on the characteristics of the fuel to make advantageous use of the particular fuel being provided to the engine 10.

In some examples, the aircraft illustrated in FIG. 4 may be arranged to have only a single fuel source. In such an example, the fuel tanks 53, 55 may be fluidly coupled to form a single fuel source on board the aircraft. The aircraft may therefore carry fuel having the same fuel characteristics, rather than fuels having different characteristics.

Figure 31:
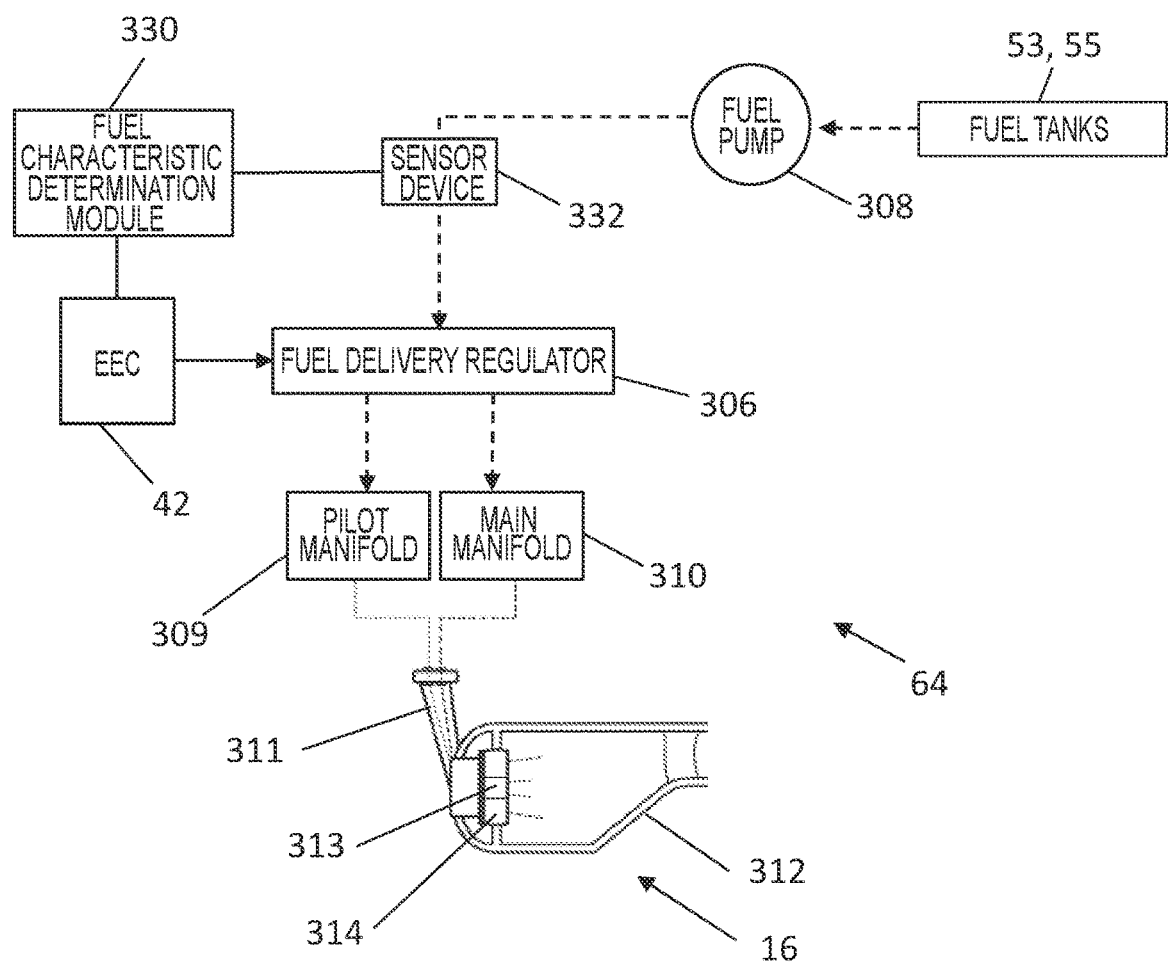
FIG. 31 shows a schematic view of another combustion system.

FIG. 31 illustrates an example of a staged combustion system 64 having features corresponding to that of FIG. 5, but which is provided with fuel from a single source aboard the aircraft 1. In this example, fuel is received by the fuel delivery regulator 306 via a fuel pump 308, from a single fuel source, e.g. fuel tanks 53, 55 shown in FIG. 4. Features common with the example of FIG. 5 are labelled accordingly, and so will not be described again.

In the example illustrated in FIG. 31, the gas turbine engine 10 further comprises a fuel characteristic determination module 330. The fuel characteristic determination module 330 is configured to determine one or more characteristics of the fuel being supplied to the fuel delivery regulator 306. In the described example, the fuel characteristic determination module 330 is in communication with a sensor device 332, which is configured to perform a measurement on fuel flowing to the fuel delivery regulator 306 in order to determine fuel characteristics. The sensor device 332 may take a number of different forms, and may operate according to any of the examples of the determination of fuel characteristics disclosed herein. In other examples, the fuel characteristic determination module 330 may receive signals from a sensor device located elsewhere on board the aircraft which is configured to perform a measurement of fuel characteristics. In yet other examples, the fuel characteristic determination module 330 may obtain fuel characteristics from sources other than a sensor device as described elsewhere herein, for example the fuel characteristics may be received via a data communication channel, or from a user input.

The EEC 42 (which may be referred to more generally as "a controller") is in communication with the fuel characteristic determination module 330 such that it may receive the fuel characteristics of the fuel being supplied to the fuel delivery regulator 306. In the present example, the fuel characteristic determination module 330 is shown separately from the EEC, but in other examples they may be combined. The controller 42 is configured to determine the staging point at which the staged combustion system is switched between its pilot-only operation and pilot-and-main operation. The staging point is determined based on the one or more fuel characteristics. Once the staging point is determined in this way it is used by the controller 42 to control operation of the staged combustion system 64, e.g. it is used to control operation of the fuel delivery regulator so that appropriate flow of fuel is provided to the pilot manifold 309, or the pilot 309 and the main manifold 310 for operation in the pilot-only and pilot-and-main modes respectively.

The inventors have determined that the staged combustion system 64 can be advantageously controlled based on the characteristics of the fuel which it is being supplied. In particular, the staging point can be chosen to make advantageous use of the characteristics of the fuel being supplied to the engine.

In one example, the staging point is determined based on the one or more fuel characteristics indicating that the fuel is associated with a low nvPM production level (e.g. low compared to fossil kerosene, at corresponding combustion conditions). This may allow the staging point to be adjusted so that it corresponds to an engine operating condition that would otherwise lead to high levels of nvPM production. For example, as illustrated in FIGS. 23 and 25, if a low nvPM producing fuel is determined to be being supplied to the combustor the staging point may be adjusted to reduce CO and HC production, without causing a disadvantageous increase in nvPM production which would otherwise occur if a relatively high nvPM producing fuel was being used.

In some examples, the fuel characteristic on which the staging point determination is based may be the percentage of sustainable aviation fuel (SAF) present in the respective fuel. As discussed above, compared to fossil kerosene, SAF offers substantially lower nvPM, and can therefore be used to mitigate changes in the staging point that would otherwise increase nvPM production.

In some examples, fossil kerosene may be treated to remove aromatic components, particularly naphthalenes, in order to produce a largely paraffinic fuel of fossil origin which would be a low nvPM producing fuel. Other fuel characteristics may therefore be associated with low nvPM, such as the percentage of aromatic content or naphthalene content. In other examples, the one or more fuel characteristics on which the staging point is determined may include an aromatic hydrocarbon content of the fuel, and/or a naphthalene content of the fuel. These characteristics may also indicate the level of nvPM that will be produced by the fuel, and allow the staging point to be determined accordingly.

The controller 42 may be configured to determine the staging point such that the staging point associated with fuel that is a low nvPM producing fuel corresponds to a higher engine power setting compared to the staging point associated with one or more fuel characteristics that indicate that the fuel is associated with a relatively higher nvPM production. In other words, the staging point may be increased to a higher engine power for a fuel which is associated with lower nvPM production compared to a fuel associated with a higher nvPM production. The engine power at which the staging point occurs may therefore be increased with decreasing nvPM production of the fuel. As discussed above in connection with FIGS. 23 and 25 this increase in the staging point may help to reduce CO and HC production, without a significant increase in nvPM. The low nvPM producing fuel may be one that produces a lower nvPM emission compared to fossil kerosene at corresponding combustion conditions. The low nvPM fuel may be a SAF rich fuel, which has at least some SAF content, and preferably a SAF content of greater than 10%, or more preferably equal to or greater than 50%.

In some examples, the staging point determined based on the fuel characteristics may be a cruise staging point with which the combustion system 64 is controlled during steady state cruise operation of the engine. The controller 42 may be configured to determine the staging point so that it corresponds to an engine power setting that results in a switch between pilot-only and pilot-and-main operation during steady state cruise. The staging point determined by the controller 42 based on the fuel characteristics may therefore create a boundary between a first engine cruise operation range and a second engine cruise operation range. The staging point may be selected to define these two cruise operation points if it is determined that a relatively low nvPM fuel is being used (e.g. a high SAF, and/or low aromatic and/or low naphthalene fuel). This may allow pilot-only operation during cruise to make advantageous use of its low HO and CO production, while avoiding the increase in nvPM that would otherwise occur if a high nvPM fuel were being supplied by the engine (see FIGS. 27 and 28, and associated description above).

The first cruise operation range may correspond to operation of the aircraft in a later part of a cruise segment of a flight, and the second operation range may correspond to operation of the aircraft in a relatively earlier part of the cruise segment. As discussed above, this may allow the staged combustion system 64 to switch to pilot-only operation during a later part of a cruise segment (e.g. a segment of cruise at a constant altitude). In another example, the first cruise operation range may correspond to steady state subsonic cruise operation of the engine and the second cruise operation range may correspond to steady state supersonic cruise operation of the engine. In both of these examples, the staging point is selected so that pilot-only operation occurs at low engine power cruise operation, for example either in a later part of a cruise segment or during subsonic cruise. The steady state supersonic cruise operation may occur before the steady state subsonic cruise operation, or vice versa. In some examples, the steady state subsonic cruise operation may be subsonic cruise operation over land, while the steady state supersonic cruise operation may be supersonic cruise operation over water.

In another example, the staging point determined according to the fuel characteristics may be an engine acceleration staging point according to which the staged combustion system is controlled during an acceleration condition of the engine. In such an example, the controller may be configured to select the engine acceleration staging point so that it is the same as that used during cruise. Specifically, this may be done if it is determined that a low nvPM fuel is being used (e.g. a high SAF, and/or low aromatic and/or low naphthalene fuel). As discussed above, this may allow acceleration to occur (at least partly) while remaining in pilot-only mode despite the increase in fuel flow rate to provide acceleration. This may help to avoid increase in HC and CO production that would otherwise occur by increasing the staging point during engine acceleration.

In some examples, the controller 42 may be arranged to determine one or both of the cruise and acceleration staging point, and may be arranged to determine staging points for both supersonic/subsonic operation and for earlier/later parts of a cruise segment.

Figure 32:
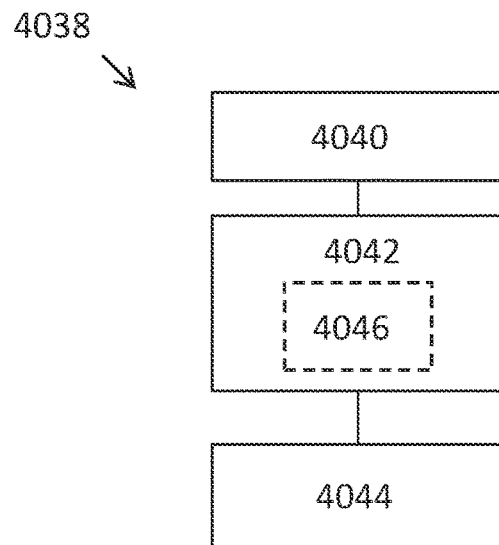
FIG. 32 illustrates another method of operating a gas turbine engine.

FIG. 32 illustrates a method 4038 of operating a gas turbine engine for an aircraft. The method may be performed by the apparatus of FIG. 31. The method 4038 comprises determining 4040 one or more fuel characteristics of a fuel being supplied to the combustion system; determining 4042 a staging point defining the point at which the combustion system is switched between pilot-only operation and pilot-and-main operation based on the determined one or more fuel characteristics; and controlling 4044 the staged combustion system according to the determined staging point.

The one or more fuel characteristics may indicate that the fuel is associated with low nvPM production level compared to fossil kerosene as discussed above. The one or more fuel characteristics include any one or more of: (i) a percentage of sustainable aviation fuel in the fuel; (ii) an aromatic hydrocarbon content of the fuel; and/or (iii) a naphthalene content of the fuel. Other fuel characteristics may be used.

Determining 4042 the staging point may comprise determining 4046 the staging point such that the staging point associated with one or more fuel characteristics that indicate that the fuel is associated with a low nvPM production corresponds to a higher engine power setting compared to the staging point associated with one or more fuel characteristics that indicate that the fuel is associated with a relatively higher nvPM production.

The staging point determined 4042 by the method of FIG. 32 may be a cruise staging point, and may be used during a later part of a cruise segment of a light, or during subsonic cruise operation of a supersonic capable aircraft as discussed in the various examples above.

Any of the features described above in connection with the examples in which the staging point is determined according to one or more fuel characteristics may be incorporated into the method 4038 of FIG. 32.

In the examples above, the staging point is determined according to the nvPM production characteristics of the fuel. This is however only one example, and other fuel characteristics may be taken into account in order to determine a suitable staging point in order to take advantage of the characteristics of the fuel being supplied to the combustor.

Staging Ratio Determination Based on Fuel Characteristics

In other examples, the controller 42 illustrated in FIG. 31 is additionally, or alternatively, arranged to determine a staging ratio according to the one or more fuel characteristics. As discussed elsewhere herein, the controller 42 is configured to control the fuel delivery regulator 306 (and hence the staged combustion system 64) according to a staging ratio. The staging ratio defines the ratio of pilot fuel injector 313 fuel flow to the main fuel injector 314 fuel flow. The inventors have determined that the staging ratio can be chosen to make advantageous use of certain fuel characteristics of fuel that is being provided to the fuel delivery regulator by intelligently choosing the ratio based on the fuel characteristics.

For example, the staging ratio may be determined based on the one or more fuel characteristics indicating that the fuel is associated with a low nvPM production level (e.g. low compared to fossil kerosene, at corresponding combustion conditions). This may allow the staging ratio to be adjusted to reduce CO and HC production in a way that would otherwise lead to high levels of nvPM production as discussed in various examples above.

In some examples, the fuel characteristic(s) on which the staging ratio determination is based may be the percentage of sustainable aviation fuel (SAF) present in the respective fuel. As discussed above, compared to fossil kerosene. SAF offers substantially lower nvPM, and can therefore be used to mitigate changes in the staging ratio that would otherwise increase nvPM production.

In some examples, fossil kerosene may be treated to remove aromatic components, particularly naphthalenes, in order to produce a largely paraffinic fuel of fossil origin which would be a low nvPM producing fuel. Other fuel characteristics may therefore be associated with low nvPM, such as the percentage of aromatic content or naphthalene content. In other examples, the one or more fuel characteristics on which the staging ratio is determined may include an aromatic hydrocarbon content of the fuel, and/or a naphthalene content of the fuel. These characteristics may also indicate the level of nvPM that will be produced by the fuel, and allow the staging ratio to be determined accordingly.

The controller 42 may be configured to determine a transition staging ratio which allows the staged combustion system 64 to be operated in a transition range of operation between the pilot-only range of operation and pilot-and-main range of operation as discussed above in connection with FIGS. 27 and 28. The transition staging ratio may be determined according to the one or more fuel characteristics indicating that the fuel being supplied to the fuel delivery regulator 306 is associated with a low nvPM production level (e.g. according to the SAF content, aromatic content or naphthalene content; low nvPM production being relatively less than for fossil kerosene fuel). The transition staging ratio may be different to a pilot-and-main staging ratio according to which the controller 42 controls the staged combustion system during pilot-and-main operation. The pilot-and-main staging ratio may be a default ratio, and may be determined according to known techniques.

As discussed above in connection with FIGS. 27 and 28, by configuring the staged combustion system 64 to operate in the transition range between the pilot-only and pilot-and-main operation the amount of CO and HC emission operating within that range of engine power settings can be reduced. By detecting that the combustor is being provided with a fuel associated with low nvPM production, the controller may determine that the transition staging ratio can be used to reduce CO and HC emissions, without causing an excessive increase in nvPM production.

Any of the features of the transition staging ratio discussed above may be incorporated into the presently described examples in which the transition staging ratio is selected according to the one or more fuel characteristics. For example, during the transition phase the transition staging ratio may vary with changing engine power setting. In one example, the transition staging ratio has a continuous variation with changing engine power within the transition range of operation. This may provide a smooth transition between the staging ratio in the pilot-only and pilot-and-main range of operation. The continuous variation may be such that the proportion of the total fuel flow to the fuel injectors (i.e. total being delivered to the pilot and main fuel injectors) that is attributable to fuel flow to the pilot fuel injectors 313 decreases with increasing engine power during the transition range of operation. The proportion of the total fuel flow to the fuel injectors that is attributable to fuel flow to the main fuel injectors 314 on the contrary increases with increasing engine power within the transition range of operation.

In other examples, the transition staging ratio has a constant intermediate value that is different from the pilot-and-main staging ratio. The transition staging ratio may lie between the pilot-only ratio and the pilot-and-main ratio. This therefore provides a more gradual transition from the pilot-only to pilot-and-main staging ratios. For example, the transition staging ratio may be 70:30, which is between 100:0 in the pilot-only range, and a pilot-and-main staging ratio which may be 20:80 or 30:70.

In yet other examples, the transition staging ratio varies between a series of constant intermediate values, each being different from the pilot-and-main staging ratio. Moreover, each of the intermediate ratios may lie between that of the pilot-only range and that of the pilot-and-main range. For example, the transition staging ratio may vary between a series of values of 80:20, 60:40 and 40:60. The pilot-and-main ratio may be 20:80 in this example. The intermediate staging ratios may thus decrease towards the pilot-and-main ratio (i.e. a progressively smaller proportion of the total fuel is provided to the pilot fuel injectors 313, and a progressively greater proportion of the total fuel is provided to the main fuel injectors 314). This is however only one example, and any other number and values of intermediate transition staging ratios may be used.

In some examples, the transition staging ratio may have a continuous variation with engine power in part of the transition range of operation and may have one or more constant values in another part of the transition range of operation. The examples above may therefore be combined. In other examples, the staging ratio may have a continuous variation with engine power over all of the transition range of operation, or may have one or more constant values with engine power across all of the transition range of operation.

Figure 33:
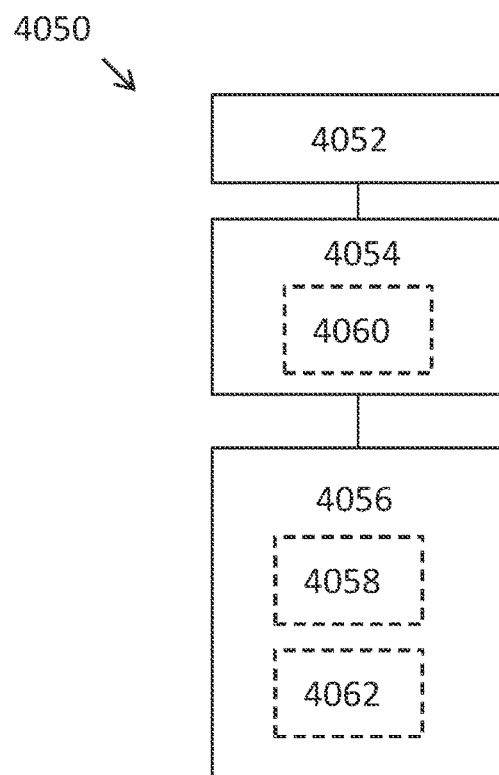
FIG. 33 illustrates another method of operating a gas turbine engine.

FIG. 33 illustrates an example of a method 4050 of operating a gas turbine engine. The method 4050 comprises: determining 4052 one or more fuel characteristics of a fuel being supplied to the staged combustion system 64; determining 4054 a staging ratio defining the ratio of pilot fuel injector fuel flow to main fuel injector fuel flow; and controlling 4056 the staged combustion system 64 according to the determined staging ratio. The method 4050 may be carried out by the apparatus shown in FIG. 31 (additionally or alternatively to the method 4038 in which a staging point is determined).

The one or more fuel characteristics may indicate that the fuel is associated with low nvPM production level compared to fossil kerosene as discussed above. The one or more fuel characteristics include any one or more of: (i) a percentage of sustainable aviation fuel in the fuel; (ii) an aromatic hydrocarbon content of the fuel; and/or (iii) a naphthalene content of the fuel. Other fuel characteristics may be used.

The controlling 4056 of the staged combustion system 64 may comprise controlling 4058 the staged combustion system 64 during the pilot-and-main range of operation according to a pilot-and-main staging ratio as discussed above. The determining 4054 of the staging ratio may comprise determining 4060 a transition staging ratio. Controlling 4058 the staged combustion system 64 may then comprise controlling 4062 it so that it is operated in a transition range of operation between the pilot-only range of operation and the pilot-and-main range of operation as discussed above. The transition staging ratio may be determined according to any of the examples given above.

Any of the features described above in connection with the examples in which the staging ratio is determined according to one or more fuel characteristics may be incorporated into the method 4050 of FIG. 33.

In the examples above, the staging ratio is determined according to the nvPM production characteristics of the fuel. This is however only one example, and other fuel characteristics may be taken into account in order to determine a suitable staging point in order to take advantage of the characteristics of the fuel being supplied to the combustor.

Abnormal Operating Conditions

The regulation of the fuel delivery according to any of the examples described herein is understood to be suitable for operating under normal running conditions of the gas turbine engine 10 or the aircraft 1. During abnormal operation conditions the delivery of fuel to the combustor 16 as described herein (e.g. to control nvPM) may be overridden. The fuel delivery regulation described herein is therefore applicable during at least part of the operation of the associated gas turbine engine, e.g. where fuel availability, either due to tank capacity limits or unexpected abnormal running conditions, does not prevent it.

For example, in abnormal operation, such as following failure of an engine, a requirement to transfer fuel from one wing tank to another wing tank (in order to maintain an acceptable aircraft centre of mass lateral position) may override fuel delivery regulation according to the present application, particularly in cases requiring fuel transfer from the first fuel source 302 to the second fuel source 304 or vice versa. However, if the two wing fuel tanks both form part of the same fuel source (i.e. both are part of the first fuel source 302 or both are part of the second fuel source 304) and are fluidly interconnected either directly or via one or more further fuel tanks that are also part of the same fuel source (the first or second fuel source respectively) then the fuel regulation described herein may continue to operate despite such abnormal conditions.

Where the fuel delivery regulator 306 is arranged to switch between sources or blend fuel from the first and second fuel sources 302, 304 the switching or blending may be overridden if one of the fuel sources is depleted because of a leak or other fuel unexpected reasons (e.g. incorrect fuel loading). In some or all examples, in particular that shown in FIG. 9, a fuel bypass may be provided in which fuel can be distributed between the first and second fuel sources in the event of an abnormal operating condition. For example, in the example of FIG. 9 a fuel bypass may be provided upstream of the fuel delivery regulator 306, or between fuel tanks of the first and second fuel sources 302, 304, which provides an emergency interconnection between the first and second fuel sources. The pilot regulator 306a and main regulator 306b are therefore capable of being suppled with fuel from either of the first and second fuel sources 302, 304 should one of the fuel sources fail during operation.

The fuel delivery regulation may further be overridden during part of a mission of the aircraft if insufficient amounts of the first and second fuel can be contained within the aircraft fuel tanks. For some missions, the total fuel loading requirement for a proposed flight may dictate the minimum extent to which each fuel tank must be filled, and this may over-ride certain other means of fuel delivery control in the various examples described herein.

Calculating Fuel Allocation

The present application further provides a method of determining a fuel allocation for an aircraft. The method allows the determination of a fuel allocation according to which fuel is loaded onto the aircraft 1 to carry out a proposed flight or mission. The aircraft for which the method is used may be that illustrated in FIG. 4, which comprises a first fuel source 302 adapted to contain a first fuel having a first fuel characteristic and a second fuel source 304 adapted to contain a second fuel having a second fuel characteristic, the second fuel characteristic being different from the first. As discussed above, the aircraft 1 comprises one or more gas turbine engines 10 powered by fuel from the first and second fuel sources 302, 304. The gas turbine engines 10 each comprise a fuel delivery regulator 306 arranged to supply fuel from each fuel source, or a blend thereof, and a staged combustion system 64, as illustrated in FIG. 5, or as described anywhere herein.

Figure 34:
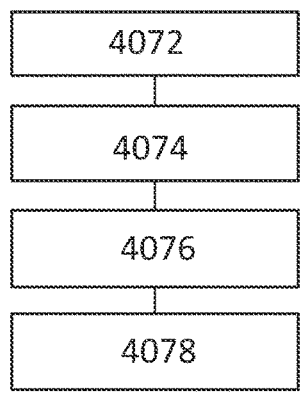
FIG. 34 illustrates a method of determining one or more fuel loading parameters.

A method 4070 of determining a fuel allocation is illustrated in FIG. 34. The method 4070 comprises obtaining 4072 a proposed mission description comprising a list of operating points for the gas turbine engine(s) 10 of the aircraft 1 during an operating mission. The list of operating points includes information on the operation of the gas turbine engines 10 of the aircraft 1 that are expected for a particular planned period of operation for which fuel is to be loaded onto the aircraft. The list of operating points may include a variety of information from which the expected nvPM impact of the gas turbine engine during each part of the operating mission can be determined for fuels of different characteristics being used. The operating points of the mission description may include any one or more of one or more conditions in which the gas turbine engines 10 are to operate (e.g. location and/or ambient conditions expected for the specific mission), one or more fuel flow rate values corresponding to an operating point, and a time duration of operation at a corresponding operating point. The operating points may therefore indicate that the mission, for example, comprises a period of operating the engines at a cruise operating condition, in certain ambient conditions, and in which a specified fuel flow rate is required. Any other suitable information can be provided in the list of operating points so that the nvPM production for the various parts of the flight can be found for given fuel characteristics. The mission description may include details of the operation of the aircraft on the ground in order to complete the operating mission.

The method 4070 further comprises obtaining 4074 nvPM impact parameters for the gas turbine engines 10 based on the obtained mission description. The impact parameters are associated with each of the operating points of the proposed mission, and may define an amount of nvPM produced by the gas turbine engines 10 for different respective fuel compositions comprising the first fuel, the second fuel or a blend thereof at each operating condition of the mission description.

The amount of nvPM produced by the engine may be determining using a lookup table of nvPM number as a function of $W_F$ for all operating conditions (e.g. taking into account different positions of the staging point at different operating points of the mission), for different fuel characteristics. The variation with fuel characteristics may, in some examples, be parameterised by percentage SAF content. The lookup table used to determine the nvPM production may be chosen from a set of lookup tables corresponding to different types of SAF (HEFA, ATJ etc). Where nvPM production is similar for different fuels the same lookup table may be used for each.

The impact parameters may be the nvPM impact parameters described elsewhere herein and may relate to the cost or harm of nvPM (e.g. soot) emission of a particular type or in a certain situation (in addition or alternatively to simply indicating an amount of nvPM produced). The nvPM impact parameters may therefore include any one or more of:

i) height above ground level at which the nvPM production takes place;
ii) position (e.g. location e.g. longitude and latitude) of the nvPM production;
iii) weather/atmospheric conditions at a location of the nvPM production;
iv) climate impacts associated with location of the nvPM production;
v) mass/size of the individual nvPM particles produced;
vi) potential contrail production and/or contrail characteristics;
vii) local air quality (LAO) impact of nvPM production; and/or
viii) amount of nvPM produced (e.g. mass/number)

The method 4070 further comprises calculating 4076 an optimised set of one or more fuel characteristics for each operating point of the proposed mission defined in the mission description based on the nvPM impact parameters. In this step, the method calculates the fuel characteristics for each part of the proposed mission which give an optimal set of nvPM impact parameters. Calculating the optimised set of one or more fuel characteristics comprises minimising a cost function dependent on the one or more nvPM impact parameters. In some examples, the cost function may take into account only the amount of nvPM produced during each part of the mission such that it can be minimised. In other examples, more complex cost functions can be defined as described elsewhere herein to take into account other factors that relate to the impact of the nvPM production (e.g. using the other impact parameters defined above).

Once the optimised set of fuel characteristics has been calculated, the method 4070 comprises determining 4078 a fuel allocation based on the optimised set of one or more fuel characteristics. The fuel allocation defines how fuel is allocated to the mission and therefore how fuel is to be loaded onto the aircraft to meet the needs of the optimised fuel characteristics over the duration of the mission. The fuel allocation may include any one or more of:

i) an amount of fuel (e.g. volume or mass) allocated to each of the first and second fuel sources. This may allow the required amount of fuel to be loaded during a refueling process in which the aircraft is connected to a fuel source such as a fuel tanker or fuel supply line;
ii) the first fuel characteristic and/or the second fuel characteristics; and/or
iii) a fuel blending ratio (e.g. a ratio of a default or non-default fuel).

By specifying amount and the characteristics of the fuel, the required fuel can be loaded from the different types of fuel that might be available. In some examples, fuel may be blended from different fuels available before being loaded e.g. blended from a default and non-default fuel as described later.

The method 4070 may further comprise determining one or more fuel usage parameters corresponding to the fuel allocation, the fuel usage parameters defining how the fuel is to be used during the mission defined by the mission description. The fuel usage parameters may define how the optimised fuel characteristics required for each part of the mission are to be provided to the combustor 16 of the respective engine. The fuel usage parameters may be combined to form a "mission fuel usage" which defines how the fuel is used over the duration of the mission. The fuel usage parameters may be provided to the aircraft 1 so that the gas turbine engine 10 (e.g. the fuel delivery regulator 306) can be controlled accordingly, or the fuel tanks 53, 55 configured as required.

The one or more fuel usage parameters may include any one or more of:

i) a blending schedule according to which fuel from the first fuel source 302 and the second fuel source 304 is blended by the fuel delivery regulator 306 (e.g. using the fuel blender 318 described above);

ii) a switching schedule according to which the fuel delivery regulator 306 is configured to switch between delivery of fuel from the first fuel source 302 and the second fuel source 304;

iii) an onboard fuel blending ratio according to which the fuel delivery regulator 306 is configured to blend fuel from the sources on board the aircraft;

iv) an allocation of fuel tanks 53, 55 provided in the aircraft to form the first fuel source 302 and the second fuel source 304. This may allow the allocation of fuel tanks to be configured so that the amount of fuel of each type required for the flight can be stored on board the aircraft; and/or ii) an isolation valve setting for fuel tanks 53, 55 forming the first fuel source 302 and the second fuel source 304. This may allow the configuration of the fuel tanks to be configured by determining which tanks on board the aircraft are isolated or in fluidic communication with each other.

The inventors have determined that by calculating the fuel allocation in this way, fuel can be loaded onto the aircraft such that there is the required amount of fuel, having the required characteristics, on board the aircraft for it to carry out the proposed mission while reducing the nvPM impact. This may allow better use of the characteristics of the fuel available in reducing nvPM compared to loading a set amount of the types of fuel available. It may also ensure that adequate fuel is available in order to carry out the methods of combustor control described herein in which fuel of different characteristics is intelligently provided to the staged combustion system 64 during different operating conditions.

The first fuel characteristic may be associated with a level of nvPM production which is less than that of the second fuel characteristic (under corresponding combustion conditions). More specifically, the first fuel characteristic and the second fuel characteristic may be a percentage of SAF present in the respective fuel. As discussed elsewhere herein, the percentage of SAF may affect the level of nvPM production. The first and second fuels may differ by other characteristics, including any of those defined herein. For example, they may differ by aromatic content (or naphthalene content).

In some examples, the aircraft may be loaded using a choice of different fuels which are available at the location at which it is being fueled. The type and quantity of fuel available may be different between different locations. The present method may therefore allow an optimised amount of fuel of the types available to be loaded onto the aircraft by taking into account the characteristics of the fuel available and the quantity available. In some examples, the fuel available may be a "default fuel" and a "non-default fuel". The default fuel may be widely available fuel which is primarily fossil kerosene (e.g. it may be Jet A or JetA-1). The default fuel may include a low percentage of SAF. The default fuel therefore corresponds to fuel having the second fuel characteristics discussed elsewhere herein. It may be considered to be available in volumes that are not subject to an upper limit. The non-default fuel may be a less widely available fuel, and includes a relatively higher SAF content compared to the default fuel. The non-default fuel may comprise 50% or more SAF. It may comprise other percentages of SAF which are significantly greater than the default fuel (the remainder being fossil kerosene), and may be 100% SAF.

The optimised set of one or more fuel characteristics for each flight condition may be further determined based on any one or more of:

i) the achievable range of fuel compositions that can be provided by the fuel delivery regulator 306 of the engine 10 of the aircraft 1 for which the fuel is being loaded. For example, the fuel delivery regulator 306 may be arranged to deliver a blend of fuel from the first and second fuel sources 302, 304, switch between fuel from the first and second fuel sources, or deliver exclusively fuel from the first fuel source 302 or fuel from the second fuel source 304 to the main 314 or pilot 313 fuel injectors throughout the mission. The type of regulator may therefore restrict the characteristics of the fuel that can be supplied to the combustor, and so can advantageously be taken into account when calculating the fuel characteristics;

ii) a total quantity of non-default fuel allocated to the mission. The optimisation of the required fuel characteristics may take into account the amount of the non-default type of fuel available at the location at which refueling is taking place. As the supply of the non-default fuel may be limited it can be taken into account when optimising the fuel required of each type available;

iii) a total fuel requirement for the mission. For example, the total amount of fuel required to complete the mission (including any contingency amount) may also be taken into account;

iv) the capacities of the fuel tanks of the aircraft. This may allow the amount of each fuel that can be stored by the tanks of the aircraft to be taken into account. For example, some aircraft may have a fixed configuration of fuel tanks which can hold a predefined amount of each type of fuel available; and/or v) restrictions on how the aircraft fuel tanks can be allocated to the first or the second fuel source. As discussed above, some aircraft may have a configurable set of fuel tanks which can provide flexibility in the amount of fuel of each type that can be stored on board the aircraft.

Figure 35:
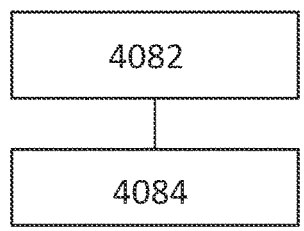
FIG. 35 illustrates a method of loading fuel onto an aircraft.

The method 4070 may be part of a method 4080 of loading fuel onto an aircraft 1. Such a method is illustrated in FIG. 35. The method 4080 may comprise determining 4082 a fuel allocation using the method 4070 described above. Once the fuel allocation is determined, the method 4080 comprises loading 4084 fuel onto the aircraft according to the fuel allocation. This may comprise loading fuel by connecting the aircraft 1 to a fuel supply using a known method (e.g. as illustrated in FIG. 4), and may further comprise configurating any fuel tanks as required, selecting between fuels of different characteristics, and loading the required mass or volume of each fuel. The step of loading 4084 the fuel may also comprise storing any required control parameters in a control system of the relevant engine (e.g. the EEC 42) or the aircraft. The control parameters may, for example, include the fuel usage parameters described above.

The method 4070 is a computer implemented method. In some examples, the method 4070 may be performed by a computing device located on board the aircraft 1, such as a control system of the aircraft (e.g. the EEC 42 or another control system provided on the engine or aircraft). The method 4070 may be implemented by any suitable computing device, either on board the aircraft 1, separate from the aircraft 1 as part of a fuel loading system, or as a dedicated system.

Figure 36:
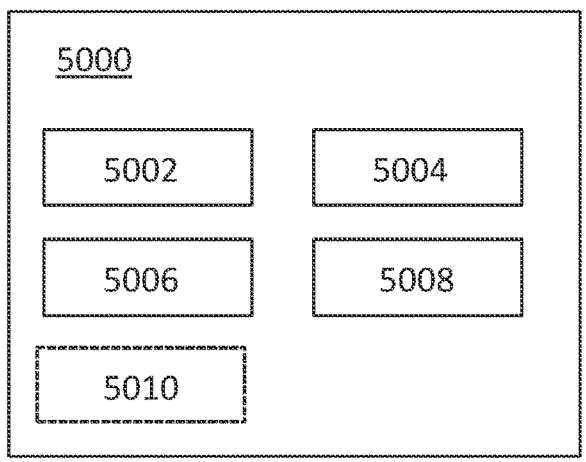
FIG. 36 shows a schematic view of a fuel loading parameter determination system.

FIG. 36 illustrates a fuel allocation determination system 5000 for determining a fuel allocation. The system 5000 may carry out the method 4070 described above. Any feature disclosed above in connection with the method 4070 may also apply to the system 5000. The system 5000 comprises a mission description obtaining module 5002 configured to obtain a proposed mission description comprising a list of operating points for the gas turbine engines 10 during the mission. The mission description may be obtained from any suitable source, including an external source with which the system 5000 is in communication, or a local memory configured to store a range of different flight definitions.

The system 5000 further comprises an impact parameter obtaining module 5004 configured to obtain nvPM impact parameters for the gas turbine engines. As discussed above, the impact parameters are associated with each operating point of the proposed mission using compositions of fuel which include fuel from the first fuel source 302, fuel from the second fuel source 304, or a blend thereof. The impact parameters may be determined as described above by accessing a lookup table. The lookup table may be obtained from an external source by the system 5000 (e.g. so that it is tailored to a certain fuel available to the aircraft) or accessed from a local memory.

The system 5000 further comprises a fuel characteristics calculating module 5006. The fuel characteristics calculating module is configured to calculate an optimised set of one or more fuel characteristics for each operating point of the proposed mission defined in the mission description based on the nvPM impact parameters. This may be done by optimising a cost function as described elsewhere herein.

The system 5000 further comprises a fuel allocation determining module 5008. This is configured to receive the calculated fuel characteristics for each part of the mission and is configured to determine a fuel allocation based on them.

As discussed above, the first fuel characteristic may be associated with a level of nvPM production which is less than that of the second fuel characteristic. For example, the first fuel characteristic and the second fuel characteristic may be a percentage of SAF present in the respective fuel. Other fuel characteristics can be used as discussed above in connection with the method of FIG. 34.

Each of the operating points of the mission description obtained by the mission description obtaining module 5002 may include any one or more of: one or more operating conditions in which the gas turbine engines are to operate, one or more fuel flow rate values corresponding to each operating point, and a time duration of operation at a corresponding operating point.

The nvPM impact parameters obtained by the impact parameter obtaining module 5004 may each define an amount of nvPM produced by the gas turbine engines for different respective fuel characteristics comprising the first fuel, the second fuel, or a blend thereof at each operating condition of the mission description. The impact parameter obtaining module may obtain the impact parameters as described above, either from an external source, or stored in a local memory.

The fuel allocation that is determined by the fuel allocation determining module 5008 may be as described above, and may be determined according to any of the factors discussed above in connection with the example shown in FIG. 34 and so will not be repeated here. The system 5000 may further comprise a fuel usage parameter determining module 5010 configured to determine one or more fuel usage parameters as described above.

The fuel characteristics calculating module 5006 may be configured to calculate the optimised set of one or more fuel characteristics by minimising a cost function dependent on the one or more nvPM impact parameters. The one or more nvPM impact parameters used by the fuel characteristics calculating module 5006 may be any of those described herein.

Fleetwide Allocation of Fuel

In the examples above, the amount of fuel to be allocated to a specific mission is calculated to take advantage of fuel of different characteristics. The inventors have further determined that available fuel can be intelligently shared between a number of missions to further make advantageous use of different types of fuel available.

The present examples relate to determining a fuel allocation for a plurality of missions (i.e. the amount of fuel allocated to each mission) carried out by a plurality of aircraft being supplied with fuel from a fuel source comprising an amount of a default fuel and an amount of a non-default fuel. The fuel source may comprise fuel storage vessels or tanks from which aircraft are refueled, the fuel storage vessels holding default and non-default fuel separately e.g. the refueling source 60 shown in FIG. 4 and described above. The amount of each of the fuels is stored at a refueling location at which aircraft used to perform the missions are refueled. A finite supply of fuel is therefore shared from that fuel source among the plurality of missions. This may, for example, be missions all leaving from the same airport, or from the same terminal of an airport, which all have access to the same fuel source. The fuel allocation may be determined for a plurality of missions over a predefined time window. The time window may represent the period over which the fuel available at the fuel source is to be used e.g. it may be the time period between deliveries of fuel to be stored in the fuel source and made available to the aircraft. In other examples, the time period may correspond to one or more banks of operations, or to a specific period such as one or more days, or one or more weeks. The plurality of missions is referred to as a "fleet" which must be allocated fuel, and over which a fleet-wide optimisation is to be performed.

The fuel available at the refueling location may comprise a fixed amount of a default fuel and a fixed amount of a non-default fuel as described above. The default fuel may be fossil kerosene (or other SAF poor fuel), whereas the non-default fuel may be a SAF rich fuel e.g. having a SAF content of 50% or more, or 100% SAF (the SAF rich fuel may be any fuel which has a greater proportion of SAF compared to the SAF poor fuel). More generally, the non-default fuel may be associated with a level of nvPM production which is less than that of the default fuel (e.g. when being used in corresponding conditions). The default and non-default fuels may have a variety of characteristics as discussed above.

If both default fuel and non-default fuel is provided to a refueling location, a number of possibilities exist for how those fuels could be used:

a) Mix all of the available non-default fuel in with a suitable volume of default fuel in order to yield a single fuel composition to be used by all aircraft being refueled. This is broadly what happens in the prior art at present.

b) Mix all of the available non-default fuel in with a suitable volume of default fuel to satisfy the fuel requirement for missions for which rich-burn engines are used. The missions with lean-burn engines would receive or be allocated the default fuel composition because for at least part of their operation the lean-burn system reduces soot emissions very substantially.

c) As b), but in which the available non-default fuel is shared across not only the rich-burn missions but also the subset of lean-burn missions which use a "large" proportion of their fuel in pilot-only mode (i.e. short-haul flights, or flights for which the destination airport involves a high amount of taxiing). "Large" may be defined with reference to a predetermined threshold.

d) As c) but in which those lean-burn missions which receive an allocation of non-default fuel use it solely in their pilot fuel injectors and use the default fuel in their main fuel injectors. For those missions receiving an allocation of non-default fuel, this option corresponds to the example shown in FIG. 9.

The inventors have determined that further advantages can be made of the fuel available at the refueling location by determining an optimised "fleet-wide" fuel allocation for the plurality of missions which must be performed using the fuel stored at the fuel source.

Figure 37:
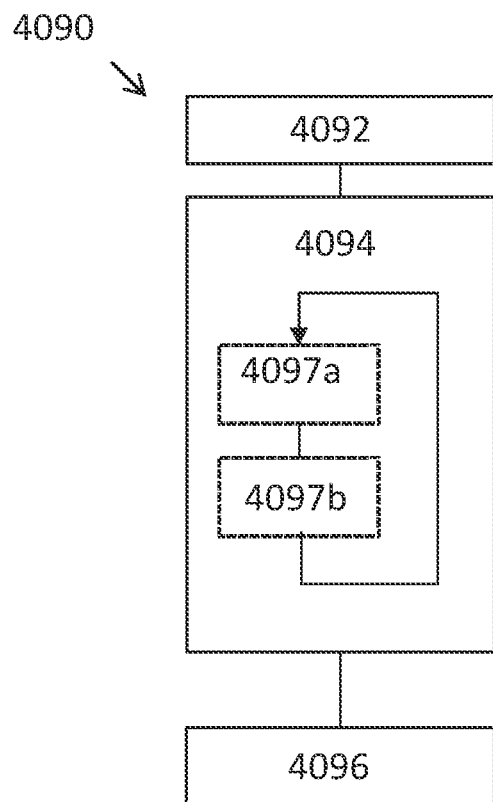
FIG. 37 illustrates a method of determining an optimised fleetwide fuel allocation for a plurality of flights.

FIG. 37 illustrates a method 4090 of determining an optimised fleetwide fuel allocation for the plurality of missions introduced above. The method comprises obtaining 4092 an initial proposed fuel allocation for each of the plurality of missions. The initial proposed fuel allocation may define an amount of the non-default fuel and an amount of the default fuel allocated for each mission, and optionally a blending ratio at which the default and non-default fuel may be blended before loading onto an aircraft. The proposed fuel allocation may have a corresponding fuel usage (e.g. a "mission fuel usage" made up of a fuel usage parameter for each flight condition of the mission as described above) which defines how the allocation is to be used over the duration of the mission. In the case of aircraft with the appropriate capabilities, this may include fuel compositions and proposed switching points and/or blending schedule to be employed on that mission. The fuel usage parameters may include a mixing ratio of the default and non-default fuel according to which fuel is to be mixed and loaded onto the aircraft to complete a respective mission.

The initial proposed fuel allocation for each mission may be determined so that the available fuel is shared between the aircraft so each of the missions can be completed. The initial proposed fuel allocation may provide a starting point for further optimisation, and so does not necessarily correspond to the optimum allocation for each of the missions. The initial fuel allocation may be done, for example, according to any of the methodologies a) to d) listed above.

Each of the plurality of missions is associated with a respective per-mission nvPM impact parameter. The per-mission impact parameter may be determined based on the fuel allocation for the respective mission and the fuel usage defining how that fuel is to be used during the respective mission. The per-mission nvPM impact parameter may be determined by combining an nvPM impact parameter for each operating point of the gas turbine engine(s) 10 of the respective aircraft 1 during the mission (e.g. as defined in a mission description). The per-mission nvPM impact parameters may be calculated as described below or using the methods described above in connection with optimising fuel allocation for an individual mission.

Once an initial proposed fuel allocation for each of the missions has been obtained, the method 4090 comprises performing 4094 a fleet-wide optimisation in which the proposed fuel allocation of each of the plurality of missions is determined so that a combination of the per-mission nvPM impact is optimised within the constraints of the total amount of default and non-default fuel to be allocated to the plurality of missions. In some examples, the amount of default fuel may be considered unconstrained, with only the amount of the non-default fuel being limited.

The fuel allocation for each mission may be determined by modifying them from the initial proposed fuel allocation using an optimisation process so that the total (e.g. the sum) of the nvPM impact for all of the plurality of missions is minimised. This may be done using a suitable type of optimisation process (e.g. an iterative optimisation) which converges on a set of per-mission fuel allocations that gives the lowest fleetwide nvPM impact. The fleet-wide optimisation results in an optimised fuel usage being defined for each mission which makes the most effective use of the fuel available to minimise nvPM impact over all of the missions, rather than for each mission individually.

The method 4090 further comprises determining 4096 the fleetwide fuel allocation for the plurality of missions based on the fleet-wide optimisation. The fleetwide fuel allocation may include fuel allocation for each of the plurality of aircraft within the fleet. The allocation may correspond to that defined above in the examples of determining fuel allocation for a single aircraft/mission. The fleetwide fuel allocation may indicate the amount (either mass or volume) of the default fuel, non-default fuel or a mixture thereof that must be loaded onto the aircraft for each mission so that fuel to meet the optimised fuel usage requirements for that mission is available. The fleetwide fuel allocation may also include the fuel usage for each aircraft to define how the allocation of fuel loaded onto that aircraft is to be used.

As discussed above, the non-default fuel may be associated with a level of nvPM production which is less than that of the default fuel. More specifically, the non-default fuel may be formed from a mixture of a first fuel having a first fuel characteristic and a second fuel having a different fuel characteristic, different from the first. The first and second fuel characteristics may be a percentage of SAF within the respective fuel. The non-default fuel may therefore be a mixture of a first fuel that is 100% SAF, and a second fuel which is 100% fossil kerosene. The non-default fuel may therefore be a SAF-rich fuel (for example to give a SAF content in the non-default fuel of 50% or more), with the default fuel being a relatively SAF-poor fuel. In other examples, the non-default fuel may be a mixture of fuels that differ by any of the other fuel characteristics defined herein, for example aromatic content.

Performing 4094 the fleet-wide optimisation may comprise performing a multi-parameter fleet-wide optimisation to minimise the fleetwide nvPM impact i.e. the sum over all of the plurality of missions of per-mission nvPM impact within the constraints of the default and/or non-default fuel available for the plurality of missions. The optimisation may comprise: i) performing 4097a an outer-loop optimisation in which the fuel allocation of one or more of the missions is varied to reduce the sum of the per-mission nvPM impact parameters of the plurality of missions; and ii) performing 4097b an inner-loop optimisation in which a fuel usage for each of the missions is obtained according to the constraints of the varied fuel allocation to determine a new proposed fuel usage for each of the plurality of missions. Obtaining the fuel usage may comprise determining an optimised fuel usage for the specific mission based on the varied fuel allocation in order to determine a new minimised per-mission nvPM impact parameter for that respective mission. This per-mission optimisation may be carried out as described below or using any of the other techniques described herein. The fleet-wide optimisation allows different distributions of SAF between the plurality of missions to be tried (i.e. the outer loop optimisation), and then for each proposed distribution each mission then explores how best to use its own proposed allocation (i.e. the inner loop optimisation).

The fleetwide optimisation may start with modifying the initial proposed fuel allocation obtained in step 4092. The fleetwide optimisation steps 4097a, 4097b may be repeated until the method converges to an optimised solution of the proposed fuel usage for each of the plurality of missions which corresponds to the minimum value of the sum of the per-mission nvPM impact paraments. In each iteration of the outer-loop optimisation 4097a the fuel usage may be varied by varying a proposed quantity of non-default fuel allocated to the corresponding mission. For example, an amount of non-default fuel allocated to one mission may be moved to another so that the non-default fuel can be allocated in a more optimal way overall.

In some examples, the inner loop optimisation 4097b may comprise obtaining the fuel usage of a respective mission by obtaining the result of a previous per-mission optimisation for that mission. This may allow the computation time to be reduced. Performing the inner loop optimisation may comprise obtaining a pre-prepared solution for the fuel usage for that mission (e.g. SAF percentages within the SAF-poor and SAF-rich fuel compositions for that mission, and the proposed switching points and/or blending schedule to be employed on that mission) in order to minimise the overall nvPM for that mission. The pre-prepared solution may be obtained from an approximate model, look-up table or "response function" from which, for a given proposed fuel allocation, a corresponding pre-prepared solution can be obtained. In some examples, the pre-prepared solution may also be obtained based on other factors such as the proposed route for the respective mission and expected weather conditions.

In some examples, the fleet-wide optimisation may be based at least partly on any one or more of:
i) a percentage of a first fuel having a first fuel characteristic within the default fuel defining the lowest possible percentage of fuel having the first fuel characteristic which can be used for combustion;
ii) a percentage of the first fuel having the first fuel characteristic within the non-default fuel defining the highest possible percentage of fuel having the first fuel characteristic which can be used for combustion; and/or
iii) the quantity of non-defuel available for the plurality of missions.

Where the first fuel characteristic is the percentage SAF content of the fuel, factors i) and ii) above may allow the lowest and highest possible SAF content of a fuel that can be formed from the default and non-default fuel to be determined. For example, if the non-default fuel contains 80% SAF and the default fuel contains 10% SAF, the greatest possible SAF content of a mixture of the two fuels is 80%, and the lowest is 10%.

As discussed above, the fuel usage for each of the plurality of missions is obtained by obtaining an optimised fuel usage for the respective mission defining how the allocated fuel is used during the mission. The optimised fuel usage may include one or more fuel usage parameters based on which the combustion system of the respective aircraft is controlled, or according to which fuel is mixed and loaded on to the aircraft. For example, the usage parameters may include SAF percentages within the SAF-poor and SAF-rich fuel compositions for that mission, and proposed switching points and/or blending schedule to be employed on that mission. The usage parameters may be chosen in order to minimise a per-mission nvPM impact parameter for that respective mission, within the constraints of the fuel allocated to that mission by the fuel allocation.

Figure 38:
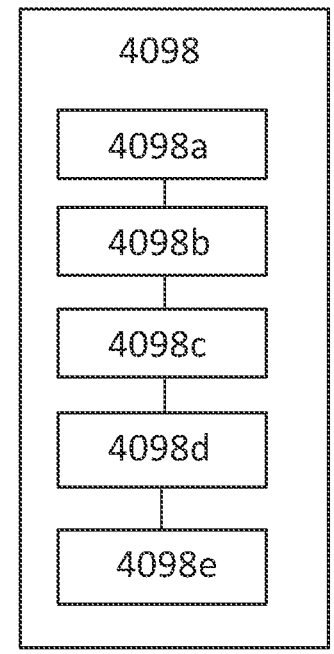
FIG. 38 illustrates a per-flight optimisation to determine an optimised fuel usage.

The optimised fuel usage for each mission (e.g. determined as part of the inner-loop optimisation) may be obtained by performing 4098 a per-mission optimisation as illustrated in FIG. 38. The per-mission optimisation may be performed by, for each respective mission:
i) determining 4098a a type and/or operational capabilities of a combustor used by the respective aircraft used for the mission;
ii) determining 4098b a total fuel requirement for the respective mission;
iii) determining 4098c an amount of fuel required for each type of fuel injector provided in the combustor for the respective mission;
iv) determining 4098d the dependence of nvPM emissions for each operating point of the engine using fuel having the characteristics of the default fuel, non-default fuel, or a mixture thereof; and
v) determining 4098e an optimised fuel usage which minimises the total nvPM emissions for the mission.

In step i), the type and capabilities of the combustor system the aircraft performing the respective mission are determined. This may include determining whether the aircraft comprises a lean-burn staged combustor or a rich-burn combustor. It may further comprise determining which combustor control modes are available. For example, it may be determined whether the operational capabilities include switching fuel between different sources being supplied to the pilot fuel injectors, or providing a blended fuel to the pilot and/or main fuel injectors as described in various examples herein. If the combustor is a lean-burn staged combustor, determining an amount of fuel required for each type of fuel injector comprises determining an amount of fuel required for the pilot fuel injectors during pilot-only operation. It may additionally or alternatively comprise determining an amount of fuel required for the pilot fuel injectors during pilot-and-main operation. Determining an amount of fuel required for each type of combustor may, in some examples, comprise determining an amount of fuel required for the pilot fuel injectors operating within a threshold range of the operation at fuel flow rates below that of the staging point. This may be the case in examples where a SAF rich fuel is provided to the pilot fuel injectors in pilot-only mode close to the staging point as described above in connection with FIG. 15. In step iv) the nvPM emission for each operating point of the engine dependent on the characteristics of the fuel being combustor is obtained. The engine operating points may be as defined in a mission description as discussed elsewhere herein. In step v) the optimised fuel usage is determined based on the nvPM emission dependence in order to find the optimal fuel usage (e.g. type or blend of fuel used) at each engine operating condition to minimise the overall nvPM emissions. In some examples, the nvPM cost function for each engine operating condition as defined elsewhere herein may be minimised.

The information determined in each of the steps i) to iv) of the per-mission optimisation may be obtained or calculated using any suitable technique that would be known to the skilled person. For example, this may include accessing information stored about the relevant aircraft and descriptions of each of the plurality of missions they are to fly.

The per-mission optimisation may be carried out according to any of the examples given herein, for example that discussed in connection with FIG. 34.

The method 4090 is a computer implemented method. The method 4090 may be implemented by any suitable computing device, either on board an aircraft, separate from the aircraft as part of a fuel loading system, or as a dedicated system configured to manage fuel allocation.

Figure 39:
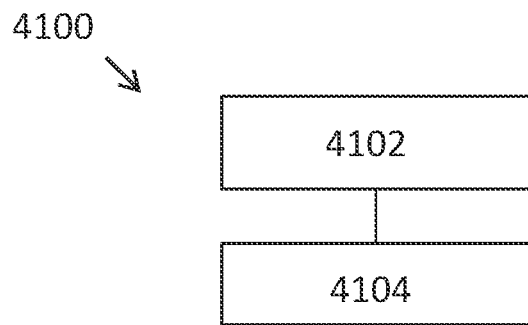
FIG. 39 illustrates a method of loading fuel onto a plurality of aircraft.

The method 4090 may be part of a method 4100 of loading fuel onto the plurality of aircraft for which the fuel allocation has been determined. Such a method is illustrated in FIG. 39. The method 4100 may comprise determining 4102 fuel allocation for the plurality of missions using the method 4090 described above. Once the fuel allocation is determined, the method 4100 comprises loading 4104 fuel onto the aircraft according to the fuel allocation. This may comprise loading fuel by connecting the aircraft to a fuel supply using a known method. Loading of the fuel may also include providing fuel usage information calculated for each mission to the aircraft for storage in an onboard control system (such as the EEC 42) so that the aircraft can be controlled accordingly. This may include fuel usage information to allow the configuration of any fuel tanks as required, selecting between fuels of different characteristics at certain operating points, and/or a fuel blending schedule. The usage information may also include a ratio at which the default and non-default fuel is to be mixed before it is loaded onto the aircraft (for example, in cases of aircraft for which onboard fuel mixing or selection is not possible). The step of loading the fuel may also comprise storing any required control parameters in a control system of the relevant engine (e.g. the EEC 42).

Figure 40:
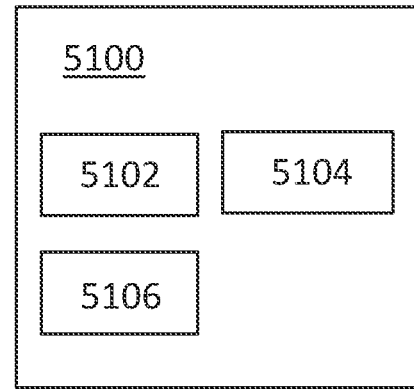
FIG. 40 shows a schematic view of a fleetwide fuel allocation determination system.

FIG. 40 illustrates a fleetwide fuel allocation determination system 5100 for determining a fuel allocation for a plurality of missions. The system 5100 may carry out the method 4090 described above. Any feature disclosed above in connection with the method 4090 may therefore also apply to the system 5100 of FIG. 40.

The fleetwide fuel allocation determination system 5100 generally comprises an initial proposed fuel allocation obtaining module 5102, a fleetwide optimisation module 5104 and a fleetwide fuel allocation determining module 5106. These modules may carry out any of the steps defined above in respect to the method 4090 of determining a fleetwide fuel allocation.

The initial proposed fuel allocation obtaining module 5102 is configured to obtain an initial proposed fuel allocation for each of the plurality of missions. As discussed above, this may form the starting point for the fleetwide optimisation. The fleetwide optimisation module 5104 is configured to perform a fleet-wide optimisation in which the proposed fuel allocation of each of the plurality of missions is modified within the constraints of the total available default and/or non-default fuel from the fuel source to minimise a sum of the per-mission nvPM impact parameters over all of the plurality of missions. Each of the plurality of missions may be associated with a per-mission nvPM impact parameter determined according to the proposed fuel usage as described above.

The fleetwide fuel allocation determination module 5106 is configured to determine the fleetwide fuel allocation for the plurality of missions based on the fleet-wide optimisation.

As discussed above, the non-default fuel is associated with a level of nvPM production which is less than that of the default fuel. The non-default fuel is formed from a mixture of a first fuel having a first fuel characteristic and a second fuel having a second fuel characteristic, different from the first. More specifically, the first and second fuel characteristics may be a percentage of SAF within the respective fuel, and wherein the non-default fuel is a SAF-rich fuel and the default fuel is a SAF-poor fuel.

The fleetwide optimisation module may be configured to perform the fleetwide optimisation as discussed above. The fleetwide optimisation module 5104 is therefore configured to perform the following steps:

i) perform an outer-loop optimisation in which the fuel allocation of one or more of the missions is varied to reduce the sum of the per-mission nvPM impact parameters of the plurality of mission; and ii) perform an inner-loop optimisation in which the fuel usage for each of the missions is obtained according to the constraints of the varied fuel allocation to determine a new proposed fuel usage for each of the plurality of missions The fleetwide optimisation module 5104 may be configured to repeat steps i) and ii) until an optimised fuel usage for each of the plurality of missions is determined which corresponds to a minimised sum of the per-mission nvPM impact parameters. The fleetwide optimisation module 5104 may be configured to perform the inner-loop optimisation by obtaining a pre-prepared solution for the fuel usage for a respective mission. This may be obtained using information already available to the system 5100, such as that stored in a local or remote memory.

The fleetwide optimisation module 5104 may be configured to obtain the fuel usage for each of the plurality of missions by obtaining an optimised fuel usage for the respective mission defining how the fuel is to be used for a respective mission in order to minimise a per-mission nvPM impact parameter for that mission.

The fleetwide optimisation module 5104 may be configured to obtain the optimised fuel usage for each mission by performing a per-mission optimisation as discussed above. In order to perform the per-mission optimisation, the fleetwide optimisation module may perform the steps shown in FIG. 38, or as discussed in any of the examples above. The details of the per-mission optimisation will not therefore be repeated here. Other optimisation techniques may be used, such as any of those described herein.

Any of the features described above in connection with the examples of the method 4090 of determining fleetwide fuel allocation may be performed by the modules of the system 5100. Those features will not therefore be described again here.

Figure 41:
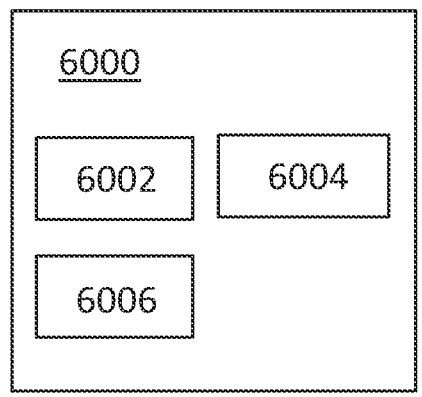
FIG. 41 shows a schematic view of a computing device.

The computing modules, systems and computer implemented method steps described herein may be implemented in software executed by a processor, hardware or a combination of the two. In some embodiments, the modules, systems and method steps described herein may be implemented by one or more computing devices. Such a computing device 6000 is illustrated in FIG. 41, which includes one or more processors 6002, input/output interfaces 6004 and memory 6006. The memory may include computer or machine readable memory forming a computer/machine readable medium. The skilled person will appreciate that the memory may be provided by a variety of components including a volatile memory, a hard drive, a non-volatile memory, etc. The input/output interfaces may allow information such as a proposed mission description to be obtained from an external source, and may allow calculated fuel allocation or usage parameters to be output to anther device (e.g. to a fuel loading system so that the fuel loading system can be controlled accordingly), or can be output to a user.

The memory may store a set of computer readable instructions, data structures, program modules or other data. The computer-readable media may not include temporary computer readable media (transitory media), such as a modulated data signal and a carrier wave.

The skilled person will understand that computing modules and systems described herein as individual components may not be physically separate from one another, and may be located at a single location or may be distributed between several networked components. In some embodiments, the functionality of the modules/systems described herein may be divided differently between the modules/systems, or other modules/systems provided to perform any of the functions described herein.

In one aspect of the present application, there is provided a machine/computer readable medium or computer program product containing instructions which, when read by a machine or computer, cause any of the computer implemented methods, or parts thereof, described or claimed herein to be performed.

The machine readable medium may be any of the following: a CDROM; a DVD ROM/RAM (including -R/-RW or +R/+RW); a hard drive; a memory (including a USB drive; an SD card; a compact flash card or the like); a transmitted signal (including an Internet download, ftp file transfer of the like); a wire; etc. The machine readable medium may be a non-transitory computer readable medium.

It will be understood that the invention is not limited to the embodiments above-described and various modifications and improvements can be made without departing from the concepts described herein.

Except where mutually exclusive, any of the features may be employed separately or in combination with any other features and the disclosure extends to and includes all combinations and sub-combinations of one or more features described herein.

We claim:

1. A gas turbine engine for an aircraft, comprising:
a staged combustion system having pilot fuel injectors and main fuel injectors, the staged combustion system being operable in a pilot-only range of operation and a pilot-and-main range of operation;
a fuel delivery regulator arranged to control delivery of fuel to the pilot and main fuel injectors, the fuel delivery regulator being arranged to receive fuel from a first fuel source containing a first fuel having a first fuel characteristic and a second fuel source containing a second fuel having a second fuel characteristic, the second fuel characteristic being different from the first fuel characteristic; and
an electronic engine controller configured to control the fuel delivery regulator, wherein
the fuel delivery regulator is arranged to deliver fuel to the pilot fuel injectors during at least part of the pilot-only range of operation having a different fuel characteristic from fuel delivered to one or both of the pilot and main fuel injectors during at least part of the pilot-and-main range of operation,
the first fuel is a sustainable aviation fuel (SAF), the first fuel characteristic is associated with a level of non-volatile particulate matter (nvPM) production which is less than that of the second fuel characteristic, and the fuel delivered to the pilot fuel injectors during at least part of the pilot-only range of operation is associated with a level of nvPM production which is less than that of the fuel delivered to one or both of the pilot and main fuel injectors during at least part of the pilot-and-main range of operation,
the fuel delivery regulator is arranged to deliver fuel from the first fuel source to the pilot fuel injectors during operation in at least part of the pilot-only range of operation, and deliver fuel from the second fuel source to the pilot fuel injectors during the pilot-and-main range of operation,
the fuel delivery regulator is arranged to switch delivery of fuel to the pilot fuel injectors between fuel from the first fuel source and fuel from the second fuel source at one or more operating points within, or at a boundary of, the pilot-only range of operation, according to a mode signal from the electronic engine controller indicative of an operation range change of the staged combustion system,
the fuel delivery regulator is arranged to further switch delivery of fuel to the pilot fuel injectors between fuel from the first fuel source and fuel from the second fuel source at a threshold point within the pilot-only range of operation, and
the threshold point is:
a) a threshold fuel flow rate at which the production of nvPM by the gas turbine engine passes a threshold amount of the nvPM produced by the gas turbine engine during operation in which the pilot fuel injectors are delivered fuel having the second fuel characteristic; and/or
b) a predefined threshold fuel flow rate which is less than the fuel flow rate at the boundary between pilot-only operation and pilot-and-main operation by a predefined amount.

2. A gas turbine engine according to claim 1, wherein the fuel delivery regulator is arranged to deliver fuel from the first fuel source to the pilot fuel injectors during operation in both the pilot-only and the pilot-and-main ranges of operation, and fuel from the second fuel source to the main fuel injectors during operation in the pilot-and-main range of operation.

3. A gas turbine engine according to claim 1, wherein:
the fuel delivery regulator comprises a fuel blender arranged to receive a supply of fuel from both the first and second fuel sources and output fuel from the first fuel source, fuel from the second fuel source, or a blend thereof; and
the fuel blender is arranged to deliver fuel to the pilot fuel injectors.

4. A gas turbine engine according to claim 3, wherein the fuel blender is arranged to deliver the blend of fuel from the first fuel source and fuel from the second fuel source to the pilot fuel injectors during at least part of the pilot-only range of operation.

5. A gas turbine engine according to claim 4, wherein the fuel blender is arranged to deliver a blend of fuel to the pilot fuel injectors having a varying blend ratio of fuel from the first fuel source and fuel from the second fuel source, wherein the blend ratio is varied within the pilot-only range of operation according to the fuel flow rate.

6. A gas turbine engine according to claim 5, wherein the dependence on fuel flow rate of the proportion of fuel from the first fuel source compared to that from the second fuel source is determined according to a desired resultant level of nvPM at a particular fuel flow rate, and may be determined such that the nvPM does not exceed a predetermined threshold or such that the nvPM production is minimised over a period of operation of the gas turbine engine.

7. A gas turbine engine according to claim 5, wherein the fuel blender is arranged to blend fuel in order to achieve a desired level of nvPM at one or more operating conditions of the gas turbine engine within the pilot-only range of operation.

8. A gas turbine engine according to claim 1, wherein the fuel regulator is arranged to deliver fuel to the pilot fuel injectors in order to minimise a cost function dependent on one or more nvPM impact parameters, wherein the one or more nvPM impact parameters optionally include any one or more of:
  i) height above ground level at which the nvPM production takes place;
  ii) location of the nvPM production;
  iii) weather and/or atmospheric conditions at a location of the nvPM production;
  iv) climate impacts associated with location of the nvPM production;
  v) mass and/or size of individual nvPM particles produced;
  vi) potential contrail production and/or contrail characteristics;
  vii) local air quality (LAQ) impact of nvPM production; and/or
  viii) nvPM mass and/or number.

9. A gas turbine engine according to claim 5, wherein the blend ratio provided by the fuel blender is determined at least partly according to any one or more of:
  a) the amount of fuel having the first fuel composition available for a proposed flight;
  b) the amount of total fuel requirement for the pilot fuel injectors during pilot-only operation for the entire flight in a range of operation in which fuel is provided from the first fuel source; and/or
  c) a fuel composition limit parameter.

10. A method of operating a gas turbine engine for an aircraft, the gas turbine engine comprising a staged combustion system having pilot fuel injectors and main fuel injectors, the staged combustion system being operable in a pilot-only range of operation and a pilot-and-main range of operation, the method comprising:
  regulating fuel delivery to the pilot and main fuel injectors from a first fuel source containing a first fuel having a first fuel characteristic and a second fuel source containing a second fuel having a second fuel characteristic, the second fuel characteristic being different from the first fuel characteristic, wherein
  the regulating of the fuel delivery comprises delivering fuel to the pilot fuel injectors during at least part of the pilot-only range of operation having a different fuel characteristic from fuel delivered to one or both of the pilot and main fuel injectors during at least part of the pilot-and-main range of operation,
  the first fuel is a sustainable aviation fuel (SAF), the first fuel characteristic is associated with a level of non-volatile particulate matter (nvPM) production which is less than that of the second fuel characteristic, and the fuel delivered to the pilot fuel injectors during at least part of the pilot-only range of operation is associated with a level of nvPM production which is less than that of the fuel delivered to one or both of the pilot and main fuel injectors during at least part of the pilot-and-main range of operation,
  the regulating of the fuel delivery comprises delivering fuel from the first fuel source to the pilot fuel injectors during operation in at least part of the pilot-only range of operation, and delivering fuel from the second fuel source to the pilot fuel injectors during the pilot-and-main range of operation
  the regulating of the fuel delivery comprises switching delivery of fuel to the pilot fuel injectors between fuel from the first fuel source and fuel from the second fuel source at one or more operating points within, or at a boundary of, the pilot-only range of operation, according to a mode signal from an electronic engine controller indicative of an operation range change of the staged combustion system,
  the regulating of the fuel delivery further comprises switching delivery of fuel to the pilot fuel injectors between fuel from the first fuel source and fuel from the second fuel source at a threshold point within the pilot-only range of operation, and
  the threshold point is:
    a) a threshold fuel flow rate at which the production of nvPM by the gas turbine engine passes a threshold amount of the nvPM produced by the gas turbine engine during operation in which the pilot fuel injectors are delivered fuel having the second fuel characteristic; and/or
    b) a predefined threshold fuel flow rate which is less than the fuel flow rate at the boundary between pilot-only operation and pilot-and-main operation by a predefined amount.

11. A method according to claim 10, wherein the regulating of the fuel delivery comprises delivering fuel from the first fuel source to the pilot fuel injectors during operation in both the pilot-only and the pilot-and-main ranges of operation, and fuel from the second fuel source to the main fuel injectors during operation in the pilot-and-main range of operation.

12. A method according to claim 10, wherein the regulating of the fuel delivery comprises:
  blending a supply of fuel from both the first and second fuel sources to form a blended fuel consisting of fuel from the first fuel source, fuel from the second fuel source, or a blend thereof; and
  delivering the blended fuel to the pilot fuel injectors.

13. A gas turbine engine for an aircraft, comprising:
  a staged combustion system having pilot fuel injectors and main fuel injectors, the staged combustion system being operable in a pilot-only range of operation and a pilot-and-main range of operation;
  a fuel delivery regulator arranged to control delivery of fuel to the pilot and main fuel injectors, the fuel delivery regulator being arranged to receive fuel from a first fuel source containing a first fuel having a first fuel characteristic and a second fuel source containing a second fuel having a second fuel characteristic, the second fuel characteristic being different from the first fuel characteristic; and an electronic engine controller configured to control the fuel delivery regulator, wherein the fuel delivery regulator is arranged to deliver fuel to the pilot fuel injectors during at least part of the pilot-only range of operation having a different fuel characteristic from fuel delivered to one or both of the pilot and main fuel injectors during at least part of the pilot-and-main range of operation, the first fuel is a sustainable aviation fuel (SAF), the first fuel characteristic is associated with a level of non-volatile particulate matter (nvPM) production which is less than that of the second fuel characteristic, and the fuel delivered to the pilot fuel injectors during at least part of the pilot-only range of operation is associated with a level of nvPM production which is less than that of the fuel delivered to one or both of the pilot and main fuel injectors during at least part of the pilot-and-main range of operation, the fuel delivery regulator is arranged to deliver fuel from the first fuel source to the pilot fuel injectors during operation in at least part of the pilot-only range of operation, and deliver fuel from the second fuel source to the pilot fuel injectors during the pilot-and-main range of operation, the fuel delivery regulator is arranged to switch delivery of fuel to the pilot fuel injectors between fuel from the first fuel source and fuel from the second fuel source at one or more operating points within, or at a boundary of, the pilot-only range of operation, according to a mode signal from the electronic engine controller indicative of an operation range change of the staged combustion system, the fuel delivery regulator comprises a fuel blender arranged to receive a supply of fuel from both the first and second fuel sources and output fuel from the first fuel source, fuel from the second fuel source, or a blend thereof, the fuel blender is arranged to deliver fuel to the pilot fuel injectors, and the fuel blender is arranged to deliver the blend of fuel from the first fuel source and fuel from the second fuel source to the pilot fuel injectors during at least part of the pilot-only range of operation.

* * * * *